United States Patent [19]

Turner

[11] Patent Number: 4,488,289
[45] Date of Patent: Dec. 11, 1984

[54] INTERFACE FACILITY FOR A PACKET SWITCHING SYSTEM

[75] Inventor: Jonathan S. Turner, Evanston, Ill.

[73] Assignee: AT&T Bell Laboratories, Murray Hill, N.J.

[21] Appl. No.: 392,228

[22] Filed: Jun. 25, 1982

[51] Int. Cl.³ .......................................... H04Q 11/04
[52] U.S. Cl. ..................................................... 370/60
[58] Field of Search ....................... 370/60, 92, 94, 93, 370/86

[56] References Cited

U.S. PATENT DOCUMENTS

| | | | |
|---|---|---|---|
| 3,627,951 | 12/1971 | Batin | 370/60 |
| 3,749,845 | 7/1973 | Fraser | 179/15 |
| 4,061,879 | 12/1977 | Wintzer | 370/92 |
| 4,081,612 | 3/1978 | Hafner | 370/60 |
| 4,287,592 | 9/1981 | Paulish et al. | 370/94 |
| 4,399,531 | 8/1983 | Grande et al. | 370/60 |

OTHER PUBLICATIONS

1976 Proceedings of the International Conference on Computer Communications, Aug., 1976, Toronto, "Datapac Subscriber Interfaces", pp. 143–148.

1977 IEEE Electronics and Aerospace Systems Convention, Sep. 26–28, 1977, Va., "Communications Processors for Telenet's Third Generation Packet Switching Network", pp. 8-2A—8-2L.

B. Penney et al., "Survey of Computer Communications Loop Networks'—Part 1", Computer Communications, vol. 2, No. 4, Aug. 1979, pp. 165–180.

E. Faldella, "A Microprocessor—Controlled Packet Transmission System", Euromicro Journal, No. 6, Nov. 1980, pp. 417–428.

A.F.I.P.S. National Computer Conference, vol. 46, Jun. 13, 1977, Montvale (U.S.), J. Rinde: "Routing and Control in a Centrally Directed Network", pp. 603–608.

Proceedings of the Third International Conference on Computer Communication, Aug. 3, 1976, Toronto (CA), J. Rinde: "TYMNET I: An Alternative to Packet Technology", pp. 268–273.

Compcon '80, 20th IEEE Computer Society International Conference, Feb. 25, 1980, New York (U.S.), G.

L. Chesson, et al., "Datakit Network Architecture", pp. 59–61.

ICC '79 Conference Record, vol. 2, Jun. 11, 1979, New York (U.S.), G. L. Chesson: "Datakit Software Architecture", pp. 20.2.1–20.2.5.

IEEE Transactions on Communications, vol. COM-28, No. 4, Apr. 1980, New York (U.S.), M. Schwartz et al.: "Routing Techniques Used in Computer Communication Networks", pp. 539–552.

(List continued on next page.)

*Primary Examiner*—Douglas W. Olms
*Assistant Examiner*—Wellington Chin
*Attorney, Agent, or Firm*—J. C. Moran; F. W. Padden

[57] ABSTRACT

A communication method and packet switching system in which packets comprising logical addresses and voice/data information are communicated through the system by packet switching networks which are interconnected by high-speed digital trunks with each of the latter being directly terminated on both ends by trunk controllers. During initial call setup of a particular call, central processors associated with each network in the desired route store the necessary logical to physical address information in the controllers which perform all logical to physical address translations on packets of the call. Each network comprises stages of switching nodes which are responsive to the physical address associated with a packet by a controller to communicate this packet to a designated subsequent node. The nodes provide for variable packet buffering, packet address rotation techniques, and intranode and internode signaling protocols. Each packet has a field which is automatically updated by the controllers for accumulating the total time delay incurred by the packet in progressing through the networks. Each processor has the capability of doing fault detection and isolation on the associated network, trunks, and controllers by the transmission of a single test packet. The testing is done solely in response to the test packet and no preconditioning of controllers or networks is necessary.

37 Claims, 55 Drawing Figures

OTHER PUBLICATIONS

IEE Proceedings, vol. 127, Pt. E, No. 6, Nov. 1980, Old Woking (GB), J. A. McDermid et al.: "Design and Use of Comflex—A Hardware—Controlled Packet Switch", pp. 233-240.

Bulletin Scientifique A.I.M., vol. 88, No. 2, Apr.-Jun. 1975, Liege (BE), T. H. Beeforth et al.: "Further Work on Data Communication Systems at the University of Sussex", pp. 140-146.

Review of the Electrical Communication Laboratories, vol. 27, Nos. 5, 6, May—Jun. 1979, Tokyo (JP), T. Abe et al.: "Protocol Design for Data Communication Network Architecture", pp. 312-337.

Journal of Telecommunication Networks, vol. 1, No. 2, 1982, Rockville, MD (U.S.), G. W. R. Luderer et al.: "A Virtual Circuit Switch as the Basis for Distributed Systems", pp. 147-160.

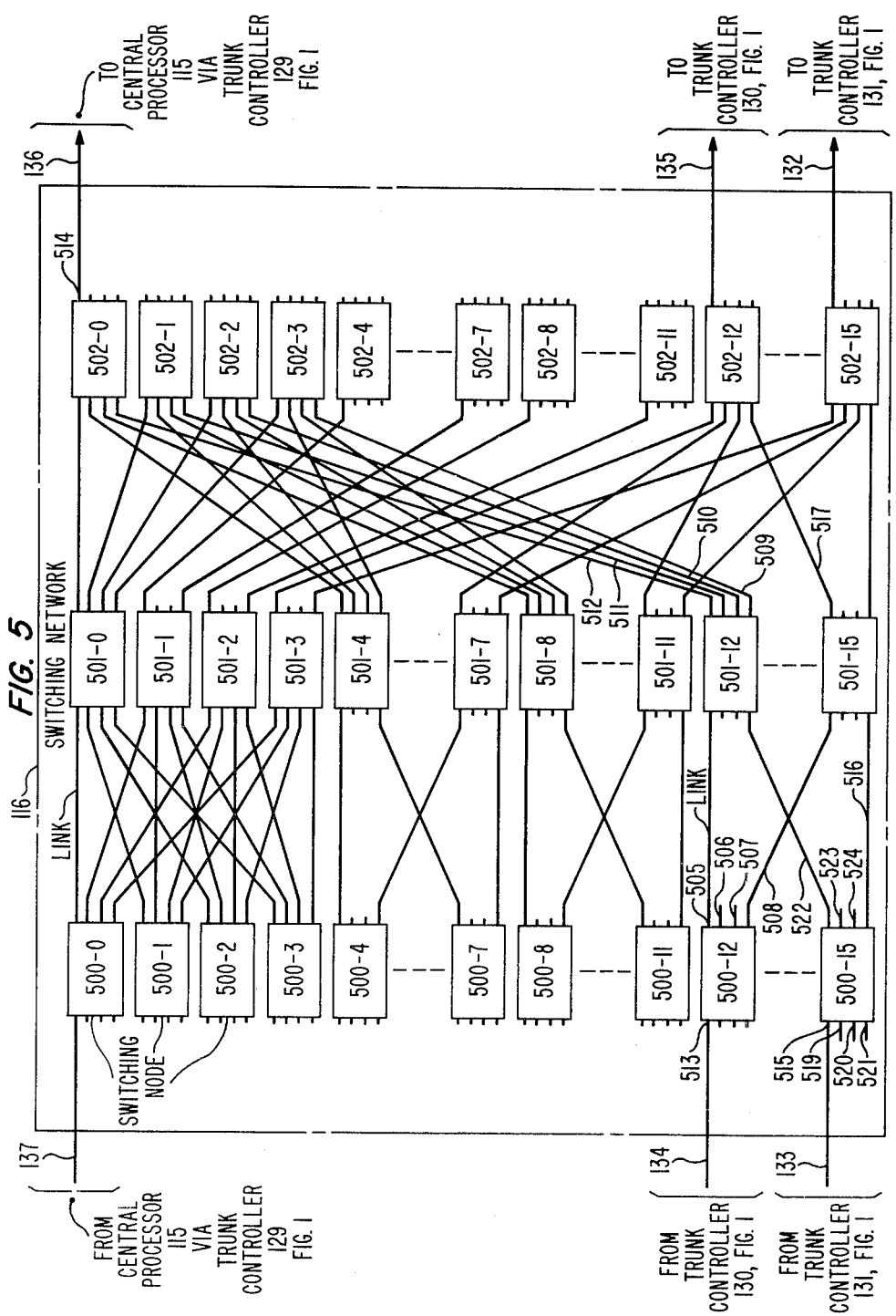

FIG. 6

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| | | 000000 | 48 | 0 | | 0 | | 1 | | |

FIG. 7

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| | | 110000 | 60 | 0 | | 1 | | 2 | | |

FIG. 8

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| | | 000011 | 60 | 0 | | 1 | | 2 | | |

FIG. 9

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| | | 001100 | 60 | 0 | | 1 | | 2 | | |

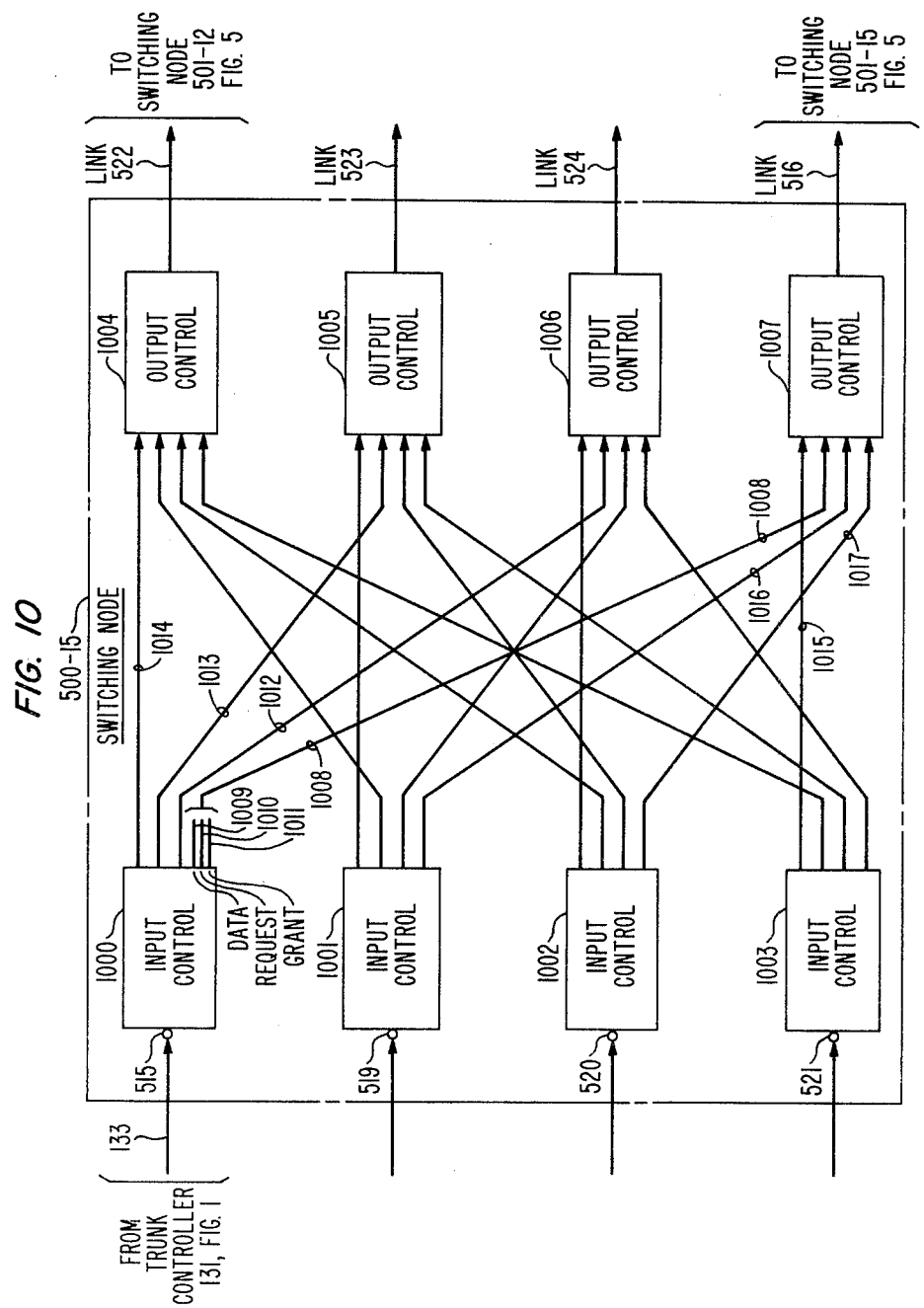

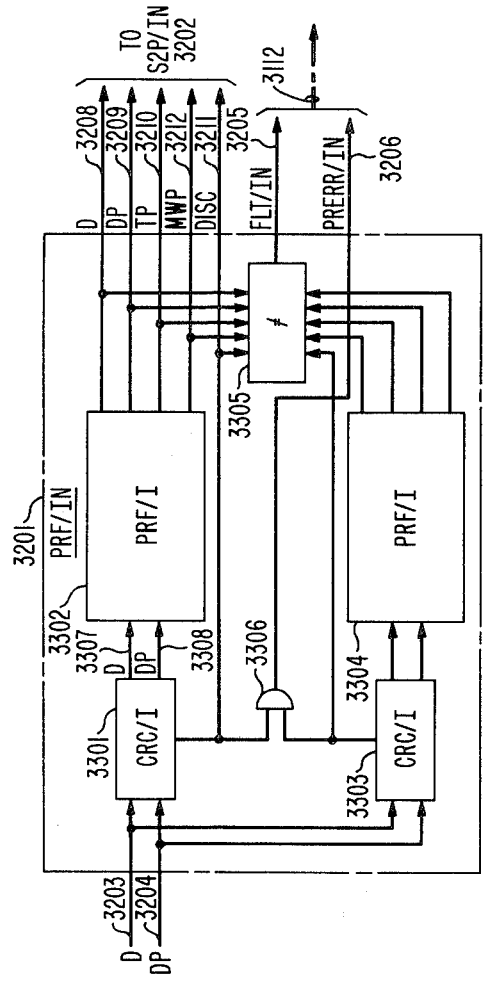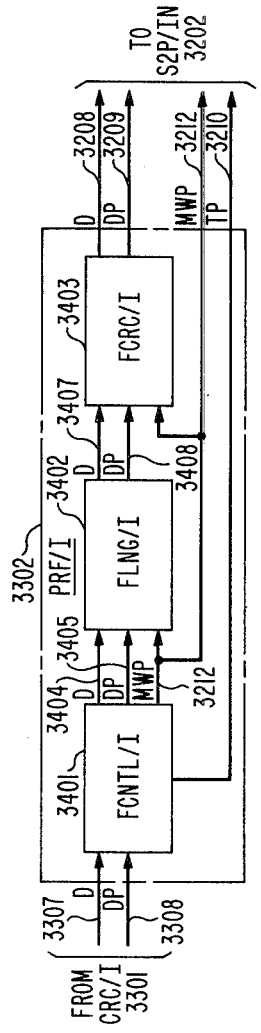
FIG. 33
FIG. 34

OUTPUT CKT TRANSFORMATION CNTL=3, 4

SYSTEM TIMING DIAGRAM

PSI (ψ)
PHI (φ)
THETA (θ)

4,488,289

INTERFACE FACILITY FOR A PACKET SWITCHING SYSTEM

CROSS-REFERENCE TO RELATED APPLICATIONS

Concurrently filed herewith and assigned to the same assignee as this application are:

J. S. Turner, "Fast Packet Switch" Ser. No. 392,378;

J. S. Turner, "End-to-End Information Memory Arrangement in a Line Controller", Ser. No. 392,227;

J. S. Turner, "Packet Switching Loop-Around Network and Facilitates Testing", Ser. No. 392,381;

W. A. Montgomery, "Time Stamping for a Packet Switching System", Ser. No. 392,373; and J. S. Turner, "A Fast Packet Switching System", Ser. No. 393,112.

TECHNICAL FIELD

This invention relates to a method and packet switching facilities for the communication of integrated voice and data signals. The invention particularly pertains to distributed control facilities interfacing with a packet switching network for providing translation information for routing each packet to its destination during a voice and/or data call.

BACKGROUND OF THE INVENTION

Packet communication has proven to be an economically practical system for the transmission of information which occurs in short, high-rate bursts with long pauses in between bursts. The use of packet communication allows efficient utilization of the switching and transmission facilities, since the facilities are only utilized during the actual transmission of information.

The transmission of voice information in the form of packets is a desirable communication technique; however, it is not as yet in widespread commercial use. Packetization of voice would not only result in a more economic and effective communication system, but it would also facilitate the introduction of totally integrated voice and data service on a nationwide basis.

An important constraint on an integrated packet communication system has been that packets of encoded voice must be received at their destination within a maximum amount of time after transmission from their source. If this constraint is not met, then the packets cannot be used for voice conversation because the fidelity of the voice reproduction would deteriorate.

Prior art systems for switching packets have been rather small systems consisting of only a few hundred nodes with limited packet handling capability—that is, being capable of only handling a few thousand packets per second. A disadvantage of such systems is their need to equip each switching node with complex computers and sophisticated software packages to perform the packet switching function. The systems customarily have used complex control protocols to handle error recovery and flow control and, as a result, have had the limited packet handling capability.

A problem in the prior art which contributed to packet switching delays is the requirement for a central computer translation of address information in each packet as it progresses through the packet switching system. Such translations are time consuming operations for the computer and contribute to packet delays and traffic congestion in the networks and at the computer, particularly during heavy traffic periods. Illustratively, as each packet is received by a packet switching network, the prior art required a central computer to translate logical address information in the received packet into physical address information needed to switch that packet through the network to its intended destination.

In view of the foregoing, a need exists for facilities which reduce the burdens on central computers in performing translations for each received packet and particularly for improved facilities for performing the logical to physical address translations for packet switching functions with minimal delays. A specific need exists for packet switching control arrangements which facilitate the communication of voice signals with fidelity unimpaired by objectionable delays.

SUMMARY OF THE INVENTION

The foregoing problems are solved and a technical advance is achieved in accordance with the principles of this invention incorporated in an illustrated method and in a structured embodiment in which fast voice and/or data packet communication is achieved with minimal delay by providing distributed control facilities interfacing with a switching network for speedy packet communication to a desired destination and on a limited basis with central processor facilities during an initial call set-up to derive route translation information for the distributed control facilities' use on the remainder of the packet message call. An important element of the advance is that switching nodes within the network are substantially divorced from repeatedly relying during a packet call on accesses to a central computer based memory for performing the logical to physical address translation, but rather the nodes rely on the distributed control facilities to perform these functions. The result is greater switching speed with less delay than heretofore incurred due to access congestion among switching nodes and central computers.

In the illustrative system, the packet switching networks are interconnected by means of transmission links which illustratively comprise trunks. Such a trunk is terminated at each of its ends by distributed control interface facility which illustratively is a trunk controller interfacingly connecting a trunk to the switching network. Advantageously, the trunk controller forms a hub of the fast packet communication system and is equipped with all of the necessary distributed hardware for performing the logical to physical address translation on each received packet as it progresses through the system.

An important function of the trunk controller is to interface with the packet switching network and the central computer or processor, during a packet message set-up procedure at the beginning of a packet call. It is at this time that the trunk controller is responsive to a message set-up packet for communicating via the switching network with the central processor to derive logical and physical address information therefrom and to store it in a trunk controller memory unit for the remainder of the packet call. The processor is arranged to verify the accuracy of the stored information and, thereafter, is relieved of logical to physical address translations. Subsequently, these translations are performed for each received packet on a distributed basis by a memory look-up operation within the trunk controller. Obviously, the distributed performance of these translation functions virtually eliminate congestion particularly among switching nodes which heretofore sought access to a central processor for the same functions. Advantageously, the present invention performs each such translation within the trunk controller as each packet is passing there through.

It is a feature of the present invention that the central processor is equipped to generate two sets of logical and physical addresses in response to the message set-up packet for facilitating bidirectional transmission between calling and called terminals. The processor advantageously transmits one set of the logical and physical addresses for storage in memory of the trunk controller receiving the call set-up packet and the second set of logical and physical addresses for storage in a memory of a trunk controller outwardly extending toward the called terminal. After verification of the storages in the trunk controllers, the processor is relieved of further translation activity for the duration of the packet call and the bidirectional communication between calling and called terminals is effected by the verified address information stored in the two trunk controllers.

When either of the two trunk controllers receive a packet from the connected trunk, following the initial call set-up, that controller is responsive to a logical address contained in that packet to perform the logical to physical address translation for automatically routing the packet through the switching network; to concatenate the received packet with the address translation information to form a new packet; and to transmit the new packet to the network. The network is responsive to the physical address to route the newly formed packet to the other trunk controller. The latter, in turn, is responsive to the routed packet to remove the added information and transmit the original packet on its attached trunk.

Each trunk controller illustratively has three principal units. An external interface unit is used to receive and transmit packets over the attached trunk. A switch interface unit is used to receive and transmit packets to and from the switching network. A memory unit is used to store packets which are being transmitted through the trunk and importantly to store the logical to physical address translation information received during the set-up procedures from the central processor.

There are two types of packets which are transmitted within the packet switching system-trunk packets and switch packets. When the trunk controller receives trunk packet from the trunk, the trunk controller forms a switch packet from the trunk packet by adding additional information including a physical address for controlling the communication path for the switch packet through the network to a second trunk controller.

To elaborate, trunk-to-network communication is effected by the external interface unit responding to the receipt of an trunk packet from the trunk to store that packet in a receive buffer of the memory unit. Thereafter, a switch interface unit accesses the stored packet, forms a switch packet, and transmits it via the network to the second trunk controller.

A network-to-trunk communication is effected by the switch interface unit of a trunk controller responding to the receipt of a switch packet from the network to read and store the original trunk packet in a transmit buffer of the memory unit. The memory unit, in turn, signals the external interface unit to access the stored packet and to transmit it on the attached trunk.

The switch interface unit is equipped with an input circuit for receiving switch packets from the network and an output circuit for transmitting switch packets to the network. The external interface unit comprises a receive circuit for receiving information from the trunk and a transmit circuit for transmitting information via the attached trunk.

The memory unit advantageously has an address controller and a memory having a number of buffers. The address controller maintains pointers to write and read information from the appropriate buffers under control of addresses in the pointers. When circuits in either the external interface unit or switch interface unit read or write from a memory buffer, they activate the address controller to effect a memory write or read utilizing an address stored in one of the pointers. The address controller monitors the pointers to determine when a particular buffer can store a packet and when a particular buffer has a packet awaiting transmission. On the basis of this monitoring, the address controller controls the operation of the external and switch interface units.

When a packet is being stored in a buffer, the address controller stores the appropriate buffer pointer in a temporary pointer. If an error occurs in the transmission of the packet and it is necessary to abort the storage of that packet, then the buffer pointer is set equal to the original address stored in the temporary pointer. This effectively results in the packet simply being deleted from the buffer.

Each trunk packet has a control field which defines the operations which the receiving trunk controller is to perform on the trunk packet. One such operation is to receive the trunk packet from the trunk via the receive circuit and retransmit that packet on a loop-around basis back out on the same trunk via the transmit circuit. Upon receipt of a trunk packet whose control field is set to this operation, the receive circuit stores the trunk packet in a trunk test buffer and effects the reading and retransmission of the trunk packet by the transmit circuit.

Each switch packet also has a control field which defines various functions to be performed on the switch packet by the switch interface circuit. One of these functions is to receive a packet via the input circuit and to retransmit it on a loop-around basis via the output circuit. The switch packet is stored in a switch test buffer of the memory before retransmission by the output circuit.

Important functions performed by the switch interface are the writing into the trunk controller memory unit of the logical to physical address translation information received from a central processor and the verification reading of the written information in that memory prior to the return to the central processor for accuracy checking. A memory write or memory read packet performs these functions. During a message set-up procedure, these memory packets are transmitted by a central processor via the switching network. Once the translation information has been stored and advantageously verified, by the central processor, the latter is no longer involved in the call. A memory read packet is used to verify the information, and it consists of the address from which the logical to physical address translation information is to be read from the memory unit. The memory read packet is transmitted by the processor through the network to the input circuit. The input circuit cooperates with the address controller to store the memory read packet in a switch test buffer. The output circuit cooperates with the address controller to read the memory read packet from the switch test buffer and uses the memory read packet address to effect the reading of the logical to physical address translation information by the address controller. The output circuit then transmits back to the central processor the memory read packet after inserting into it the just read logical to physical translation information.

A memory write packet is transmitted by the central processor to the input circuit which cooperates with the address controller to write the logical to physical address translation information into the memory unit at the specified location and to write the remainder of the memory write packet into the switch test buffer. The output circuit reads the memory write packet from the switch test buffer, reads the logical to physical address translation information from the proper location in the memory unit, and assembles a switch packet which is transmitted back to the central processor. This rereading of the logical to physical address translation information is a mechanism whereby the central processor upon receiving the packet from the output circuit verifies that the write operation was correctly performed.

The method for switching packets through a packet switching system having switching networks which are interconnected by means of a trunk terminated at both ends by trunk controllers comprises the steps performed within the trunk controllers of receiving a trunk packet, translating the logical address contained in the trunk packet to a physical address, assembling a switch packet comprising the physical address and the trunk packet, transmitting the switch packet through the network, and receiving the switch packet by a second trunk controller which converts the switch packet to a trunk packet and retransmits the trunk packet to another switching network.

Advantageously, the method includes the steps of storing the logical address to physical address translation information in a memory in the trunk controllers. During the assembly of the switch packet, the trunk packet is also stored in the same memory. The step of assembling the switch packet consists of reading the proper physical address information and the trunk packet from the memory and forming this information into the switch packet.

BRIEF DESCRIPTION OF THE DRAWING

FIG. 5 is a detailed block diagram of switching network 116;

FIG. 6 illustrates a switch packet which is used to route the call setup packet of FIG. 3 from trunk controller 130 to central processor 115 via switching network 116 and trunk controller 129;

FIGS. 7 through 9 illustrate the contents of the switch packet used to transmit the call reply packet of FIG. 4 through switching network 116 as the packet progresses through the different stages of switching network 116 from trunk controller 131 to trunk controller 130;

FIG. 10 is a detailed block diagram of switching node 500-15 of switching network 116;

FIGS. 32 through 40 are detailed block diagrams of subsystems which comprise input circuit 1406 of trunk controller 131;

Figure 1:
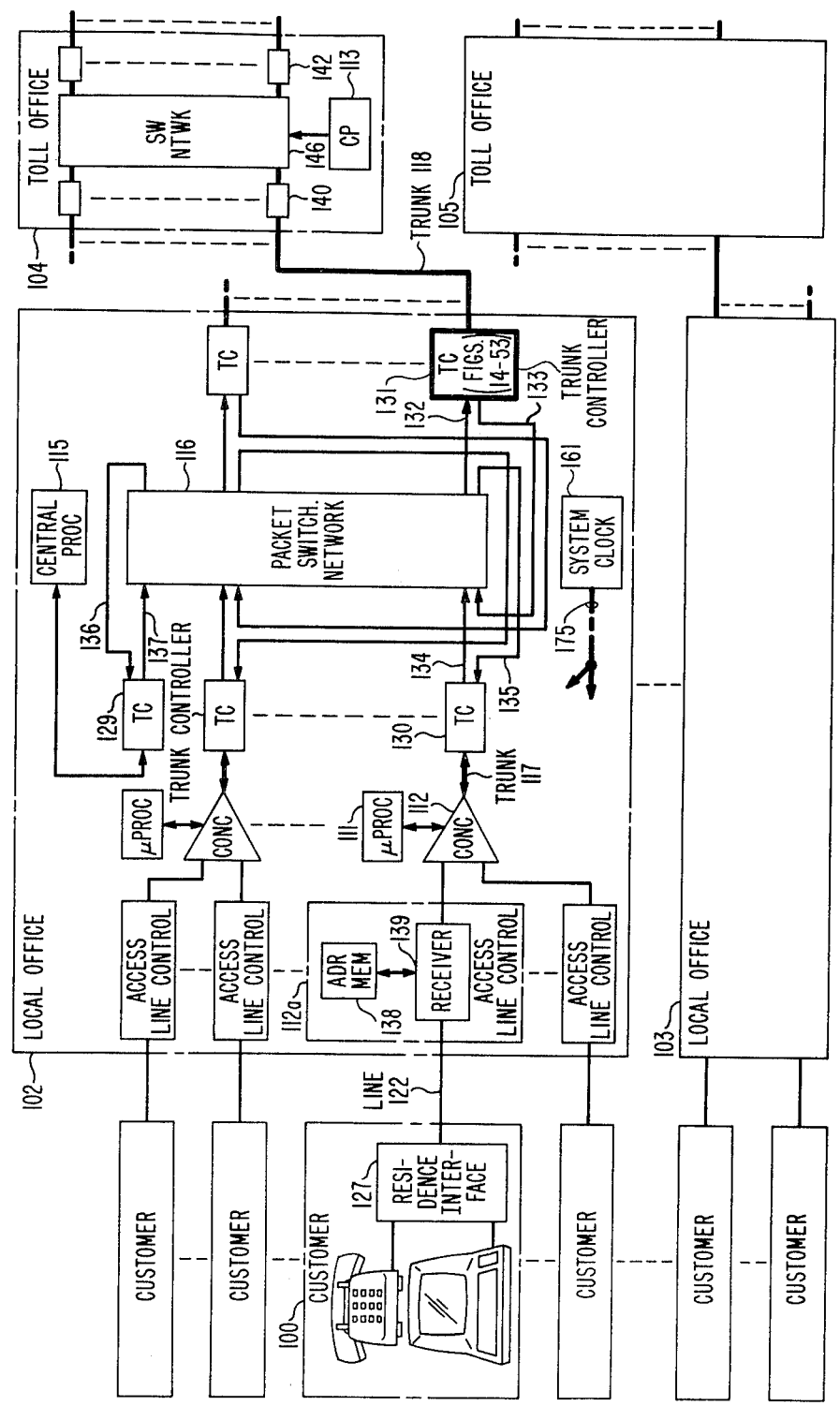
FIGS. 1 and 2 illustrate, in block diagram form, a communication system utilizing the switching architecture of the present invention.

The drawing shows in FIG. 1 the heavy line block of a trunk controller for emphasis of the principal building block of the present invention. The details of that trunk controller are set forth in FIGS. 14 through 53.

DETAILED DESCRIPTION

Figure 2:
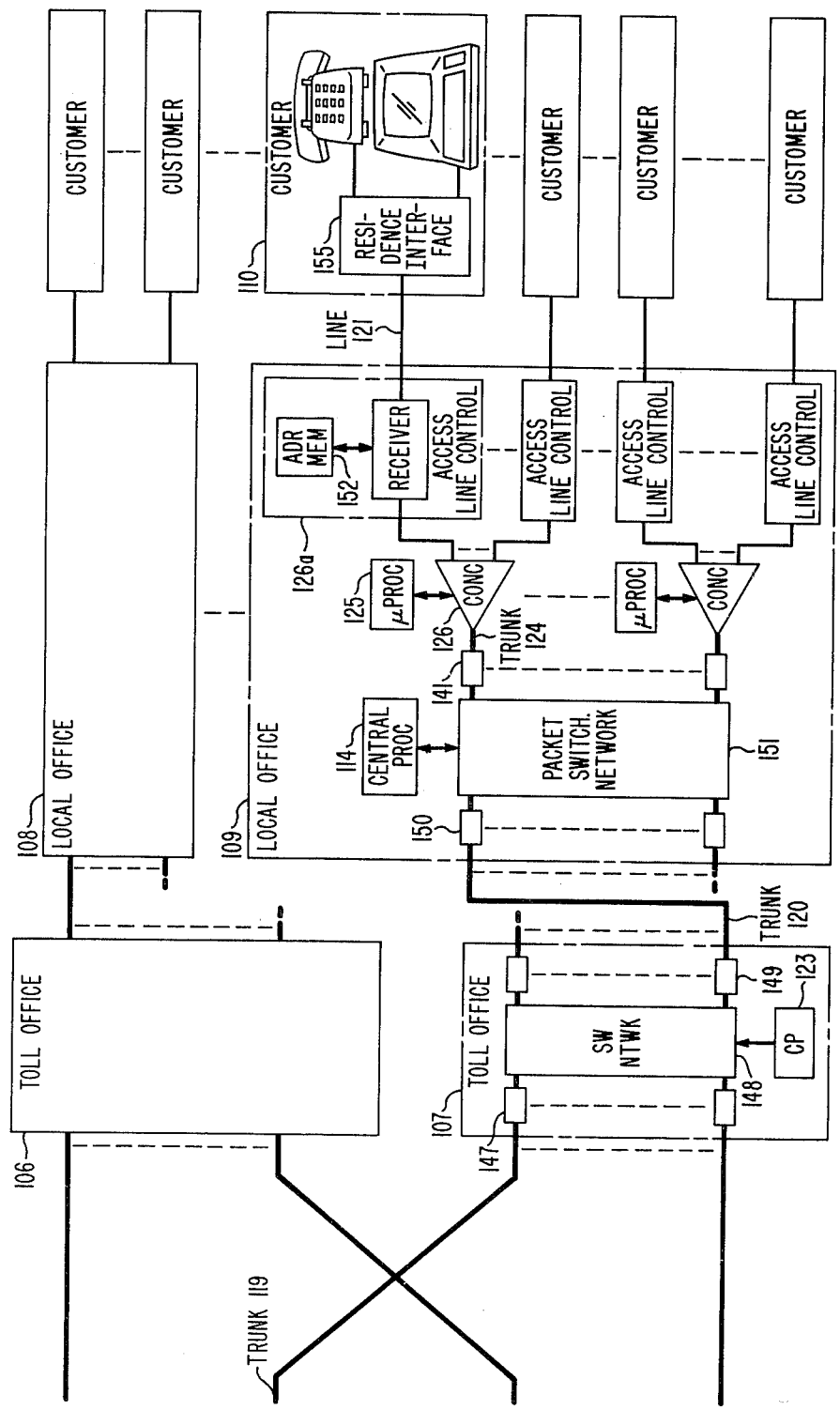

FIGS. 1 and 2 show an illustrative packet switching system having a plurality of local offices 102, 103, 108 and 109, and a plurality of toll offices 104–107 serving a plurality of customers such as customers 100 or 110. The following description first presents a general description of the subsystems comprising the packet switching system of FIGS. 1 and 2. Then a brief resume of a trunk controller and its functions are given to provide a focus on the invention. Next, a description is presented of the manner in which a packet transmitted from a customer 100 resident interface 127 to customer 110 resident interface 155 has the necessary self-routing information inserted into it by each trunk controller in its route through the packet switching system. Once the routing of the packet through the switching system has been described, the procedure used to compile the routing information is then described; and then, the method used to store this information in each trunk controller in the route is described. Finally, a detailed description of each block of FIGS. 1 and 2 is given.

As shown in FIG. 1, local office 102 comprises a switching network 116 which terminates a plurality of trunk controllers and which cooperates with central processor 115 via a central processor trunk controller 129 which is also connected to the switching network. Each trunk controller is tied into the network by unilateral transmission media. Trunk controller 131, for example, receives information from switching network 116 via conductor 132 and transmits information to switching network 116 via conductor 133.

On the customer side of local office 102, the local office is connected to customers via concentrators which are interconnected to the switching network via trunk controllers. A concentrator has an internal switching architecture similar to that of switching network 116 which is described in greater detail later and has a self-contained trunk controller which interfaces the concentrator to the attached trunk. The concentrator's trunk controller is similar to trunk controller 131 which is described in greater detail later. Each concentrator has connected to it a microprocessor which is used in conjunction with the attached access line controller to perform the initial call setup sequences and to provide call supervision as a supplement to the inherent self-routing characteristics of the packets being transmitted through the packet switching system. The customer units are connected to the concentrators by the access line controllers. Each access line controller stores logical address and control information which is stored in the access line controller by the controlling microprocessor. This logical address information is used to control the first portion of the route taken by the packets transmitted through the attached switching network via the interconnecting trunk controller. Each access line controller is connected to a resident interface contained within each customer unit via standard bilateral transmission media. Packets are transmitted between the access line controllers and the resident interfaces using standard packet protocols which define three virtual channels for communication between the resident interface and the access line controller.

Each trunk controller comprises a memory containing a translation table for converting the logical address into switch addresses which are used by the switching network to route the packets to the destination trunk controller. Switching network 116 is interconnected to toll offices such as 104 by high speed trunks with each trunk being terminated on both ends by a trunk controller. The subject matter of FIG. 1 is substantially duplicated in FIG. 2.

Figure 14:
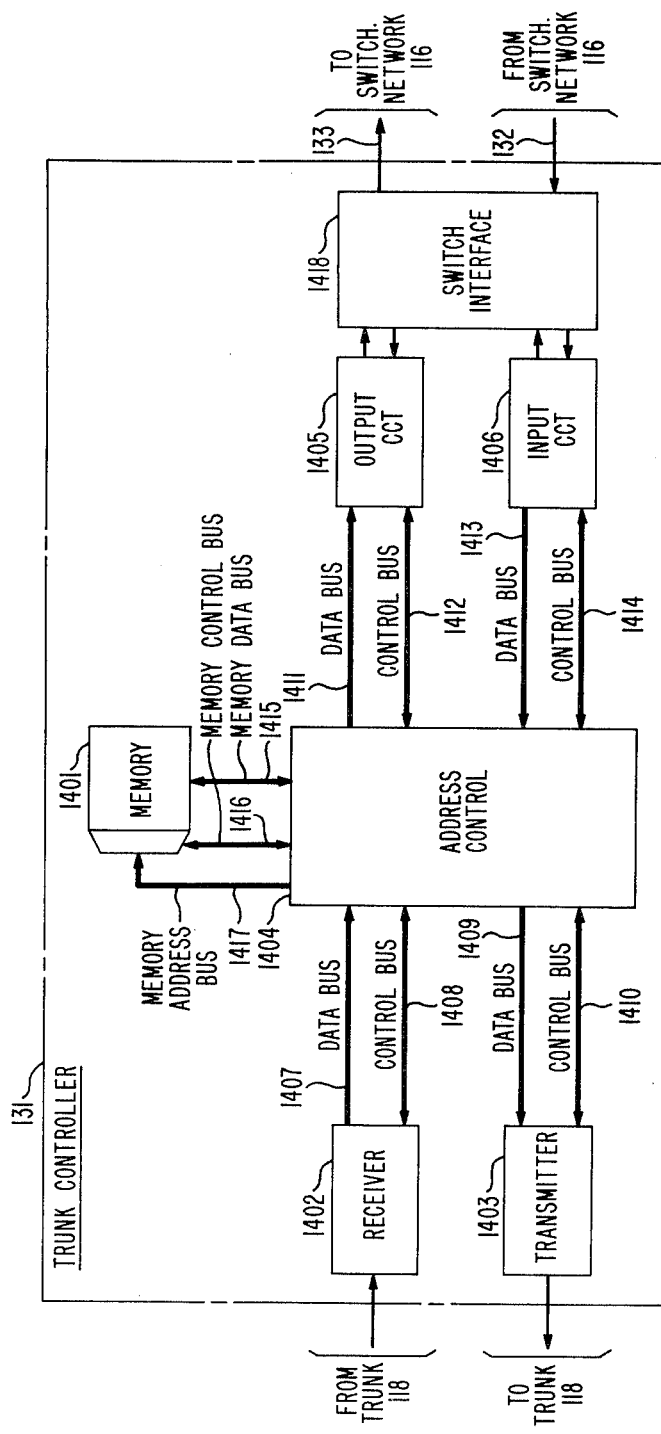
FIG. 14 illustrates, in block diagram form, trunk controller 131.

A brief description of the trunk controllers shown in FIGS. 1 and 2 is now given using trunk controller 131 by way of illustration. As shown in FIG. 14, controller 131 receives packets from trunk 118 via receiver 1402 and transmits packets to trunk 118 via transmitter 1403. Controller 131 transmits packets to switching network 116 via output circuit 1405 and receives packets from network 116 via input circuit 1406. Switch interface 1418 interfaces the input and output circuits to network 116. Packets are transferred in and out of four circular buffers in a memory 1401 via address control 1404. The latter contains pointers to the circular buffers for allowing input circuit 1406, output circuit 1405, transmitter 1403, and receiver 1402 to read and write memory 1401.

Controller 131 handles a variety of packets that are used for various purposes. These packets can be divided into the following general categories: normal data packets, trunk and switch test packets, maintenance read and write packets, and memory read and write packets. Normal data packets carry data and signaling information between the trunk and switching network. Trunk test packets are used to test a trunk interconnecting trunk controllers by the receiving trunk controller looping the trunk test packet back to the transmitting trunk controller. Switch test packets are used to test a path within the switching network. A switch test packet is sent by a central processor to a trunk controller through the switching network. The trunk controller relays the packet to a second trunk controller as specified in the packet, which then returns the packet to the central processor. Maintenance packets are used to send and receive maintenance information between a trunk controller and its associated central processor. Memory packets allow the central processor to read and write information which is normally address translation information from specified memory locations.

Figure 15:
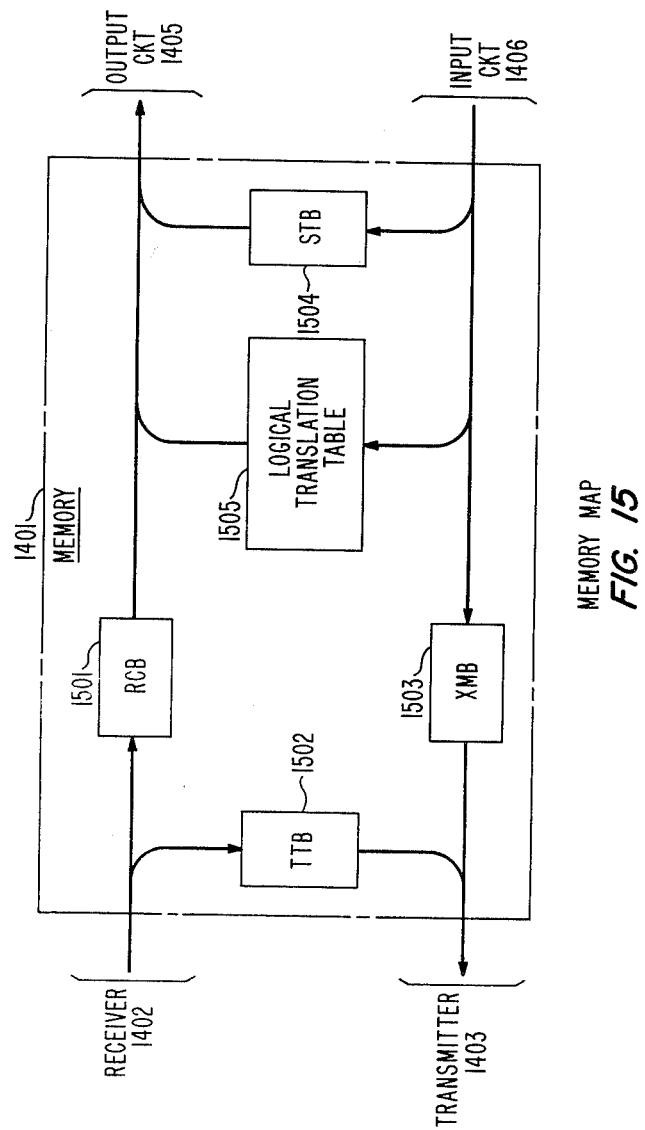
FIG. 15 illustrates the logical organization of memory 1401 of trunk controller 131.

FIG. 15 illustrates the four packet buffers and the logical translation table contained in memory 1401. Packets received by receiver 1402 are written into either receive buffer 1501 or trunk test buffer 1502. Trunk test buffer 1502 is reserved for test packets that are to be looped back over the trunk by transmitter 1403. All other packets received by receiver 1402 are written into receive buffer 1501 from which output circuit 1405 transmits them to switching network 116. Packets received by input circuit 1406 from switching network 116 are written into either transmit buffer 1503 or switch test buffer 1504. Transmit buffer 1503 is for packets that are to be transmitted on the trunk via transmitter 1403. Switch test buffers 1504 is for switch test packets, and for memory read and write packets which are subsequently read and transmitted to network 116 by output circuit 1405. Logical translation table 1505 contains the logical to physical address translation information received from the central processor via memory write packets during the message setup procedure. Logical translation table 1505 is written by the central processor utilizing a memory write packet. Upon receipt of the memory write packet, input circuit 1406 writes the logical to physical address translation information into logical translation table 1505 and the remainder of the memory write packet into switch test buffer 1504. Output circuit 1405 then reads the remainder of the memory write packet from switch test buffer 1504, reinserts the logical to physical address information from logical translation table 1505 into this packet and transmits the latter to the central processor.

Once the logical to physical translation information is stored in table 1505, the central processor is divorced from the logical to physical address operation. When output circuit 1405 reads packets from receive buffer 1501, output circuit 1405 also reads the appropriate logical to physical address information from table 1505 and inserts this information into the just read packet before transmitting the packet to switching network 116. Additional details concerning the manner in which the central processor obtains the information to be inserted into the logical translation table 1505 is described with respect to FIGS. 3 and 4.

Turning now from the trunk controller functions and structure, the procedure for obtaining and storing self-routing information in address memories of the appropriate address line controllers and trunk controllers is described. The information is obtained by a call setup packet being transmitted from the appropriate access line controller connected to the originating customer unit through the various microprocessors and central processors which are associated with the different concentrators and local and toll offices which form the route through which the call setup packet must transverse in order to reach the destination customer unit. As the call setup packet progresses along this route, each processing entity inserts a new logical address into the packet and stores the necessary logical and switch address information in the appropriate access line controller or trunk controllers. Once the call setup packet is received at the microprocessor attached to the concentrator to which the destination customer unit is connected via an access line controller, the receiving microprocessor transmits the appropriate logical and switch address information to the connected access line controller which stores it in its address memory; and the receiving microprocessor assembles and transmits a call reply packet which indicates that the call has been properly set up. After the call reply packet is received by the originating customer access line controller, all the necessary routing information is set up in the access line controllers and trunk controllers forming the packet route so that packets can be directly routed through the switching networks without the packets having to be handled by the associated processing entities.

The utilization of the call setup packet is now illustrated in greater detail by describing the establishment of a telephone call between customers 100 and 110. Customer 100 calls customer 110 by dialing the customer 110 telephone number. Resident interface 127 collects the dialed digits in the conventional manner. After resident interface 127 has collected the dialed digits, it transmits the dialed digits in a packet via line 122 to access line controller 112a. In response to the packet received from resident interface 127, access line controller 112a assembles and transmits the packet shown in FIG. 3 to microprocessor 111 via concentrator 112. The packet identifier field identifies this packet as a signaling packet and a "1" in the most significant byte of data field indicate that the packet is a call setup packet. The remainder of the data field contains the dialed telephone number.

Figure 3:
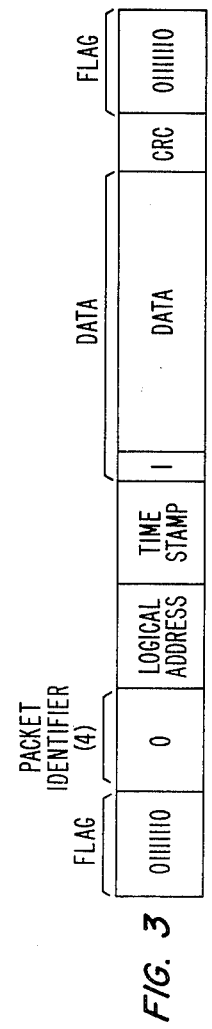
FIG. 3 illustrates the contents of a call setup packet which is routed from an originating customer terminal to a destination customer terminal through the switching system.

Upon receipt of the packet of FIG. 3, microprocessor 111 examines the dialed telephone number and determines that a connection is required through switching network 116. First, microprocessor 111 transmits to access line controller a new logical address to be used in subsequent packets and the switch address defining concentrator 112's trunk controller which connects trunk 117 to concentrator 112. This switch address is used by concentrator 112 to route subsequent packets to trunk 117. Next, microprocessor 111 stores in concentrator 112's trunk controller the switch address identifying access line controller 112a and information defining the virtual channel to be used by access line controller 112a in communicating with resident interface 127. Finally, microprocessor 111 assembles a packet similar to the one shown in FIG. 3, but having the logical address in the logical address field which had been stored in the address memory of access line controller 112a. This new packet is then transmitted to central processor 115 via concentrator 112, trunk 117, trunk controller 130, switching network 116, and trunk controller 129.

Upon receipt of the packet from microprocessor 111, processor 115 determines from the dialed telephone number by performing a table look-up operation that the call must be sent through to office 104. Processor 115 first transmits the logical address contained in the received packet and the switch address identifying trunk controller 130 to trunk controller 131. Trunk controller 131 stores this address information in an internal memory and uses this information to perform the necessary logical to switch address translation on subsequent packets associated with the call being set up. Processor 115 then transmits to trunk controller 130 a new logical address and the switch address identifying trunk controller 131. This address information is used to perform the necessary logical to switch address translation for routing packets from trunk controller 130 to trunk controller 131 associated with the call being set up through switching network 116. The last operation performed by processor 115 is to transmit a call setup packet similar to that shown in FIG. 3 to central processor 113 via switching network 116, trunk controller 131, trunk 118, trunk controller 140 and switching network 146. The packet transmitted to processor 113 has in the logical address field the logical address information identical to that previously stored in trunk controller 130.

Upon receipt of the packet from trunk 118, processor 113 performs operations in response to this packet similar to those performed by processor 115 as previously described with respect to the call setup packet. Processor 113 then transmits a call setup packet to central processor 123 via switching network 146, trunk controller 142, trunk 119 trunk controller 147, and switching network 148. Processor 123 performs similar operations to those performed by processor 113 and transmits a new call setup packet to central processor 114 via switching network 148, trunk controller 149, trunk 120, trunk controller 150, and switching network 151. Upon receipt of the call setup packet from processor 123, central processor 114 stores the logical address information of this packet and the switch address designating trunk controller 150 in trunk controller 141. Central processor 114 then transmits a new logical address and the switch address designating trunk controller 141 to trunk controller 150, which stores this information. After storing the necessary information in trunk controllers 141 and 150, processor 114 assembles a new call setup packet having the logical address which had previously been stored in trunk controller 150 in the logical address field and transmits this call setup packet to microprocessor 125 via switching network 151, trunk controller 141, trunk 124, and concentrator 126.

Figure 4:
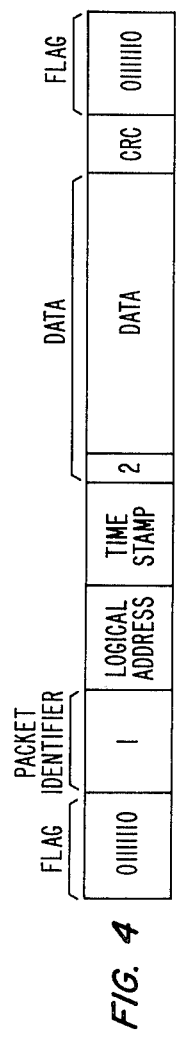
FIG. 4 illustrates the contents of the call reply packet transmitted from the destination customer terminal to the originating customer terminal in response to the receipt of the call setup packet.

Upon receipt of the call setup packet from processor 114, microprocessor 125 reads the logical address information contained in the logical address field and stores the logical address in address memory 152 of access line controller 126a. Microprocessor 125 then transmits a call reply packet as illustrated in FIG. 4 to microprocessor 111 via the previously defined route through the packet switching systems of FIGS. 1 and 2. The logical address field of the packet of FIG. 4 contains the logical address which microprocessor 125 received in the call setup packet from processor 114. Trunk controller 141 is responsive to the receipt of the packet of FIG. 4 to translate the contents of the logical address field using the previously stored logical address to switch address translation information and to insert the previously stored logical address into the call reply packet. The switch address which results from this translation by trunk controller 141 designates trunk controller 150. This switch address is used by switching network 151 to route the call reply packet to trunk controller 150. Trunk controller 150 is responsive to receipt of the call reply packet to transmit this packet to trunk controller 149 via trunk 120. The call reply packet is similarly routed through the various trunk controllers until it is received by microprocessor 111. Once the call reply packet is received by microprocessor 111, all the necessary information for routing calls through the various switching networks is stored within the trunk controllers and access line controllers in the route.

Switching networks 116 of local office 102 is shown in greater detail in FIG. 5. All connections to switching network 116 are made through the trunk controllers shown on FIG. 1. The trunk controllers receive information at a 1.54 Mb/s rate and transmit this information into the network at an 8 Mb/s rate. Each trunk is capable of buffering five packets of information from the attached trunk. The buffering of packets at the input from the trunks is necessary because the packets may have to be delayed before they can be transmitted through the network. Buffering is also needed by the trunk controllers for information being received from the network before it can be retransmitted on the attached trunk. Each trunk controller is capable of buffering up to 40 packets of information from the network before commencing retransmission out on the trunk. Each trunk controller has one input connection and one output connection to switching network 116. For example, trunk control 130 transmits information to switching network 116 via conductor 134 and receives data from switching network 116 via conductor 135 as shown in FIG. 5.

The network itself comprises three stages of switching nodes. The first stage comprises nodes 500-0 through 500-15, the second stage comprises switching nodes 501-0 through 501-15, and the third stage comprises switching node 502-0 through 502-15. Transmission through the network is from left to right. Each switching node is a packet switch. Each packet switch has four inputs and is capable of buffering one packet on each input. The packets received on any input are transmittable on any of the four output terminals of the packet switch. After receipt of a packet on an input terminal, the address contained in that packet is used to determine which output terminal should be used to retransmit the packet. Only the two most significant bits of the address are used to designate the output terminal for a particular switching node. For example, switching node 500-12 retransmits the packet on line 505 if the most significant bits are equal to zero, on line 506 if the most significant bits are equal to one, on line 507 if the most significant bits are equal to two, and on line 508, if the most significant bits are equal to three.

Each node properly rearranges the address bits so that the receiving switching node in the next stage has the correct bits in the most significant bit positions in order to determine which output terminal should be used to retransmit the packet at that stage.

The operation of switching network 116 as shown in FIG. 5 can be better understood by considering the example of the switching of the packet shown in FIG. 3 through this network to central processor 115. The packet shown in FIG. 3 is transmitted by microprocessor 111 via trunk 117 to switching network 116. Upon receipt of the packet shown in FIG. 3, trunk controller 130 forms a new packet which is illustrated in FIG. 6.

The new packet is formed by taking the original packet received from trunk 117, removing the flags and stuffed bits, and then adding the new fields of start bit, packet length, destination trunk controller, source trunk controller, control, arrival time, and a new car CRC field. Trunk controller 130 responds to the packet identifier containing a "0" by inserting a "0" into the destination trunk controller field. This is the trunk number for trunk controller 129 to which central processor 115 is connected. Trunk controller 130 inserts its own output connection number on switching network 116 (in this example 48) into the source trunk controller field. The start bit defines the start of the network packet and the packet length defines the length of the network packet. Trunk controller 130 inserts into the arrival time field the relative time of day. Once the packet of FIG. 6 has been formed and the input 513 of node 500-12 is idle, trunk controller 130 transmits this packet to node 500-12.

Node 500-12 examines the most significant bits of the address field and selects output 505 since these bits are zero. Before transmitting the packet to node 501-12 via output terminal 505, node 500-12 rotates the address field two bits to the left; this results in the two most significant bits becoming the least significant bits, and the two middle bits of the address field shown in FIG. 6 becoming the two most significant bits.

Node 501-12 examines the address field upon receiving it and selects output 512 since the most significant bits are zero. Node 501-12 also rotates the address field two bits to the left. Node 501-12 transmits the packet to node 502-0 via the output terminal 512. Upon receipt of the packet, node 502-0 examines the address field and selects output terminal 514 since the two most significant bits of the address are zero. Upon receiving the packet, trunk controller 129 strips off the start bit, network address field, and network packet length, and transmits to central processor 115 the packet identifier, logical address, time stamp, and data fields plus a recalculated CRC field.

A second example will be used to help illustrate the operation of switching network 116 as shown in FIG. 5. This will be done by following the transmission of the packet shown in FIG. 4 through switching network 116 from trunk 118 to trunk 117. Upon receipt of the packet shown in FIG. 4, trunk controller 131 forms the packet shown in FIG. 7. After forming this packet, trunk controller 131 transmits this packet to switching node 500-15 via input terminal 515. Switching node 500-15 examines the two most significant bits of the network address field (in this example a binary three), and selects link 516 to transmit the packet shown in FIG. 7. Before switching node 500-15 starts to transmit the packet via link 516, switching node 500-15 performs a left rotate operation on the network address field, and the result is the packet shown in FIG. 8. Upon receiving the packet from switching node 500-15, switching node 501-15 examines the two most significant bits of the network address field as shown in FIG. 8 and selects output 517 to transmit the packet out. Before transmitting the packet, switching node 501-15 performs a left rotate operation on the packet, resulting in the packet shown in FIG. 9. Upon receiving the packet of FIG. 9, switching node 502-12 responds to the network address field by transmitting the packet to trunk controller 130 via conductor 135. Switching node 502-12 also performs the left rotate operation on the network address field. The packet that is transmitted to trunk controller 130 via conductor 135 is identical to the packet shown in FIG. 9 with the network address field rotated. Trunk controller 130 forms a new packet which is identical to that shown in FIG. 9 with the exception that the start bit, network packet length, destination trunk controller, source trunk controller, control, and arrival time fields have been eliminated, a new CRC field has been calculated and inserted, and the time stamp field has been updated. Trunk controller 130 then retransmits this new packet on trunk 117.

It would be obvious to one skilled in the art to expand network 116 as shown in FIG. 5 to be capable of terminating more trunks by the addition of more switching nodes. In addition, it would be obvious to one skilled in the art to use such a switching network to correctly interconnect several pieces of digital equipment such as computers or terminals. The other switching networks and concentrators shown in FIGS. 1 and 2 are similar in design to switching network 116.

Switching node 500-15 is illustrated in greater detail in FIG. 10. The other switching nodes are identical in design to switching node 500-15. The switching node consists of four input controls which can transmit information to any one of four output controls. The input controls 1000 through 1003 are connected to the output controls 1004 through 1007 via cables. For example, input control 1000 is connected to output control 1007 via cable 1008. Cable 1008 comprises three conductors 1009, 1010, and 1011. The other interconnecting cables on FIG. 10 are identical in design to cable 1008.

When input control 1000 has a packet to transmit to output control 1007, it transmits a request signal via conductor 1010 to output control 1007. Input control 1000 continuously transmits this request signal until the entire packet has been transmitted to output control 1007. When output control 1007 is free to receive information from input control 1000, output control 1007 transmits a grant signal via conductor 1011 to input control 1000. Upon receipt of the grant signal, input control 1000 commences to transmit the packet to output control 1007 via conductor 1009.

For example, the packet shown in FIG. 7 would be transmitted through switching node 500-15 as illustrated in FIG. 10 in the following manner. When input control 1000 recognizes the start bit, it has already received not only the start bit but also the two most significant bits of the network address. Input control 1000 decodes the two most significant bits of the network address field and determines that the packet was to be transmitted to output control 1007 via cable 1008. Input control 1000 requests permission to start transmission via conductor 1010; and when output control 1007 returns the grant signal via conductor 1011, input control 1000 starts the transmission of the packet to output control 1007 via cable 1008. Before transmitting the network address field, input control 1000 left rotates this address two bits so that the network address transmitted is that shown in FIG. 8. Upon receipt of the start bit of the packet, output control 1007 starts to retransmit this packet out on link 516.

Figure 11:
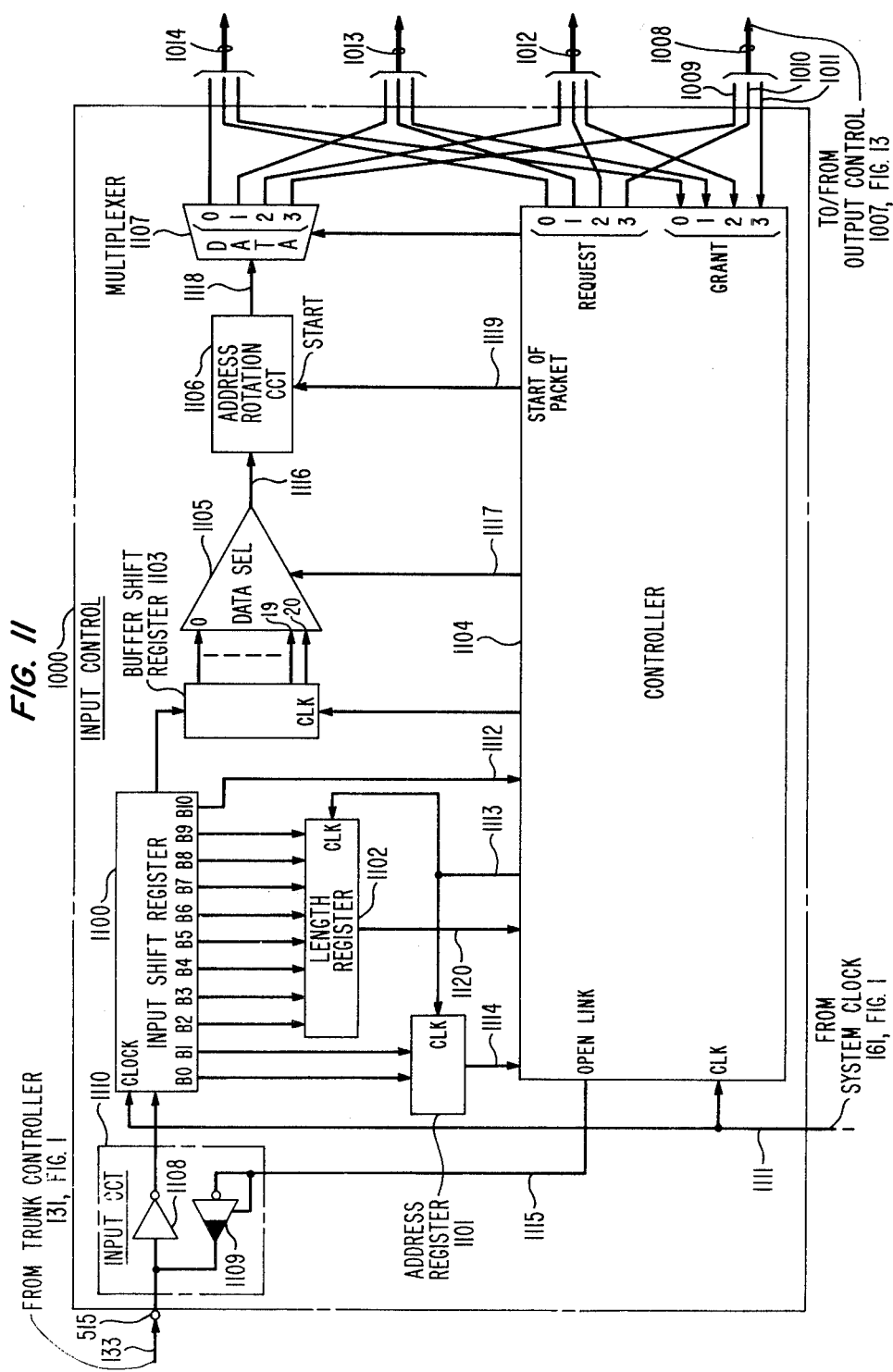
FIG. 11 is a detailed block diagram of input control 1000 of switching node 500-15.

Input control 1000 of FIG. 10 is shown in greater detail in FIG. 11. Input circuit 1110 receives the information from input terminal 515 and transmits to trunk controller 130 of FIG. 11 the link open signal via input terminal 515 under control of controller 1104. The function of the link open signal will be explained in a later section describing output control 1007. Input shift register 1100 is used to detect the start bit, which indicates the beginning of a packet. In addition, input shift register 1110 is used to extract the network packet length field, which is saved in length register 1102, and to extract the two most significant bits of the network address field, which are saved in address register 1101. The buffer shift register 1103 is capable of buffering one complete packet. Buffer shift register 1103 provides an output after each 64 bits of storage. These outputs can be selected by data selector 1105 under control of controller 1104 to bypass unused portions of the buffer shifter register 1103. This bypassing is done when it is not necessary to buffer a whole packet before transmission of the packet can start to the output circuit and is done to speed up the transfer of a packet through input control 1000. Address rotation circuit 1106 performs the previously mentioned left rotate operation on the network address field before this address is transmitted with the remainder of the packet to the selected output control. Multiplexer 1107 under control of controller 1104 selects which of the cables 1008, 1012, 1013 or 1014 the data is to be transmitted on.

The operation of input control 1000 will now be further explained by using the previous example which dealt with the transmission of the packet shown in FIG. 7. Input shift register 1100 is continuously being clocked by system clock 161 via conductor 1111. As data is received via input terminal 515, it is clocked through input shift register 1100. Once the start bit reaches bit position 10 of input shift register 1100, controller 1104 detects this bit and transmits a pulse on conductor 1113. This pulse causes length register 1102 to store the network packet length field, and causes address register 1101 to store the two most significant bits of the network address field, which are contained in bit positions 0 and 1 of input shift register 1100.

Controller 1104 transmits a request via conductor 1010 to output control 1007 since the most significant address bits indicate that the packet is to be transmitted to this output control. While this request is being made, data is being shifted from input shift register 1100 to buffer shift register 1103 which has a number of output terminals. These output terminals are connected to different bit positions within buffer shift register 1103. When controller 1104 receives a grant signal from output control 1007 via conductor 1011, controller 1104 calculates at which output of buffer register 1103 the start bit of the packet is approaching within buffer shift register 1103. This is done so that transmission of the packet to output control 1007 can start as soon as possible. On the basis of this calculation, controller 1104 controls data selector 1105 to select the designated output of buffer shift register 1103. The control information is transmitted to data selector 1105 via cable 1117. Data selector 1105 transmits the data from the selected output to address rotation circuit 1106 via conductor 1116. Before transmitting data, controller 1104 resets address rotation circuit 1106 by transmitting the start of packet signal via conductor 1119. The controller 1104 then uses the packet length information stored in length register 1102, which it reads via cable 1120, to determine when the end of the packet has entered the input shift register. When this occurs and transmission has started from shift register 1103, controller 1104 transmits the link open signal via conductor 1115. This signal is retransmitted via tri-state driver 1109 and input terminal 515 to input port 503-60. The link open signal indicates that input control 1000 is now ready to receive another packet. This function is explained in the section dealing with the output control circuit.

Figure 12:
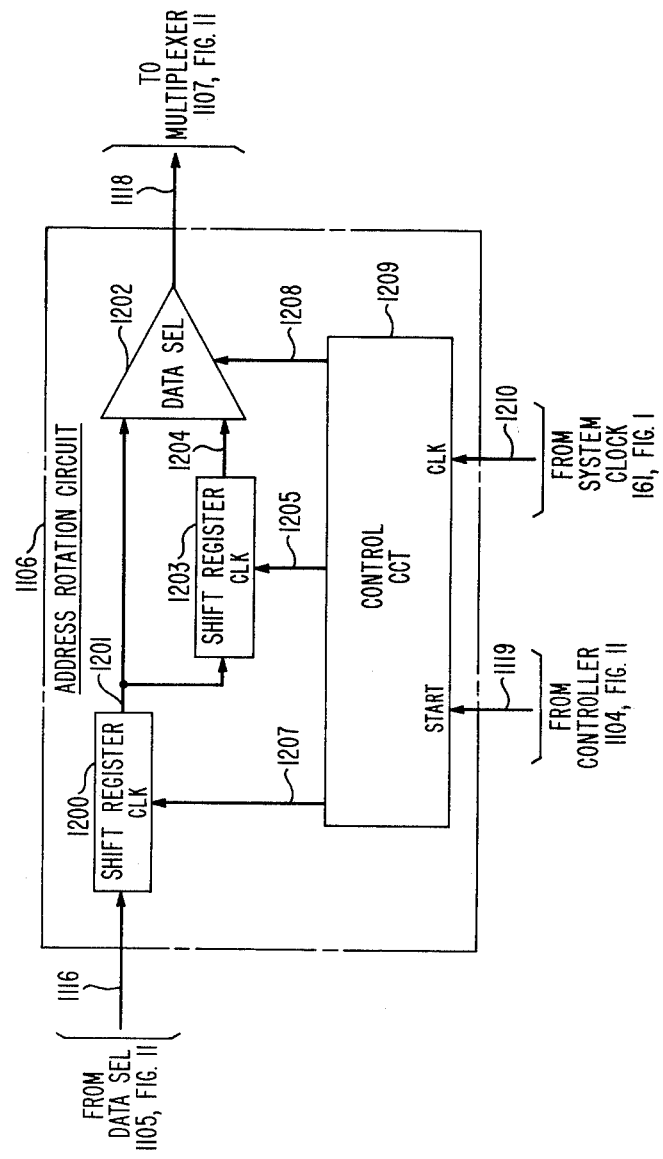
FIG. 12 is a detailed block diagram of address rotation circuit 1106 of input control 1000.

Address rotation circuit 1106 is illustrated in greater detail in FIG. 12. The purpose of circuit 1106 is to rotate the address field to the left two bits so that the two most significant bits become the least significant bits. The rotation is necessary because each input control decodes only the two most significant bits. Shift registers 1200 and 1203 are two bit shift registers, data selector 1202 is used to select either the output of shift register 1200 or shift register 1203, and control circuit 1209 controls the operation of the address rotation circuit. When control circuit 1209 receives the start of packet signal from controller 1104 via conductor 1119, it transmits a clock signal to shift register 1200 via conductor 1207, and to shift register 1203 via conductor 1205. This clock signal is derived from the signal received from system clock 161 via conductor 1210. Control circuit 1209 conditions data selector 1202 via conductor 1208 to select shift register 1203's output to be transmitted on conductor 1118. Control circuit 1029 then counts the number of bits that are being transmitted via conductor 1118; when the two most significant bits of the network address field are contained within shift register 1203, control circuit 1209 ceases to transmit the clock signal to shift register 1203 via conductor 1205, and conditions data selector 1202 to select the output of shift register 1200. Control circuit 1209 then waits until the remaining bits of the network address field have been transmitted via conductor 1118. At this point in time, control circuit 1209 commences to send clock signals to shift register 1203, and conditions data selector 1202 to select the output of shift register 1203. This operation results in the most significant bits of the network address field being rotated.

Figure 13:
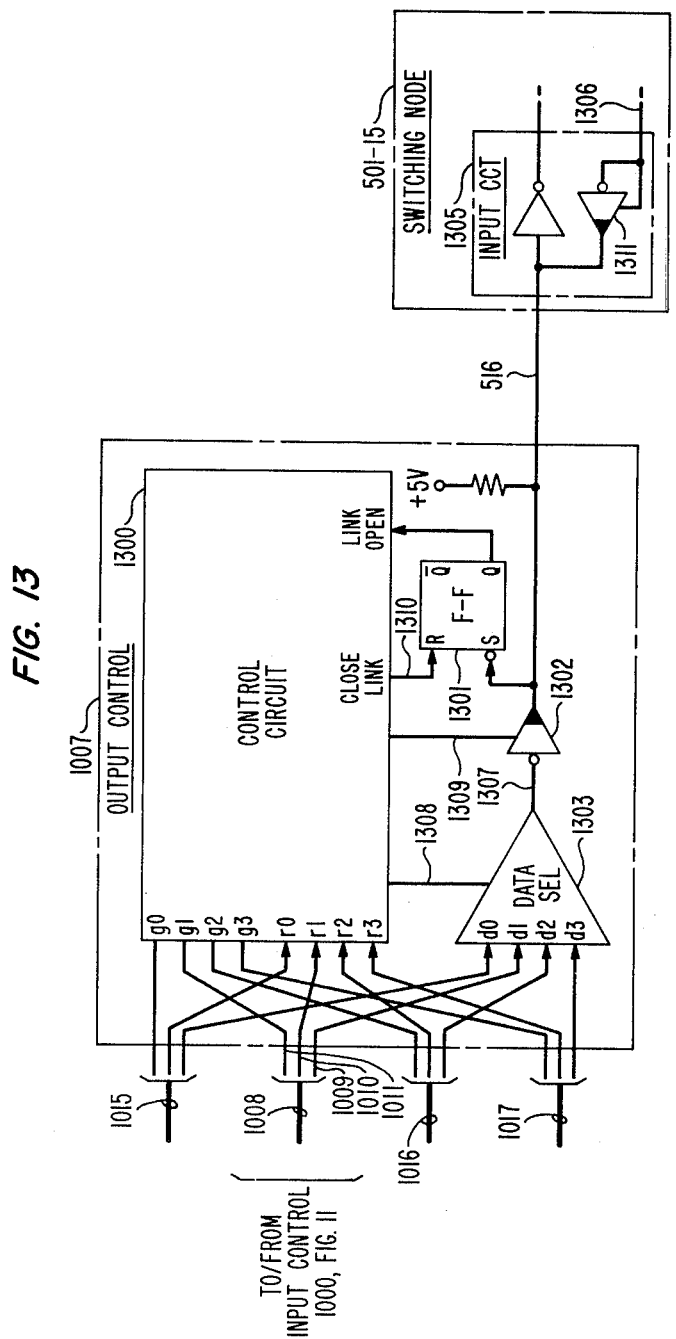
FIG. 13 is a detailed block diagram of output control 1007 of switching node 500-15.

Output control 1007 is shown in greater detail in FIG. 13. Control circuit 1300 responds to requests from input controls 1000 through 1003, which are transmitted via cables 1008, 1015, 1016, and 1017. If flip-flop 1301 is set, control circuit 1300 responds to the request by transmitting a grant signal back to the requesting input control via one of the above mentioned cables. After acknowledging the request, control circuit 1300 conditions data selector 1303 to select the data conductor from the appropriate cable 1008, 1015, 1016, or 1017. Control circuit 1300 transmits the appropriate control information to data selector 1303 via cable 1308. Data selector 1303 transfers the data information received on the selected input terminal to conductor 1307. Tri-state device 1302 takes the information on conductor 1307 and transmits this data via link 516 to input circuit 1305, which is part of switching node 501-15. Control circuit 1300 controls the output of tri-state device 1302 via conductor 1309.

The operation of output control 1007 as shown in FIG. 13 will be explained in greater detail by considering the previous example of input control 1000 transmitting a packet of data to output control 1007 via cable 1008. When input control 1000 transmits the request signal via conductor 1010, control circuit 1300 transmits the grant signal to input control 1000 via conductor 1011 if the link 516 is not being used by one of the other input control circuits and the output of flip-flop 1301 is set. Assuming that flip-flop 1301 was set, control circuit 1300 transmits the grant signal to input control 1000 and conditions data selector 1303 via cable 1308 to select the data being transmitted on conductor 1009 and retransmit this data on conductor 1307. In addition, control circuit 1300 enables the tri-state device 1302 to transfer the information on conductor 1307 to link 516.

After input control 1000 has transmitted the entire packet, it removes the request signal from conductor 1010. Once the request signal is removed from conductor 1010, control circuit 1300 sends a reset signal to flip-flop 1301 via conductor 1310 and stops transmitting signals via cable 1308 and conductor 1309. Once the input control of the switching node 501-15 is capable of accepting another packet, it transmits the open link signal via conductor 1306, tri-state device 1311, and link 516. The open link signal sets flip-flop 1301 via the S input. Once flip-flop 1301 is set, control circuit 1300 can once again respond to request signals from the input controls.

Trunk controller 131 is shown in greater detail in FIG. 14. The other trunk controllers are similar to trunk controller 131. Trunk controller 131 receives packets from trunk 118 via receiver 1402, and transmits packets to trunk 118 via transmitter 1403. Trunk 118 is illustratively a telephone digital transmission facility with a data transmission rate of 1,544 Mb/s as described in Boyle, Colton, Dammann, Karafin, and Mann, "Transmission/Switching Interfaces and Toll Terminal Equipment", 56 *The Bell System Technical Journal* 1057, 1058 (1977). Receiver 1402 and transmitter 1403 are interfaced to the DSX-1 unit shown in FIG. 1 on page 1058 of the cited article. Trunk controller 131 transmits packets to switching network 116 via output circuit 1405, and receives packets from switching network 116 via input circuit 1406. Switch interface 1418 interfaces the input and output circuits to the switch network. Packets are transferred in and out of four circular buffers in memory 1401 via address control 1404. Address control 1404 contains pointers to the circular buffers that allow input circuit 1406, output circuit 1405, transmitter 1403, and receiver 1402 to read and write memory 1401.

Consider an example where normal data packets are transferred from trunk 118 to switching network 116. Incoming packets, similar to those shown in FIG. 3, are received by receiver 1402 in a serial fashion at a 1.544 Mb/s rate. Receiver 1402 adds the arrival time to the packet, and transforms the serial information into a byte. Once it has assembled a byte, it transmits a write request, via control bus 1408, to address control 1404. Receiver 1402 then writes the byte into memory 1401 via data bus 1407 and address control 1404. The location in memory 1401 that the byte is written into is designated by the address pointers associated with receiver 1402. This process continues until receiver 1402 has transferred an entire packet into memory 1401. After receiver 1402 has transmitted an entire packet, it transmits an end of packet signal, via control bus 1408, to address control 1404. Address control 1404 then transmits a packet available signal, via control bus 1412, to output circuit 1405. This packet available signal is transmitted as long as there is a complete packet in memory 1401.

Output circuit 1405 reads the packet stored in memory 1401 by making sequential read requests to address control 1404 via control bus 1412. Address control 1404 maintains a pointer that determines which word in memory 1401 is associated with the packet to be transmitted into the network via output circuit 1405. Output circuit 1405 access and transmits packets at an 8 mb/s rate. In order to transmit packets to switching network 116, output circuit 1405 forms packets similar to those shown in FIG. 6. It does this by using the logical address field from the original packet to address the logical translation table, and calculating the packet length field. In addition, output circuit 1405 calculates a new CRC field, updates the control field, and adds a start bit. These operations are done in a serial fashion; however, an entire packet does not need to be buffered.

Consider another example where packets are transferred from switching network 116 to trunk 118. Packets from switching network 116 are received by input circuit 1406 via switch interface 1418. Input circuit 1406 forms this data into bytes. It then sends a write request via control bus 1414, and sends the packets via data bus 1413 to address control 1404. Address control 1404 writes the information into memory 1401, via memory address bus 1417, memory data bus 1415, and memory control bus 1416. When an entire packet has been stored in memory 1401, input circuit 1406 transmits an end of packet signal to address control 1404 via control bus 1414. Address control 1404 then transmits a packet available signal to transmitter 1403 via control bus 1410. Transmitter 1403 makes a read request to address control 1404, and receives the packets via data bus 1409. Transmitter 1403 transforms the packets into packets similar to those in FIG. 4, and transmits them to trunk 118 at a 1.544 Mb/s rate. Transmitter 1403 also performs error checking, and recalculates the CRC field. In addition, transmitter 1403 updates the time stamp field of the packet. It does this by subtracting the arrival time from the present time, and adding this difference to the time stamp field.

Trunk controller 131 handles a variety of packets that are used for various purposes. These packets can be divided into the following general categories: normal data packets, trunk and switch test packets, maintenance read and write packets, and memory read and write packets. The types of packets are distinguished by different values in the packet identifier or control fields. Normal data packets carry data and signaling information between the trunk and switching network. These are the most common packets. Trunk test packets are used to test a trunk, including the two trunk controllers, and the actual trunk facility. This is done as follows. The test packet is formed by the associated central processor, and sent to the first trunk controller via the switching network. The first trunk controller performs a check on the CRC field of the packet to determine if any errors occurred during the transmission. If an error is found, the first trunk controller aborts the test packet; if no errors are found, the first trunk controller sends the test packet to the second trunk controller via the trunk facility. When the second trunk controller receives the test packet, it performs the same CRC check and, if no errors are found, loops the packet back to the first trunk controller, which then sends the packet back to the central processor, via the switching network. The central processor detects that a transmission error has occurred by noting that the test packet is not looped back after a period of time has elapsed. Switch test packets are used to test a path within the switching network. A switch test packet is sent by the cental processor to a trunk controller through the switching network. The trunk controller relays the packet to a second trunk controller (specified in the packet), which then returns the packet to the central processor. Maintenance packets are used to send maintenance information, such as error statistics, between a trunk controller and its associated central processor. In a maintenance read operation, the central processor sends a maintenance read packet to the trunk controller. The trunk controller reads the information and writes it into the packet; it then returns the packet to the central processor. In a maintenance write operation, the central processor sends a maintenance write packet to the trunk controller. The trunk controller writes the information from the packet into the maintenance register, and then reads the same information out of the maintenance register. The information read out is placed in the maintenance write packet and sent back to the central processor. Memory packets allow the central processor to read and write information from specified memory locations. These packets work similarly to maintenance packets, with the exception that memory locations, and not the maintenance register, are read and written.

FIG. 15 illustrates the four packet buffers, and logical channel translation table contained in memory 1401. Packets arriving from receiver 1402 are written into either receive buffer 1501 or trunk test buffer 1502. Trunk test buffer 1502 is reserved for test packets that are to be looped back over the trunk. All other arriving packets are sent to receive buffer 1501. Packets arriving from input circuit 1406 are written into either transmit buffer 1503 or switch test buffer 1504. Transmit buffer 1503 is for packets that are to be transmitted on the trunk via transmitter 1403. Switch test buffer 1504 is for switch test packets, and for memory read and write packets. Logical translation table 1505 contains the logical to physical address translation information received from the central processor via memory write packets.

The reading and writing of the circular buffers in memory 1401 is controlled by read and write pointers, located in address control 1404. These read and write pointers point to the specific memory locations within the various buffers. Read or write pointers are provided for receiver 1402, transmitter 1403, input circuit 1406 and output circuit 1405. These pointers are used to read or write the various circular buffers, depending on the circuit. The structure is as follows: Receive circuit—receive buffer and trunk test buffer write pointers; output circuit—receive buffer and switch test buffer read pointers; input circuit—transmit buffer and switch test buffer write pointers; transmit circuit—transmit buffer and trunk test buffer read pointers.

In addition to the various read and write pointers, address control 1404 also contains temporary pointers. Receiver 1402 has access to one temporary pointer, which is used to save the value of the write pointer. At the beginning of each packet write operation, the temporary pointer is set to the same address as the write pointer. If an error is discovered while the packet is being written, the write pointer is set back to the address of the temporary pointer. In this way, the packet containing an error is overwritten, effectively discarding it. Input circuit 1406 has access to two temporary pointers. One is used to save the value of the write pointer. The other temporary pointer is used during memory write operations, and will be discussed later. Output circuit 1405 has access to one temporary pointer, which is used during memory read operations.

The following description shows the packet flow of an ordinary data packet from the trunk to the switch network. Receiver 1402 receives trunk packets, and pads the trunk packets with zeroes, in order to provide space in the packet to transform the trunk packets into switch packets. Once receiver 1402 has done this, it makes a write request to address control 1404, in order to write the packet into receive buffer 1501 in memory 1401. Address control 1404 receives the write request and makes the receive buffer write pointer available. Receiver 1402 then writes the packet into receive buffer 1501 at the address specified by the write pointer. Address control 1404 then sends a packet available signal to output circuit 1405, causing output circuit 1405 to send a read request to address control 1404. Address control 1404 makes the receive buffer read pointer available, allowing output circuit 1405 to read receive buffer 1501 at the address specified by the read pointer. Output circuit 1405 reads the packet, modifies the necessary fields to convert the trunk packet into a switch packet, performs the necessary logical to physical address translation, and sends the packet to the switching network. The logical to physical address translation involves reading the logical translation table in memory 1401, and updating the required packet fields.

The packet flow of an ordinary data packet from the switch network to the trunk is as follows. The packet is received from the switching network via switch interface 1418, and is sent to input circuit 1406. Input circuit 1406 makes a write request to address control 1404, in order to write the packet into transmit buffer 1503 in memory 1401. Address control 1404 receives the write request and makes the transmit buffer write pointer available. Input circuit 1406 then writes the packet into transmit buffer 1503, at the address specified by the write pointer. Address control 1404 then sends a packet available signal to transmitter 1403, causing transmitter 1403 to send a read request to address control 1404. Address control 1404 makes the transmit buffer read pointer available, allowing transmitter 1403 to read transmit buffer 1503 at the address specified by the read pointer. Transmitter 1403 makes a read request to address controller 1404, in order to read the packet from transmit buffer 1503. Once transmitter 1403 has read the packet, it removes the header information from the packet, which transforms the packet into a trunk packet. Transmitter 1403 then transmits the packet on the attached trunk.

Trunk test packets are received by receiver 1402 from the trunk. They are written into trunk test buffer 1502 in memory 1401, using the trunk test buffer write pointer in address control 1404. This operation is similar to the operation of the receive buffer write pointer. Transmitter 1403 then makes a read request to address control 1404, in order to read trunk test buffer 1502, using the trunk test buffer read pointer. Once transmitter 1403 has read the test packet, it transmits it back to the trunk. Switch test packets are processed in a similar manner. They are received by input circuit 1406, which writes them into switch test buffer 1504 in memory 1401, using the switch test buffer write pointer. Output circuit 1405 then reads switch test buffer 1504, using the switch test buffer read pointer in address control 1404. Once it has read the packet, it sends it to the specified trunk controller via the switch network.

Memory write packets are used to write information into memory 1401. This information includes the logical to physical address translations, which are written into logical translation table 1505. Memory write packets are originated by the central processor, and are sent to input circuit 1406, which writes part of the packet into switch test buffer 1504, and part of the packet into logical translation table 1505, both located in memory 1401. The portion of the memory write packet that is written into switch test buffer 1504 is written via the switch test buffer write pointer; the portion of the packet that is written into logical translation table 1505 is written via the second input circuit temporary pointer, both located in address control 1404. Output circuit 1405 then reads the information stored in switch test buffer 1504, and reads the logical translation information. It then assembles these two portions of data into a packet that is identical to the original memory write packet, and transmits this packet back to the central processor.

Memory read packets are originated by the central processor, and are used to allow the central to read portions of memory 1401. The incoming memory read packet contains the memory address, and the number of bytes to be read. Output circuit 1405 reads memory 1401 at the address specified in the packet, and inserts the number of bytes specified into the memory read packet. It then returns the packet (containing the requested data) to the central processor.

Trunk and switch packets are further described with respect to the fields contained in each of these two packet types. The actual packet manipulation and conversion details are described later. Trunk packets carry data and maintenance information between the trunk equipment and the trunk controllers. The format of a typical trunk packet is shown in FIG. 3. An explanation of the fields is given in the following paragraphs.

The flag field is a unique bit pattern (01111110) used to identify the beginning and end of a packet. The packet identifier (PID) field determines whether the packet is for signaling, testing, or the transmission of normal data. A "0" in the field indicates a signaling packet used for call set-up. As previously described, this packet is routed through all central processors along the path, in order to establish the path that all subsequent packets will take for the duration of the call.

A PID field of "1" indicates a signaling packet that sends signaling information over a path that has already been established. This packet type is read only at the terminating central office.

A PID field of "2" or "3" is a test packet, which is used to test a trunk in the network. The originating central processor sends a test packet to one of its trunk controllers, via the switching network. This packet is indicated by a PID field of "2". The packet is transmitted by the first trunk controller over the trunk to a second trunk controller. Since the PID field is a "2", the second trunk cntroller changes the field from a "2" to a "3" and loops the test packet back to the first trunk controller over the trunk. The first trunk controller receives the packet, and reads the PID field. Since the PID field is a "3", the first trunk controller returns the packet to the central processor.

A PID field of "8" through "11" identifies the packet as one carrying normal data. The ascending order of numbers indicates levels of flow control. An "8" indicates no flow control. The numbers "9" through "11" indicate increasing levels of flow control. When flow control increases, the originating office sends the packets out with a greater amount of time in between. This is to prevent system overload due to increased traffic.

A PID field of "12" indicates a datagram. This is a single packet that carries a complete message. A datagram is routed as follows. A datagram is created by the central processor associated with the terminal equipment sending the datagram. The datagram is then routed to each central processor in the network that the datagram passes through. Each central processor reads the logical address field of the datagram to determine the next central processor to which the datagram is sent. Once the datagram reaches the destination central processor, the destination central processor routes the datagram to the destination customer's terminal equipment. The address information is not retained because a path is not required to send additional packets.

The logical address field is used to derive the address of the destination trunk cntroller. This is done by the current trunk controller using the logical address to index logical translation table 1505 contained in memory 1401. Logical translation table 1505 contains the number of the next trunk controller and the new logical address. The current trunk controller inserts the new logical address into the packet's logical address field and then routes the packet. The time stamp field carries the accumulated time that it takes for the packet to travel through the switch system. This field is updated in conjunction with the arrival time field, which is inserted when the packet is first received from the trunk. When the destination trunk controller receives a packet, it calculates the difference between the arrival time and the present time, in order to update the time stamp field. The data field contains the actual data, or information, that the packet is to carry. In addition, this field carries certain high level protocol information. The cyclic redundancy code (CRC) field is used for error detection. This field is generated by the transmitting trunk controller, and tested by the destination trunk controller, in order to determine if the packet contains errors.

Switch packets carry data and maintenance information within the switching network. The format of a typical switch packet is shown in FIG. 6. A data type switch packet contains all the fields contained in a trunk packet, and in the same order. The one exception is the two flag fields, which are not contained in the switch packet. Also, the CRC field is recalculated and checked at several stages of the transformation process from trunk packets to switch packets. An explanation of the fields unique to switch packets is provided in the following paragraphs.

The packet length field is the total length of the packet, in bytes. This field is computed by receiver 1402. The destination trunk controller (DTC) and source trunk controller (STC) fields are used for packet routing. The DTC is the address of the destination trunk controller and is obtained from logical translation table 1505. The STC field is the address of the trunk controller that is presently handling the packet.

As given in the following Table 1, the control field, CNTL, defines the type of switch packet.

TABLE 1

| CNTL | SWITCH PACKET TYPE EXPLANATION |
|---|---|
| 0 | Standard data packet |
| 1 | Maintenance read packet |
| 2 | Maintenance write packet |
| 3 | Memory read packet |
| 4 | Memory write packet |
| 5 | Test packet-routed to first trunk controller |
| 6 | Test packet-routed to second trunk controller |

Standard data packets carry the information contained in data type trunk packets (packet identifier of "8", "9", "10", or "11"), as well as signaling and datagram packets (packet identifier of "0", "1", or "12") through the switch network. These packets are transformed back to trunk packets by the next trunk controller in the network, and then transferred back to switch packets, as required, for transmission through subsequent switch networks. Maintenance information is transmitted through the system with maintenance write and maintenance read packets. These packets give the central processor the ability to read and write maintenance information into the trunk controller. This maintenance information includes error and control information. A maintenance write packet is generated by the central processor and is sent to the appropriate trunk controller. Once this packet arrives at the trunk controller, the trunk controller examines the control field, determines that it is a "2" (indicating a maintenance write) and writes the data portion of the packet into maintenance register 3101 in switch interface 1418.

When the trunk controller receives a switch packet with at "1" in the control field, it performs a maintenance read operation. The data in the maintenance register is read, and stored in the data portion of a packet. The packet is then transmitted to the originating central processor.

Switch packets are also used to read and write the memory portion of the trunk controller. In a memory write operation, the switch packet's control field is a "3". Input circuit 1406 receives the packet from the central processor, writes the data portion into the requested location in memory 1401, and writes the rest of the packet into switch test buffer 1504. Output circuit 1405 reads the data from the specified location in memory 1401, and reads the remainder of the packet from switch test buffer 1504. It then assembles a new packet from these two segments, and transmits the new packet back to central processor 115 via switching network 116.

A test packet is a type of switch packet that can route test data through two trunk controllers, before routing the packet back to the central processor. When the test packet arrives at the first trunk controller, the control field is set to "5". This indicates that the packet is to be routed to a second trunk controller before being returned to the central processor. Before leaving the first trunk controller, output circuit 1405 changes the control field from a "5" to a "6", and then sends the packet to the second trunk controller. The address of the second trunk controller is specified in the data field. After the second trunk controller receives the test packet, it reads the control field. Since the field is a "6", the second trunk controller routes the packet directly to the central processor.

The main function of receiver 1402 is to convert trunk packets, received from the trunk side of the network, into switch packets, which are then transmitted through the switching part of the network. The conversion consists of (1) removing the start and end flag fields, and (2) adding fields at the beginning of the packet. The transformation also requires that the CRC field be recalculated. The added fields are as follows. The first two added fields, destination trunk controller and source trunk controller are filled with zeroes. The actual source and destination trunk controller values are added by output circuit 1405 after it reads the packet from receive buffer 1501. The next added field is the control field. The last added field is the arrival time field. This field is filled in with the actual time that the packet arrives at receiver 1402, and is used by the destination trunk controller to update the time stamp field.

During packet conversion, the destination trunk controller, source trunk controller and control fields are initialized to zero. The arrival time field is initialized to the arrival time of the packet (expressed as a negative number). The packet identifier field is unchanged, with one exception: if the packet identifier field of the incoming packet is a "2", indicating a test packet, it is changed to a "3", indicating a trunk packet that is returning. As already mentioned, the CRC field is updated; however, the updating process has this complication: The CRC field is computed as though the packet length field contained all zeros, and the actual length of the packet was contained in a separate field between the data and CRC fields. The reason for this is because the length of the packet is being computed as the packet comes in, and is not known until the entire packet is received.

Figure 16:
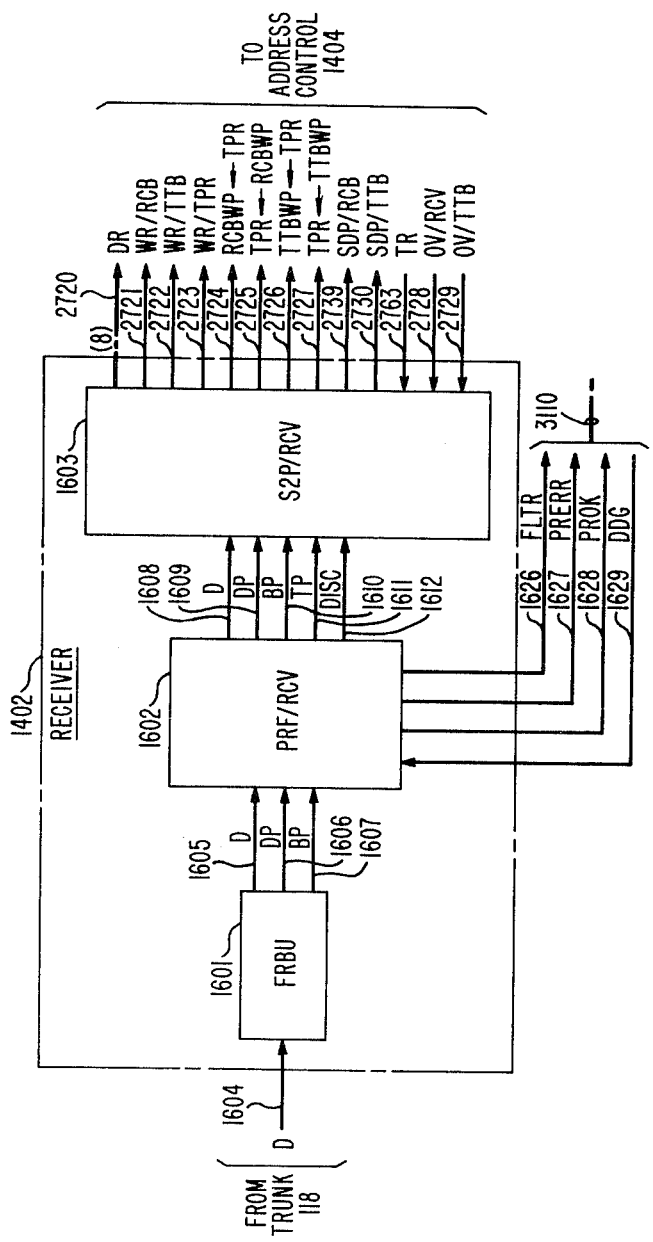
FIGS. 16 through 26 are detailed block diagrams of subsystems which comprise receiver 1402 of trunk controller 131.

Receiver 1402 is shown in greater detail in FIG. 16. Receiver 1402 comprises flag removal and bit unstuffing circuit 1601, packet reformatter 1602, and serial to parallel converter 1603. Flag removal and bit unstuffing circuit 1601 removes the 01111110 flag pattern at the beginning and end of the trunk packet. Additionally, this circuit removes bits that were stuffed into the bit stream by transmitter 1403. This process is explained later. Packet reformatter 1602 adds zeroes to the packet. These zeroes serve as place holders for the fields added during the packet transformation. In addition, this circuit fills in the arrival time of the packet, and updates the packet identifier field, as required.

The trunk packets are received by flag removal and bit unstuffing circuit 1601 on conductor 1604. This circuit detects the start and end points of each packet by detecting the presence of the start and stop flags contained in the packet. Once the flags are detected, they are removed. In addition, this circuit performs bit unstuffing. Bit unstuffing is the removal of bits that were placed in the bit stream to ensure that the flag pattern does not occur at any place other than the start and end of the packet.

Flag removal and bit unstuffing circuit 1601 sends the packets to packet reformatter 1602 via conductor 1605. A signal is placed on conductor 1606 when the packet first arrives at packet reformatter 1602. This signal remains as long as the packet is being processed. A similar signal is present on conductor 1609 during the time that the packet is being transferred from packet reformatter 1602 to serial to parallel converter 1603. A "1" is placed on conductor 1607 during every clock pulse that conductor 1605 contains data. Packet reformatter 1602 receives the trunk packet from 1601 and adds the appropriate fields to allow the forming of a switch packet. In addition, this circuit performs error detection, and modifies the PID field as required.

Error detection is done by checking the CRC field of each incoming packet. If an error is detected, 1602 transmits an error signal to 1603 vvia conductor 1612, which causes the packet containing the error to be aborted. Packet reformatter 1602 also detects hardware errors. If a hardware error is found, it is indicated by a signal on conductor 1626.

The PID field modification performed by 1602 is with respect to trunk test packets. An incoming test packet has a PID of "2"; 1602 changes the field to a "3". Additionally, when a test packet is received, 1602 causes conductor 1611 to go high. This causes serial to parallel converter 1603 to write the contents of the test packet into trunk test buffer 1502. Packet reformatter 1602 is fully duplicated and thus is capable of doing fault detection of itself.

Figure 17:
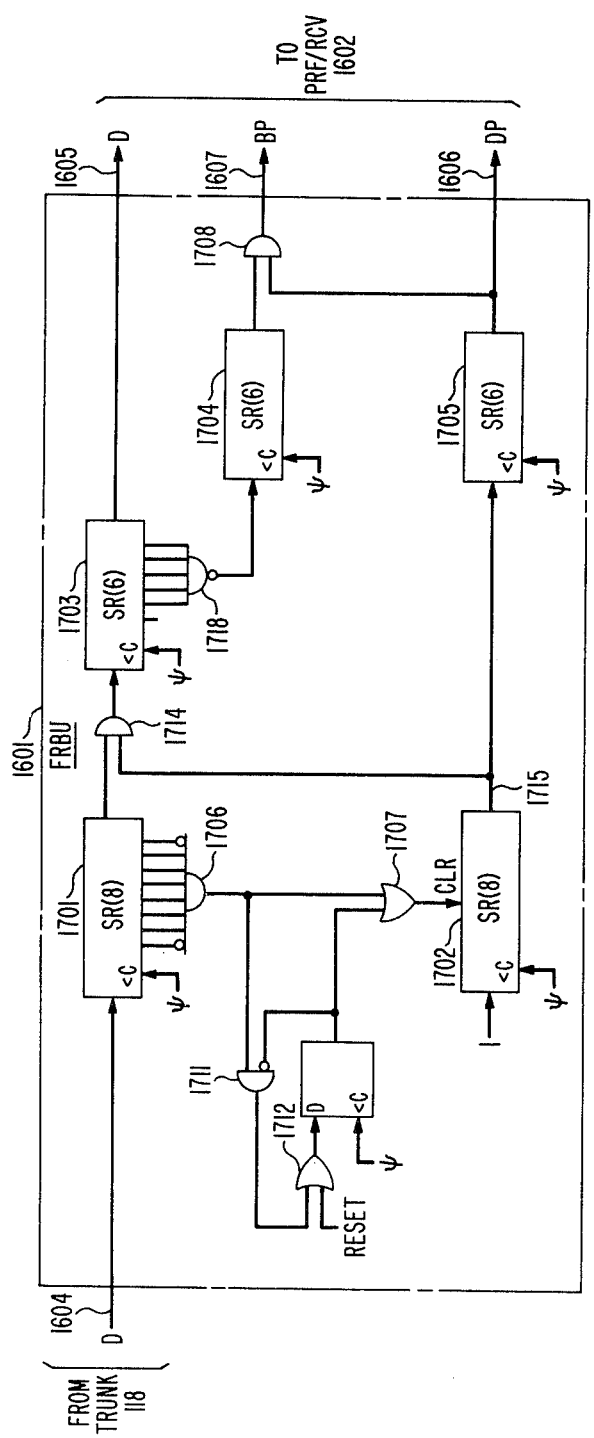

Flag removal and bit unstuffing circuit 1601 is shown in greater detail in FIG. 17. This cirucit does flag removal and bit unstuffing. Flag removal is performed as follows. A flag pattern of 01111110 is continuously sent over conductor 1604 whenever the trunk is idle. This 8-bit pattern is read into register 1701. At the same time that register 1701 is receiving the bit pattern, register 1702 is receiving a steady stream of "1's" at the same bit rate. After a complete 8-bit flag pattern is received, register 1702 is cleared via a "1" on the output of AND gate 1706, which decodes the presence of the flag pattern. This prevents the "1's", which are being clocked into register 1702, from being sent out of register 1702. The "1's" coming out of register 1702 are routed to AND gate 1714 and register 1705. When "1's" are present, actual data is allowed to flow out of register 1701, and conductor 1607 is activated to signal this actual data.

After a flag pattern from an actual packet is clocked into register 1701, the subsequent bits are actual packet contents rather than the flag pattern. After eight bits of actual data have been clocked into register 1701, AND gate 1706 does not clear register 1702 because the AND gate is not detecting the flag pattern. This causes register 1702 to send a continuous stream of "1's" to one input of AND gate 1714. The other input of AND gate 1714 is receiving the actual packet contents from register 1701. AND gate 1714 is thus enabled by the "1's" coming out of register 1702. Because of the enable signal, the contents of register 1701 are allowed to be shifted into register 1703. Thus, the output of AND gate 1714 is "1" only when the actual packet contents contain a "1". In this way, the packet contents minus the flags are shifted through register 1703 and are sent to packet reformatter 1602 via conductor 1710.

Bit unstuffing is required because whenever transmitter 1403 detects five sequential "1's", it always stuffs a "0". This is so that the packet data never contains the flag pattern. These stuffed zeros are removed by flag removal and bit unstuffing circuit 1601 after the flags have been removed. Bit unstuffing is done as follows. The packet data coming out of AND gate 1714 still contains the stuffed "0's". If a pattern of 11111 is clocked into register 1703, the next bit has to be a stuffed bit, which must be removed. This 11111 pattern causes the output of NAND gate 1718 to go to "0" during the one bit time that the stuffed "0" is in the first position of register 1703. This "0" is shifted through register 1704 at the same time that the actual packet data is shifted through register 1703. When the "0" in register 1704 reaches the input of AND gate 1708, conductor 1606 goes to "0" for that one clock pulse that the stuffed "0" is present in register 1703. Conductor 1606 is the bit present indicator, which is passed to packet reformatter 1602. Since the bit present signal is absent for any clock pulse that a stuffed "0" is contained in register 1703, the stuffed "0" is removed.

Figure 18:
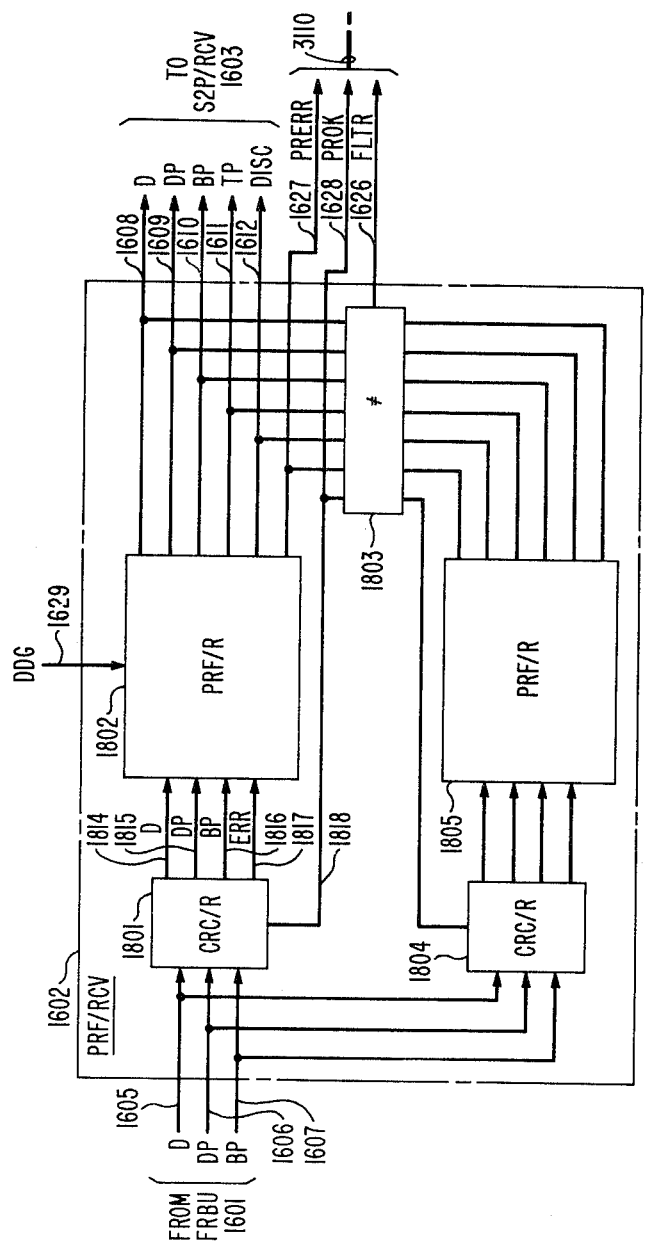

Packet reformatter 1602 is shown in greater detail in FIG. 18. This circuit performs the actual packet transformation. This circuit comprises CRC circuits 1801 and 1804, packet reformat circuits 1802 and 1805, and comparator 1803. The CRC and packet reformat circuits are duplicated because during the reformatting process the CRC check cannot accurately detect errors within the circuit. The CRC circuits check the CRC field of the incoming packet and then remove it. The packet reformat circuits do the actual packet transformations and calculate the new CRC field. Comparator 1803 compares the reformatted packets from packet reformat circuits 1802 and 1805. If the packets do not match, a fault is present in the packet, and is indicated by a FLTR signal on conductor 1626. This FLTR signal is sent to switch interface 1418, and then to the central processor, which then takes corrective action.

Figure 19:
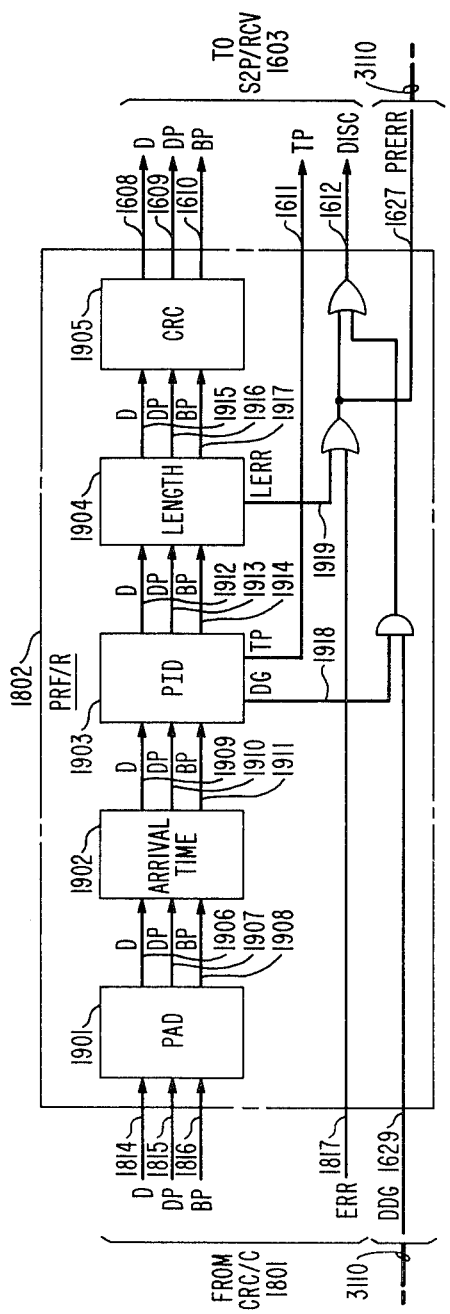

Packet reformat circuit 1802 is shown in greater detail in FIG. 19. This circuit comprises pad circuit 1901, which adds blank fields to the incoming trunk packet to be used to form a switch packet by later circuits; arrival time circuit 1902, which calculates and fills in the packet arrival time; PID circuit 1903, which updates the PID field if required; length circuit 1904, which calculates and fills in the packet length; and CRC circuit 1905, which calculates the CRC field of the packet.

Figure 20:
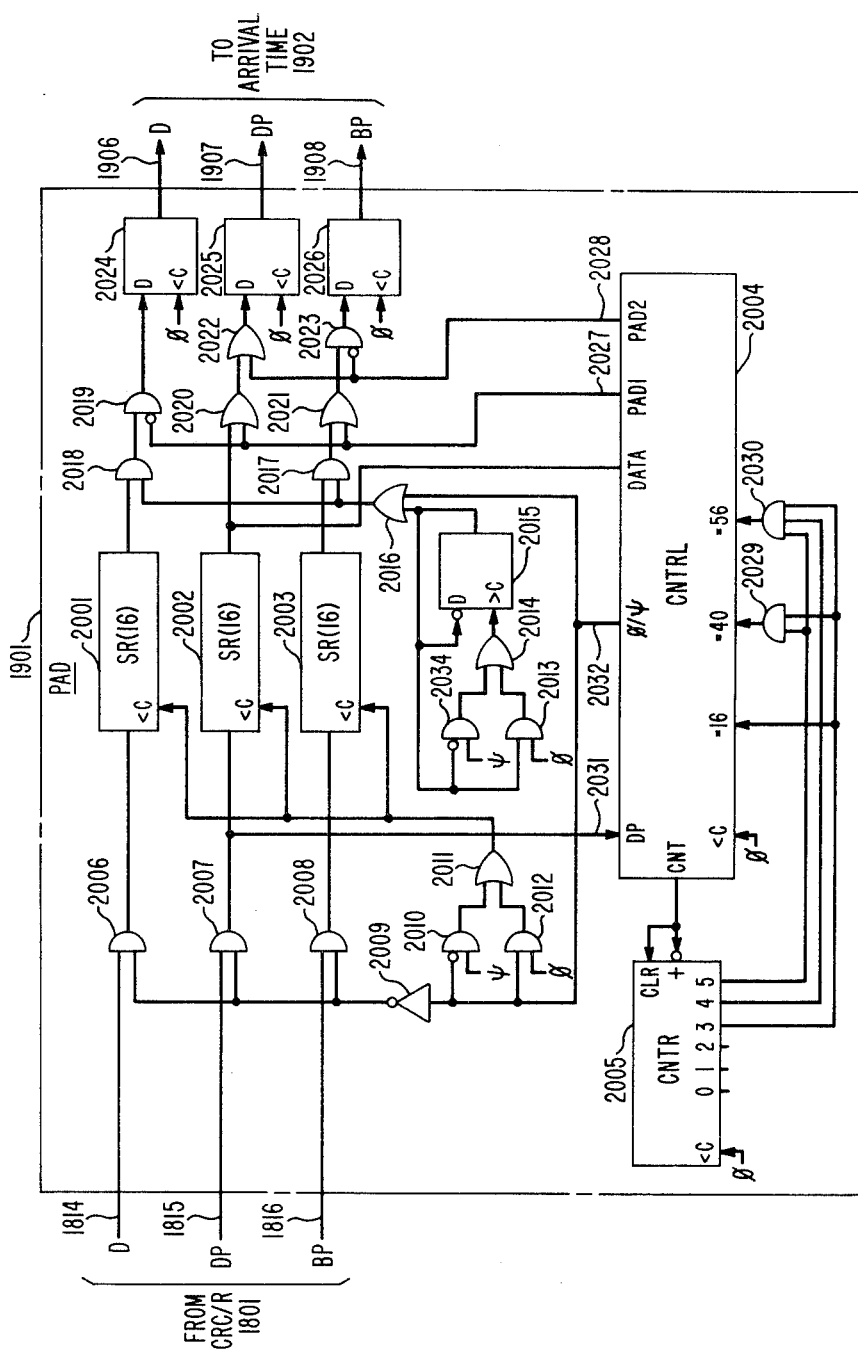
Figure 54:
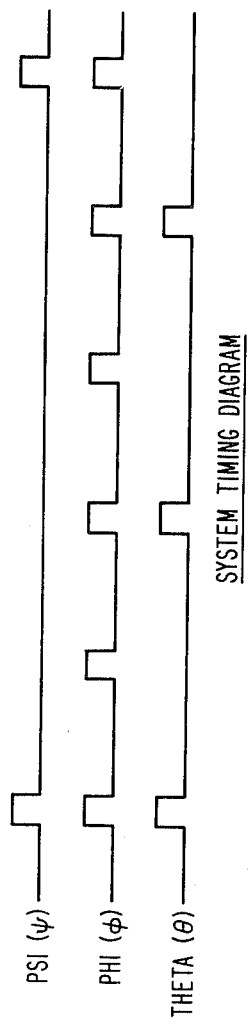
FIG. 54 is a timing diagram.
Figure 55:
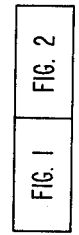
FIG. 55 shows the manner in which certain of the figures should be arranged to show the specific illustrative embodiment of the invention.

Pad circuit 1901 is shown in greater detail in FIG. 20. This circuit pads 56 zeroes at the beginning of the incoming packet, and pads 24 zeroes at the end of the packet. These zeroes serve as place holders for the fields that are added by the succeeding circuits. Pad circuit 1901 receives both psi and phi clock pulses from system clock 161. The phi pulses are five times faster than the psi pulses, as shown in FIG. 54. The phi clock pulses are required to place the zeroes at the beginning of the packet.

Pad circuit 1901 receives data, data present, and bit present signals on conductors 1814, 1815, and 1816. These signals pass through operated AND gates 2006 through 2008, and are shifted into registers 2001 through 2003. Registers 2001 though 2003 shift data through at the psi clock rate through operated AND gate 2010 and OR gate 2011. The first pulse on conductor 1815 activates control 2004 via conductor 2031. When control 2004 is activated, it activates counter 2005, and pad conductor 2027. Conductor 2027 pads 56 zeroes to the beginning of the packet via AND gate 2019 and flip-flop flop 2024. Counter 2005 counts the clock pulses and signals control 2004 via AND gate 2030 to disable conductor 2027 after 56 pulses. The zeroes are padded at the phi clock rate; this allows the zeroes to be padded at the beginning of the packet before the actual packet data is shifted out of register 2001. When the data, data present and bit present signals are shifted out of registers 2001 through 2003 they are converted from 1.544 to 8 Mb/s, via gates 2013, 2014, 2016, and 2034, and flip-flop 2015. When the last 16 bits of the packet are in register 2001 (signaled by conductor 2031 being disabled), control 2004 activates conductor 2032. This causes the last 16 bits in registers 2001 through 2003 to be shifted through at the phi clock rate, via operated AND gate 2012 and OR gate 2011. Additionally, this signal disables AND gates 2006 through 2008, via inverter 2009. The purpose of this is to prevent the next packet from being shifted into pad circuit 1901 until the existing packet is shifted through. After the end of the packet is shifted out of register 2001, control 2004 enables conductor 2027 for 24 clock pulses, causing 24 zeroes to be padded to the end of the packet.

Figure 21:
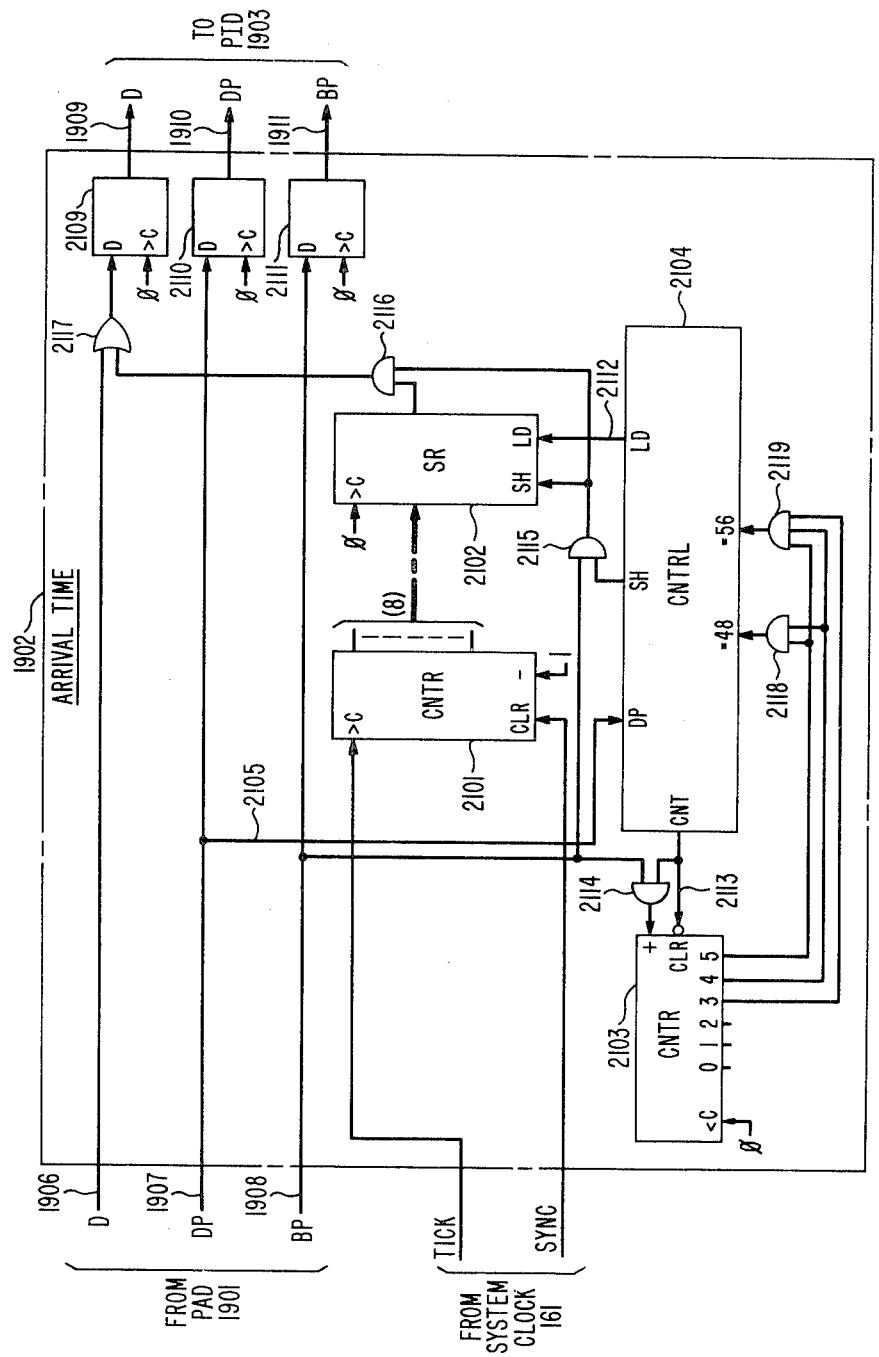

Arrival time circuit 1902 is shown in greater detail in FIG. 21. This circuit places the arrival time of the packet into the arrival time field. The arrival time is calculated as a negative, rather than positive, value. By running the clock in reverse, the arrival time can be added to the present time, avoiding the need to complement, as described later in the description of transmitter 1403. Arrival time circuit 1902 comprises counters 2101 and 2103, shift register 2102, control 2104, and flip-flops 2109 through 2111. Counter 2101 maintains the current time through external tick and sync pulses from system clock 161. Counter 2103 counts the number of bits in the incoming packet in order to determine where the arrival time field is. When a packet arrives, it is indicated by a signal on conductor 1907; this signal is sent to control 2104 via conductor 2105. When control 2104 receives this data present signal, it signals counter 2103, via conductor 2113, to begin counting incoming bits. Additionally, control 2104 places a signal on conductor 2112. This signal causes the contents of counter 2101 to be loaded into shift register 2102. The effect of this is to load the arrival time of the packet into shift register 2102. The arrival time field is in bit positions 48 through 55 of the packet. This field had been previously filled with zeroes by pad circuit 1901. When counter 2103 reaches 48, it signals control 2104 via AND gate 2118. Control 2104 then places a signal on the input of AND gate 2115, causing AND gate 2115 to operate. When AND gate 2115 operates, it causes shift register 2102 to shift its contents out to flip-flop 2109, via AND gate 2116 and OR gate 2117. Flip-flops 2109 through 2111 then transmit the information received on their D inputs onto conductors 1909 through 1911, at the phi clcok rate.

Figure 22:
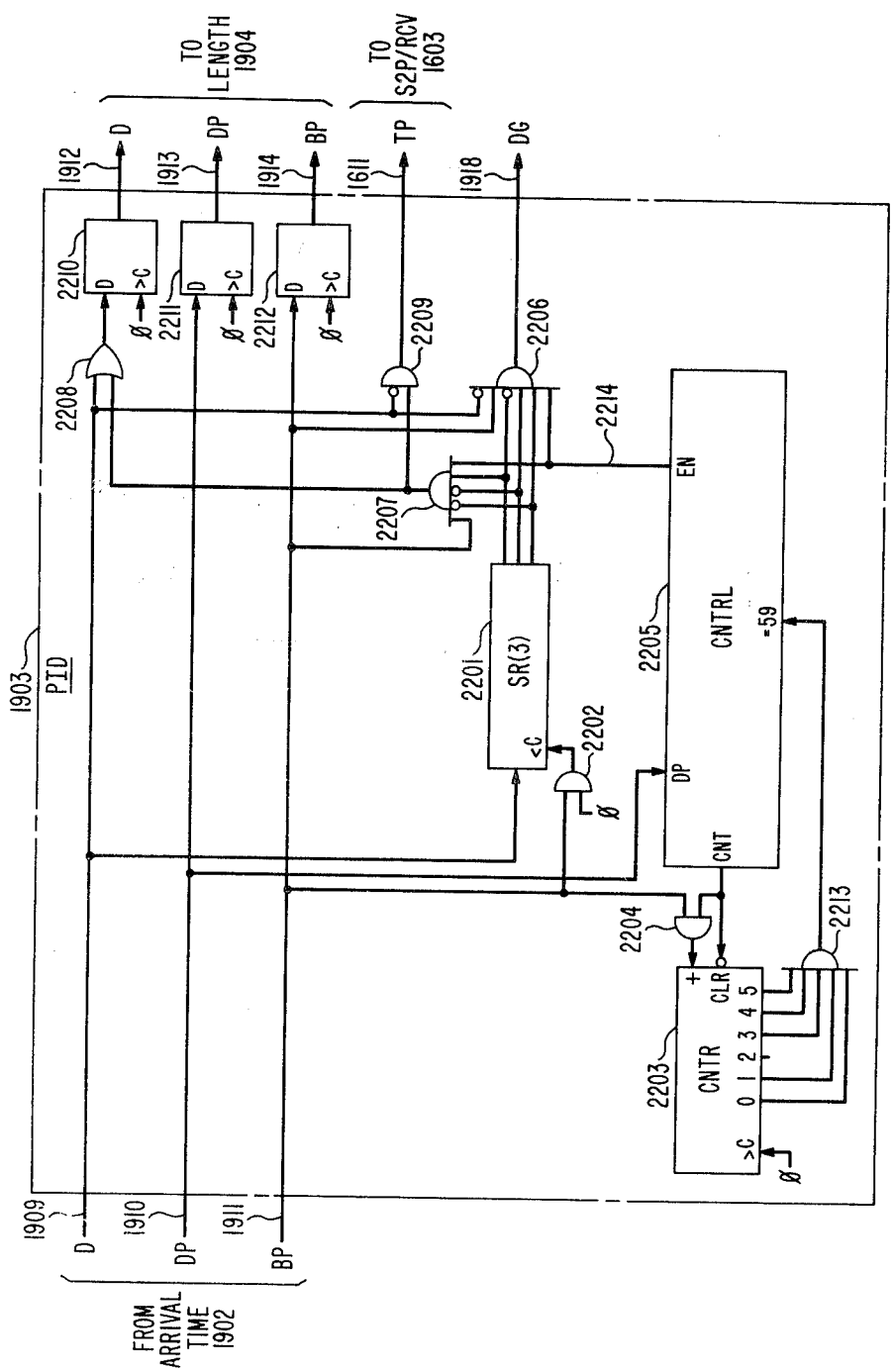

PID circuit 1903 is shown in greater detail in FIG. 22. PID circuit 1903 reads the PID field of incoming packets and determines the packet type. If the incoming packet is a datagram, a signal is placed on conductor 1918. If the incoming packet is a test packet, a "3" is placed in the PID field, and a signal is placed on conductor 1611. An incoming packet arrives on conductor 1909. Conductor 1910 receives a steady stream of "1's" as long as the packet is being received. Conductor 1911 receives a "1" during each bit time that a valid bit is present on conductor 1909. The first "1" on conductor 1910 causes counter 2203 to count valid data bits by counting the bits on conductor 1911, through AND gate 2204. When counter 2203 reaches 59, it operates AND gate 2213, which signals control 2205. Control 2205 then places an enable signal on conductor 2214. During this 59th bit time, the least significant bit of the PID field is on conductor 1909, and the three most significant bits of the PID field are stored in shift register 2201. The data on conductor 1909 and in shift register 2201 operates either AND gate 2207 or 2206. If the data is a binary "12", indicating a datagram, AND gate 2206 operates, causing a signal to be placed on conductor 1918. If the data on conductor 1909 and in shift register 2201 are a binary "2" or "3" indicating a test packet, AND gate 2207 operates, causing a "3" to be placed in the packet identifier field. If the data on conductor 1909 and in shift register 2201 are a binary "2", AND gate 2209 is also operated, resulting in the packet being stored in trunk test buffer 1502. Flip-flops 2210 through 2212 keep the output data on conductors 1912 through 1914 in sync, via clock pulses from system clock 161.

Figure 23:
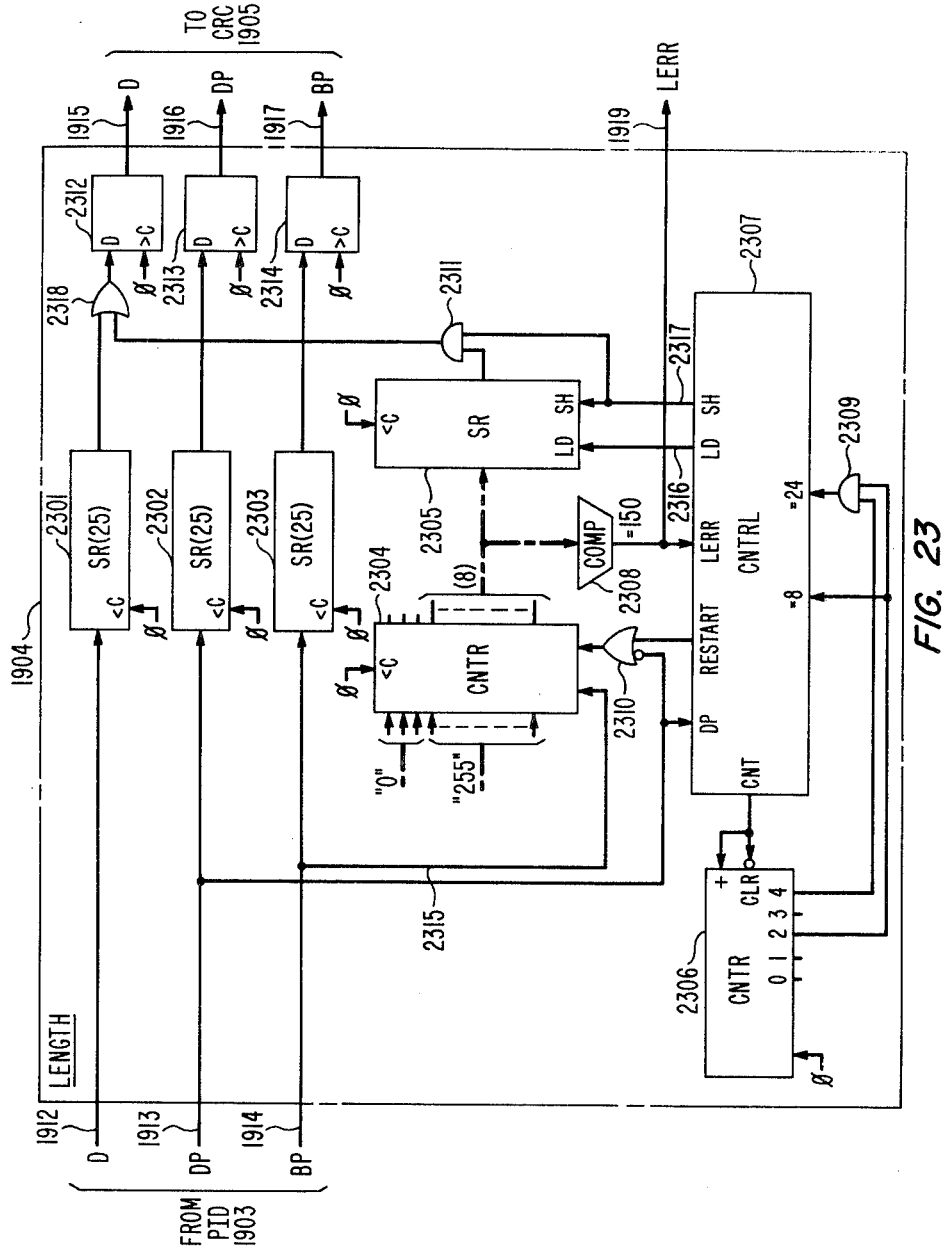

Length circuit 1904 is shown in greater detail in FIG. 23. Length circuit 1904 counts the number of bytes in incoming packets, and places the byte count at the end of the packet. Additionally, length circuit 1904 places a length error signal on conductor 1919 if the packet received exceeds 150 bytes. Incoming data, data present indication, and bit present indications are received on conductors 1912 through 1914, and are shifted into shift registers 2301 through 2303. When data first appears on conductor 1912, "1's" also appear on conductor 1913, indicating that data is present. The first "1" on conductor 1913 causes control 2307 to start counter 2304, via OR gate 2310. Counter 2304 counts the incoming bit present signals on conductor 2315, in order to determine the number of bytes in the packet. When conductor 1913 goes to "0", the entire packet has been counted by counter 2304. The "0" on conductor 1913 causes the contents of counter 2304 to be loaded into shift register 2305. This is done by control 2307 placing a load signal on conductor 2316. One bit time later control 2307 enables shift conductor 2317, causing the contents of shift register 2305 (that is, the byte count) to be shifted into the packet through AND gate 2311 and OR gate 2318. This places the length count of the packet at the end of the packet. When control 2307 enables shift conductor 2317, it also enables counter 2306. When counter 2306 reaches eight, it signals control 2307, which disables shift conductor 2317. When counter 2306 reaches 24, the entire packet has been shifted through length circuit 1904. Packets longer than 150 bytes exceed the maximum packet length. These excessively long packets are detected by comparator 2308, which indicates them by placing a signal on length error conductor 1919. This length error indication causes the packets to be discarded. Flip-flops 2312 through 2314 perform the same function as flip flops 2210 through 2212 in PID circuit 1903.

Figure 24:
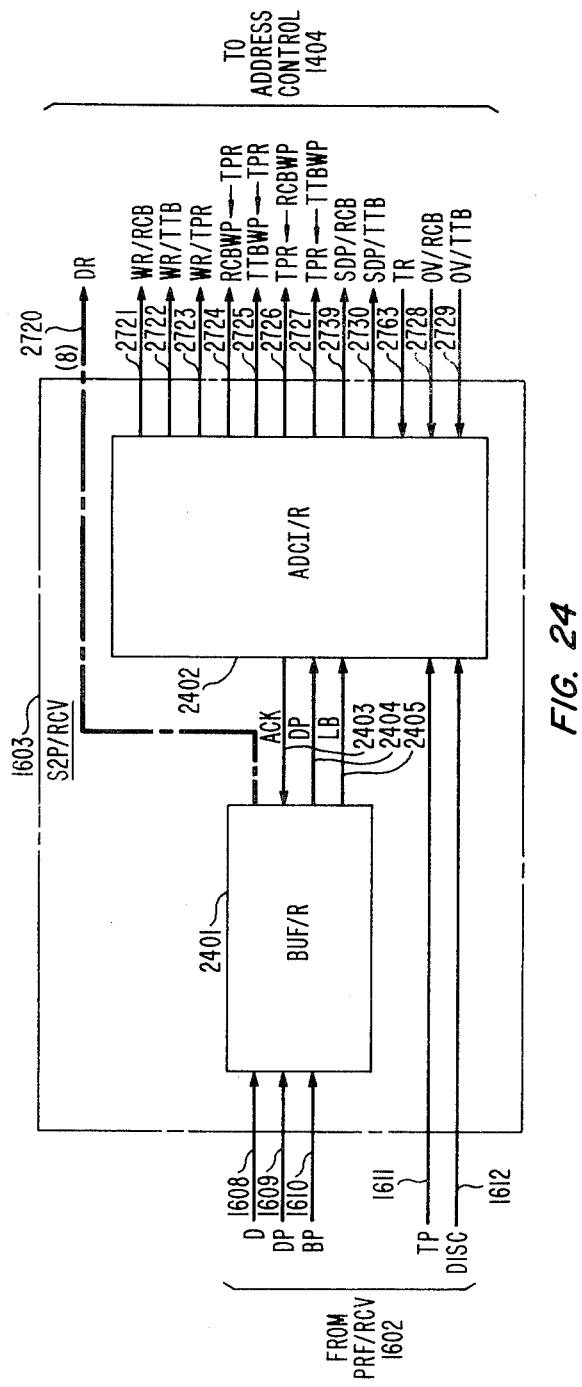

Serial to parallel converter circuit 1603 is shown in greater detail in FIG. 24. Serial to parallel converter 1603 comprises buffer 2401 and address control interface 2402. Buffer 2401 receives data, data present and bit present indications from packet reformatter 1602. Buffer 2401 transforms the incoming data into bytes, and sends the bytes to address control 1404 via cable 2720. Address control interface 2402 signals where the information on cable 2720 is to be written by signals on conductors 2721 through 2727. Conductors 2721 through 2723 are write commands for receive buffer 1501, trunk test buffer 1502, and the temporary pointer, respectively. Conductors 2726 and 2727 set the temporary pointer equal to either the receive buffer or trunk test buffer write pointers, and conductors 2724 and 2725 set the receive buffer or trunk test buffer write pointers equal to the temporary pointer.

Figure 25:
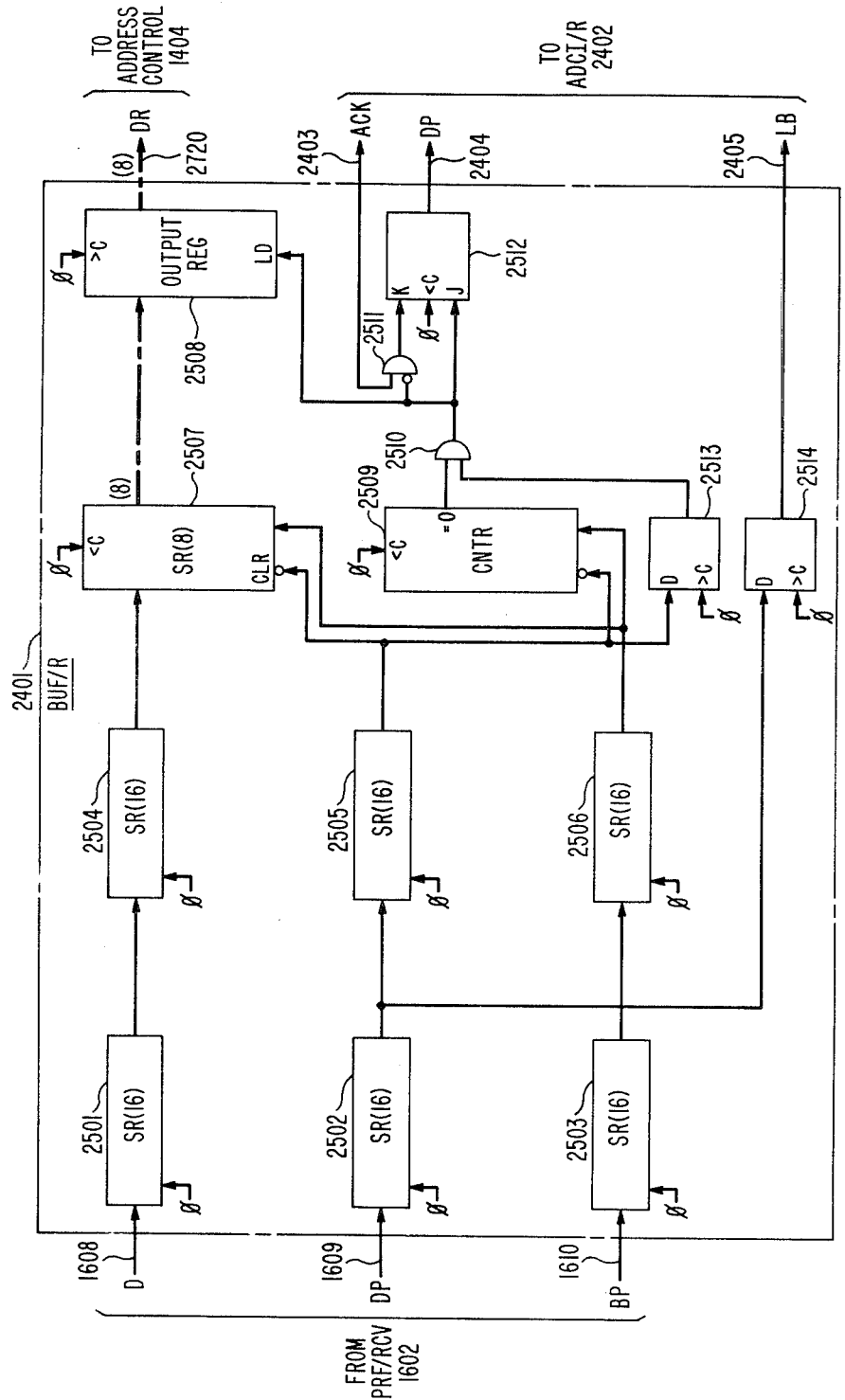

Buffer 2401 is shown in greater detail in FIG. 25. Buffer 2401 performs the actual serial to parallel conversion. Incoming data, data present indications, and bit present indications are received on conductors 1608, 1609, and 1610. The incoming data is buffered by shift registers 2501 and 2504, the data present indication is buffered by shift registers 2502 and 2505, and the bit present indications are buffered by shift registers 2503 and 2506. As data bits are shifted through register 2504, they are assembled into bytes by shift register 2507. Counter 2509 counts the incoming bit present signals to determine when a complete byte has been assembled. When a byte has been assembled, the byte is loaded into output register 2508, via a signal from AND gate 2510. Additionally, AND gates 2510 and 2511 set flip-flop 2512, which puts a data present signal on conductor 2404. This data present signal is an indication to address control interface 2402 that a byte is ready to be sent. After the byte has been sent, address control interface 2402 places a signal on conductor 2403 to acknowledge receipt of the byte. This signal resets flip-flop 2512.

Figure 26:
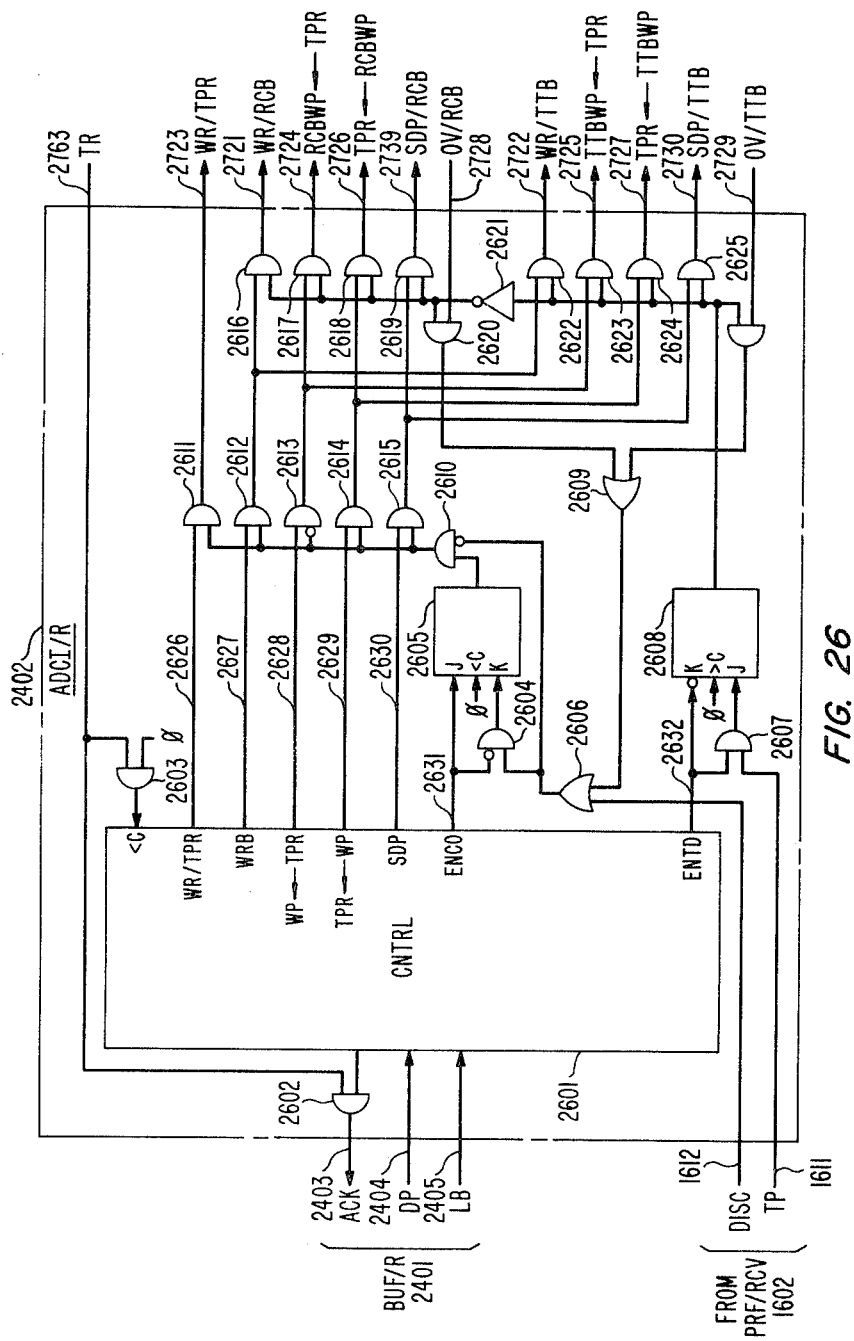

Address control interface 2402 is shown in greater detail in FIG. 26. Address control interface 2402 controls the writing of receive buffer 1501 and trunk test buffer 1502, located in memory 1401. Flip-flop 2605 controls the discarding of packets that contain errors, or that must be discarded because a buffer has overflowed. Flip-flop 2608 selects whether data will be written into receive buffer 1501 or trunk test buffer 1502. Buffer 2401 indicates that is has assembled a byte by placing a signal on conductor 2404. This signal causes control 2601 to set flip-flop 2605 to 37 1", via a signal on conductor 2631. When flip-flop 2605 is set to "1", AND gate 2610 operates, which operates AND gates 2611, 2612, 2614, and 2615. If buffer 2401 is transmitting a test packet, packet reformatter 1602 places a signal on conductor 1611. This signal sets flip-flop 2608, which causes AND gates 2622 through 2625 to operate. This action causes the packets to be written into trunk test buffer 1502. If the packet in buffer 2401 is not a test packet, flip-flop 2608 is reset to "0". This operates AND gates 2616 through 2619, via inverter 2621. When these AND gates operate, packets are written into receive buffer 1501.

Figure 27:
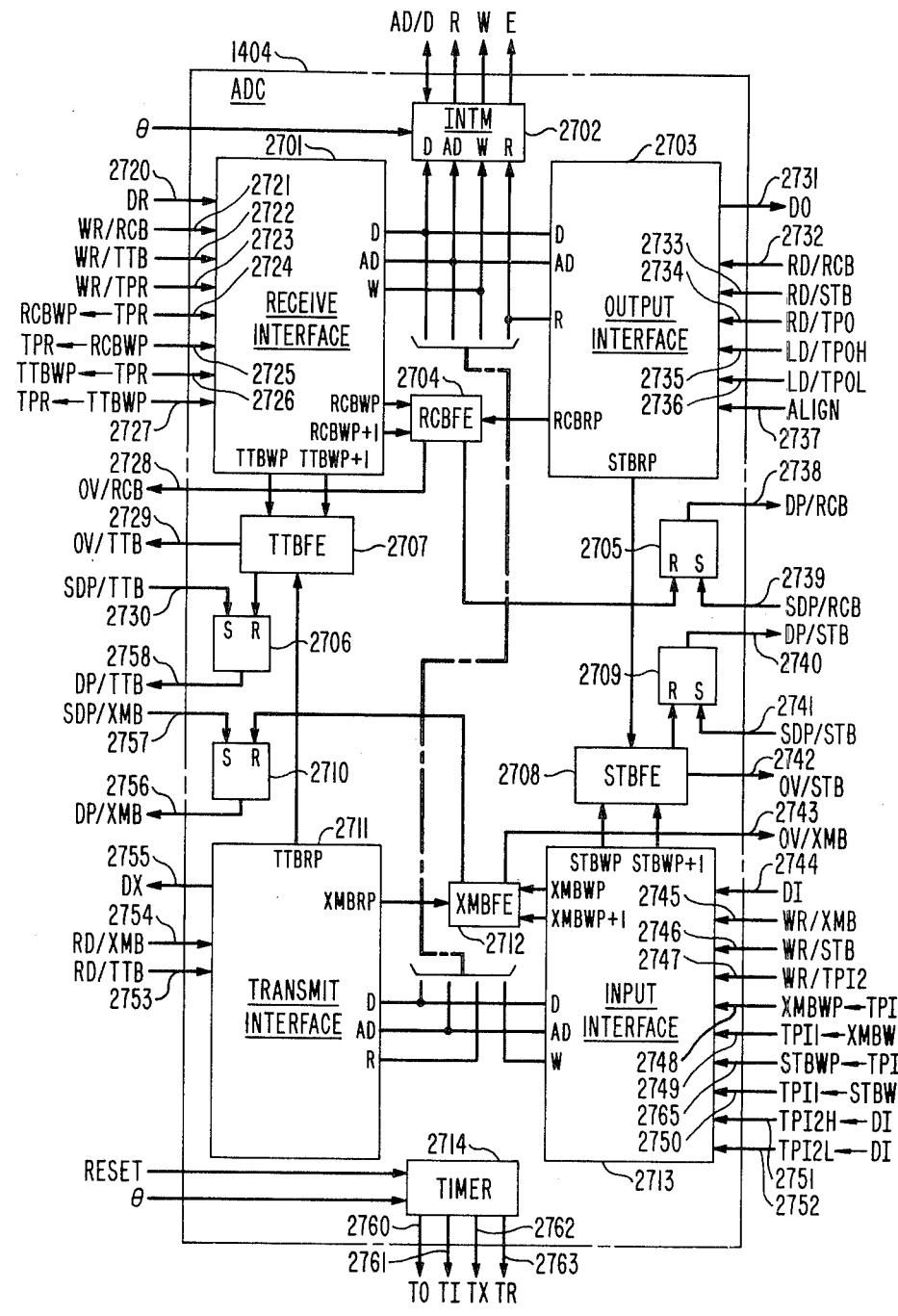
FIG. 27 is a detailed block diagram of address control 1404 of trunk controller 131.
Figure 28:
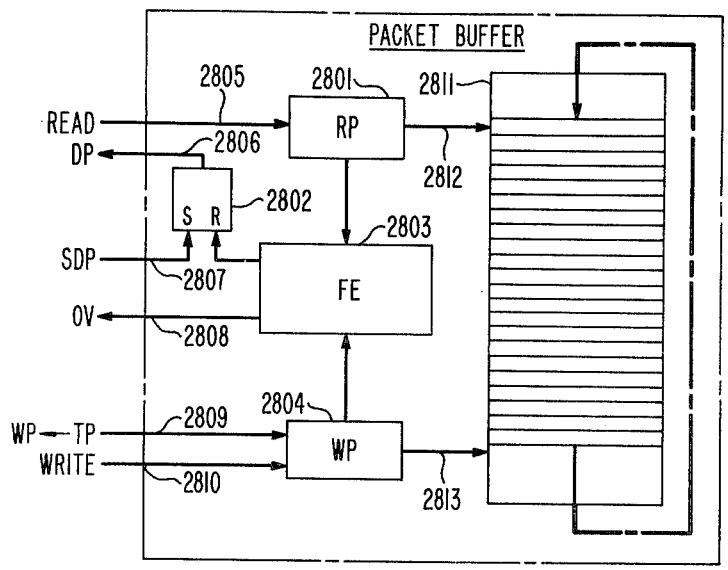
FIG. 28 illustrates the logical operation of address control 1404 in relationship to memory 1401.

Address control 1404 is shown in greater detail in FIG. 27. Address control 1404 is used to allow transmitter 1403, receiver 1402, input circuit 1406 and output circuit 1405 to read and write the appropriate portions of memory 1401. Address control 1404 consists of receive interface 2701, output interface 2703, transmit interface 2711, input interface 2713, and memory interface 2702. Additionally, the circuit contains full/empty circuits 2704, 2707, 2708, and 2712; as well as flip-flops 2705, 2706, 2709, and 2710. Timer 2714 controls when receiver 1402, transmitter 1403, output circuit 1405 and input circuit 1406 can access the buffers in memory 1401, by sequentially enabling conductors 2760 through 2763. The full/empty circuits are used to detect buffer overflow and empty conditions; the flip-flops are used to indicate when data is present in the respective buffers. Address control 1402 operates at the theta clock rate from system clock 161.

Receive interface 2701 receives write requests from receiver 1402 on conductors 2721 through 2727; it receives the data from receiver 1402 on cable 2720. Receive interface 2701 responds to these write requests by making either the receive buffer write pointer, trunk test buffer write pointer, or temporary pointer available for writing the data into memory 1401. For example, a signal on conductor 2722 causes receive interface 2701 to write the data into receive buffer 1501, at the address pointed to by the receive buffer write pointer. After the data has been written, the receive buffer write pointer is incremented; this new address and the address plus one are sent to receive buffer full/empty circuit 2704. When receive buffer full/empty circuit 2704 detects that receive buffer 1501 is empty, it resets flip-flop 2705, causing the data present signal to be removed from conductor 2738. If receive buffer full/empty circuit 2704 detects that receive buffer 1501 is overfilled, it sends an overload in receive buffer indication on conductor 2728. A signal on conductor 2722 causes the data on cable 2720 to be written into trunk test buffer 1502. The circuit action is similar to that of writing receive buffer 1501, except that trunk test buffer full/empty circuit 2707 resets flip-flop 2706 when trunk test buffer 1502 is empty, and it indicates that trunk buffer 1502 is overfilled via a signal on conductor 2729.

The temporary pointer is used for writing the packet length into the length field, and for aborting packets that contain errors. The temporary pointer must be used to write the length because the length field is at the beginning of the packet, and the actual length of the packet is not known until most of the packet has been written into the buffer. The actual length is inserted into the packet in the following manner. The temporary pointer is set equal to the write pointer, and the write pointer starts to write the packet into the buffer. When the packet length (which had been placed near the end of the packet) is ready to be written, it is written using the temporary pointer. Since the temporary pointer had been set equal to the write pointer, it is pointing to the location of the length field. In this way, the actual packet length is written into the length field of the packet.

If an error is detected in the packet, the packet is aborted. This is accomplished by receiver 1402 pulsing conductor 2724, which directs receive interface 2701 to set the write pointer for the receive buffer equal to the temporary pointer.

Output interface 2703 receives read requests from output circuit 1405 via conductors 2732 through 2736. Output interface 2703 responds to these read requests by making the appropriate pointer available to read data from memory 1401. For example, a signal on conductor 2732 causes output interface 2703 to read the data from receive buffer 1501 at the address pointed to by the receive buffer read pointer. A signal on conductor 2733 causes output interface 2703 to read switch test buffer 1504 at the address pointed to by the switch test buffer read pointer. Once output interface 2703 has read the data, it forwards the data to output circuit 1405 via cable 2731.

Overflow conditions are detected by receive buffer full/empty circuit 2704. This is done by 2704 comparing the read pointer against the write pointer plus one. If these two are equal, it indicates that an overflow will occur if the receiver attempts to write another byte into receive buffer 1501.

The operation of input interface 2713 is similar to receive interface 2701. Incoming data is received from input circuit 1406 via cable 2744, and is written into either transmit buffer 1503 or switch test buffer 1504. The write requests from input circuit 1406 are via conductors 2745 through 2752, and conductor 2765. Switch test buffer full/empty circuit 2708 and transmit buffer full/empty circuit 2712 receive write pointer addresses from input interface 2713, in order to maintain the full-/empty status of switch test buffer 1504 and transmit buffer 1503. These full/empty circuits reset flip-flops 2709 and 2710, and send buffer overfilled conditions via conductors 2742 and 2743. The operation of transmit interface 2711 is similar to output interface 2703. Data is read from either transmit buffer 1503 or trunk test buffer 1502 in memory 1401. Once the data has been read, it is sent to transmitter 1403 via cable 2755. Read requests are received from transmitter 1403 via conductors 2753 and 2754. Transmit interface 2711 contains no temporary pointers.

Memory 1401 contains the following circular buffers: receive buffer 1501, trunk test buffer 1502, transmit buffer 1503, and switch test buffer 1504. A circular buffer is shown in detail in FIG. 28. Circular buffers allow read pointer 2801 and write pointer 2804 to continuously read and write the same portion of memory 1401, as long as read pointer 2801 is always ahead of write pointer 2804, so that write pointer 2804 cannot write a portion of memory 1401 that has not yet been read. After each read or write operation, the appropriate pointer (read or write) is incremented by one. If write pointer 2804 is at a location one less than read pointer 2801, the buffer is full (that is, the next write operation will overwrite a portion of the buffer that read pointer 2801 has not yet read). When the condition occurs, full/empty circuit 2803 indicates a full buffer condition on conductor 2808. Similarly, when read pointer 2801 is at a location one less than write pointer 2804, the buffer is empty.

Temporary pointers are used by receiver 1402, input circuit 1406, and output circuit 1405 for various applications. In the receive circuit, for example, the temporary pointer is used to back-up the write pointer, in cases where the write pointer has written a packet and then receiver 1402 discovers an error. The temporary pointer points to the memory location containing the first byte of the packet. By setting the write pointer equal to the temporary pointer, the packet is effectively aborted.

Figure 29:
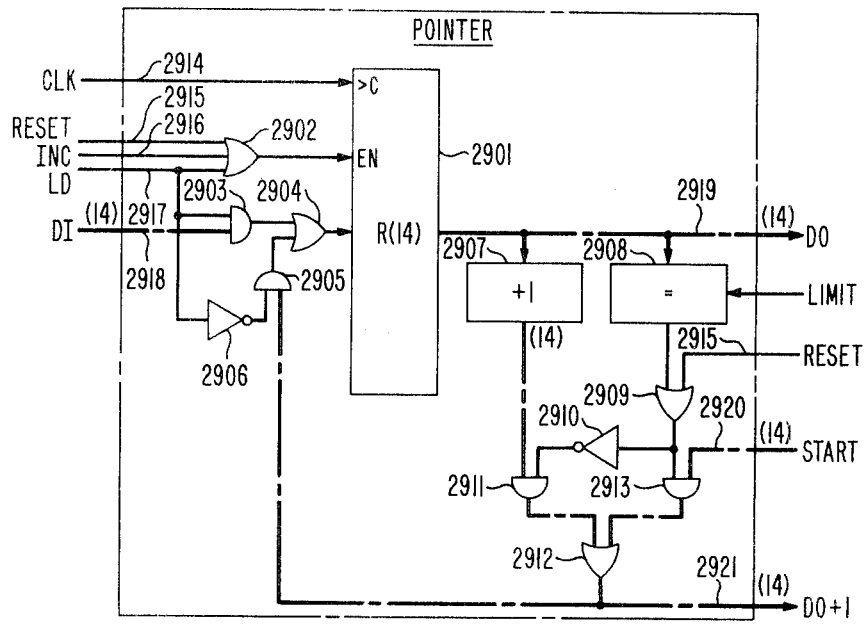
FIG. 29 is a detailed block diagram of the implementation of pointers as used in receive interface 2701 of address control 1404.

A typical pointer is shown in FIG. 29. Pointers contain the address of the current position in the buffer in order to read or write the buffer. The pointer circuit does the following: resets the pointer; increments the pointer (including wrap-around); loads the pointer from an external source, for example, setting the read pointer equal to the temporary pointer; and provides the current address, and the address plus one, for use by the full/empty circuit. The current address is stored in register 2901. This address is available on cable 2919; the address plus one is available on cable 2921. A reset operation causes the start address on conductor 2920 to be loaded into register 2901, as follows. The reset is initiated by a signal on conductor 2915. This signal enables register 2901 via OR gate 2902. Additionally, this reset signal operates OR gate 2909, which enables AND gate 2913. The start address on cable 2920 passes through AND gate 2913 and OR gate 2912 to one input of AND gate 2905. The other input of AND gate 2905 is enabled via inverter 2906; thus, the start address is loaded into register 2901. Incrementing the pointer causes the pointer to read or write the next memory address. When the pointer has reached the limit address, incrementing causes wrap around. Incrementing is initiated by a signal on conductor 2916. This signal enables register 2901 via OR gate 2902. The address that is loaded into register 2901 depends on whether or not the limit of memory space has been reached. If the limit has not been reached, comparator 2907 operates, which operates AND gate 2911 and OR gate 2912. When OR gate 2912 operates, the current address plus one is loaded into register 2901 via AND gate 2905 and OR gate 2904. If the limit has been reached. comparator 2908 operates. This operates OR gate 2909, which causes the start address on conductor 2920 to be loaded into register 2901 as previously described. This is the wrap around. Loading from an external source is initiated by a signal on conductor 2917. This signal enables register 2901 via OR gate 2902; additionally, this signal enables AND gate 2903 and disables AND gate 2905 via inverter 2906. When AND gate 2903 is enabled, the external address on cable 2918 is put in register 2901, via OR gate 2904.

Figure 30:
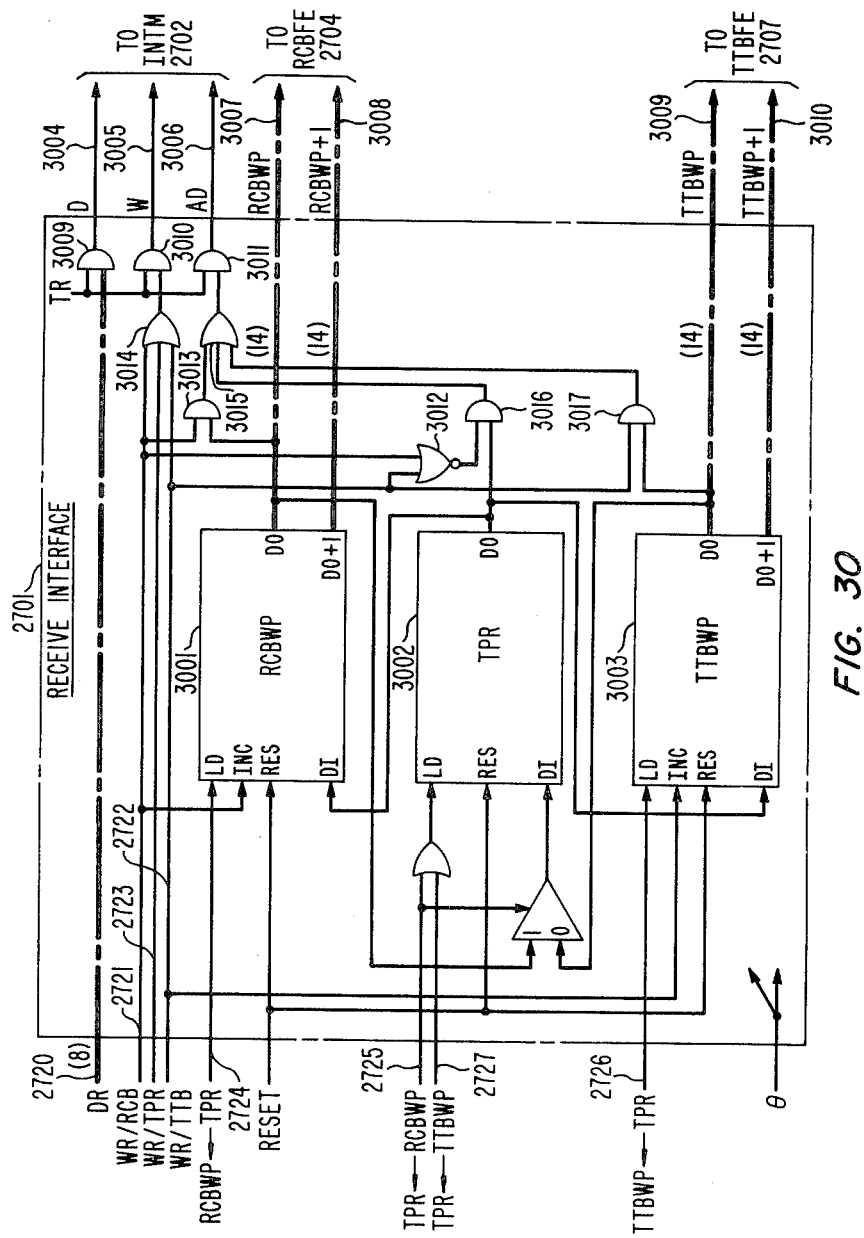
FIG. 30 is a detailed block diagram of receive interface 2701.

Receive interface 2701 is shown in greater detail in FIG. 30. Receive interface 2701 comprises receive buffer write pointer 3001, temporary pointer 3002, and trunk test buffer pointer 3003. These pointers are similar to the pointer described in FIG. 29. and are used to allow receiver 1402 to read receive buffer 1501 and trunk test buffer 1502. Data is received from buffer 2401 on cable 2720, and is written, via cable 3004, into memory 1401 via memory interface 2702. The memory location is specified via address cable 3006. This address is received from the DO lead of the respective pointer 3001, 3002, or 3003) through OR gate 3015 and AND gate 3011. AND gates 3009 through 3011 are multi-input AND gates that send data, write indications, and addresses to memory 1404 via cables 3004 through 3006. Output interface 2703, input interface 2713, and transmit interface 2711 are similar in design to receive interface 2701.

Figure 31:
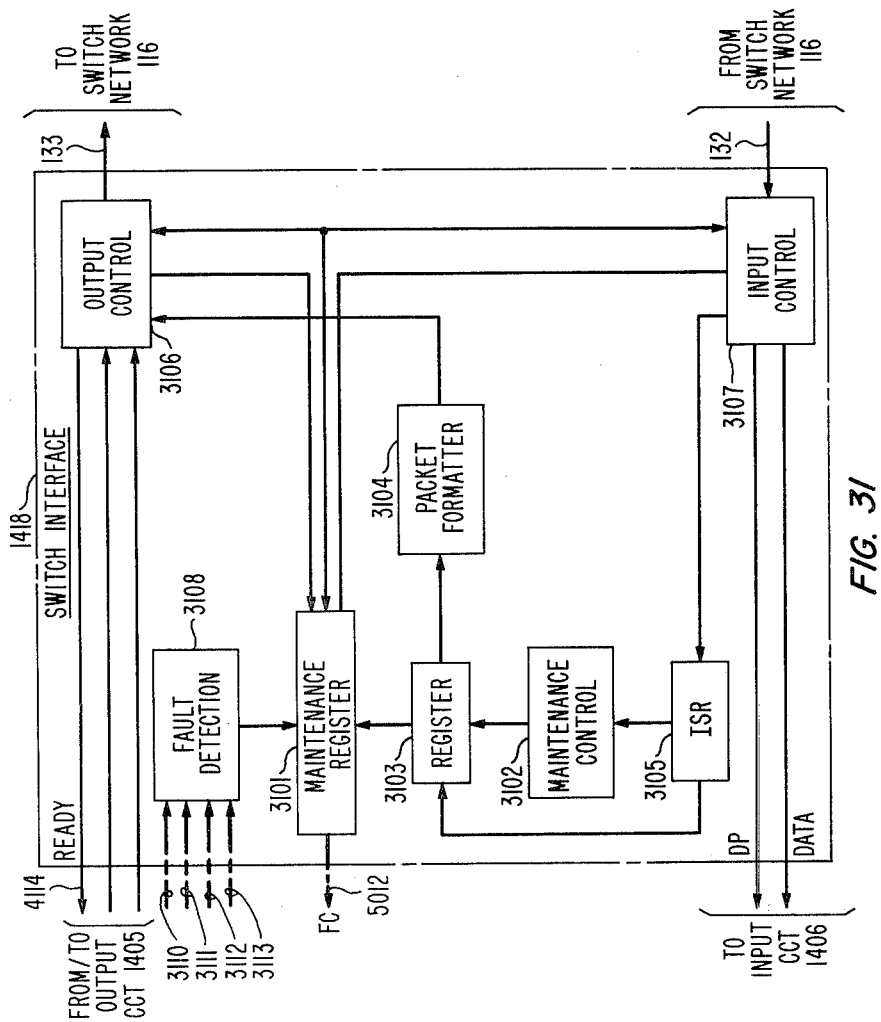
FIG. 31 is a detailed block diagram of switch interface 1418 of trunk controller 131.

Switch interface 1418 is shown in greater detail in FIG. 31. This circuit is the interface between trunk controller 131 and switching network 116. Its primary function is to provide maintenance read and write capabilities between the trunk controller and central processor 115. These maintenance functions are provided via maintenance read and write packets, and via fault detection circuit 3108. Maintenance information is sent between switch interface 1418 and the central processor via maintenance read and maintenance write packets. Packets are sent to input control 3107 via conductor 132. Input control 3107 reads the control field of the packet to determine whether the packet is a maintenance packet. If the packet is not a maintenance packet, it is shifted through to input circuit 1406. If the packet is a maintenance packet, it is shifted through to maintenance control 3102.

Maintenance control 3102 reads the control field of the incoming packet to determine whether the packet is a maintenance read or maintenance write packet. If it is a maintenance write packet, the information from the packet is passed through register 3103 to maintenance register 3101. This operation is controlled by maintenance control 3102. The maintenance information is then passed back to register 3103, and transmitted back to the central processor as a check to verify that the information was correctly written and stored in maintenance register 3101. If it is a maintenance read packet, the information stored in maintenance register 3101 is read into register 3103, and is then transmitted to the central processor. Before the packet is transmitted back to the central processor, the source and destination fields of the packet must be switched, and the CRC code must be recalculated. These functions are accomplished by packet reformatter 3104.

Another maintenance function consists of fault detection circuit 3108 and cables 3110 through 3113. Cables 3110 through 3113 are connected to receiver 1402, transmitter 1403, input circuit 1405, and output circuit 1405, respectively. These cables transmit faults, such as memory error or packet received in error, to fault detection circuit 3108.

Figure 32:
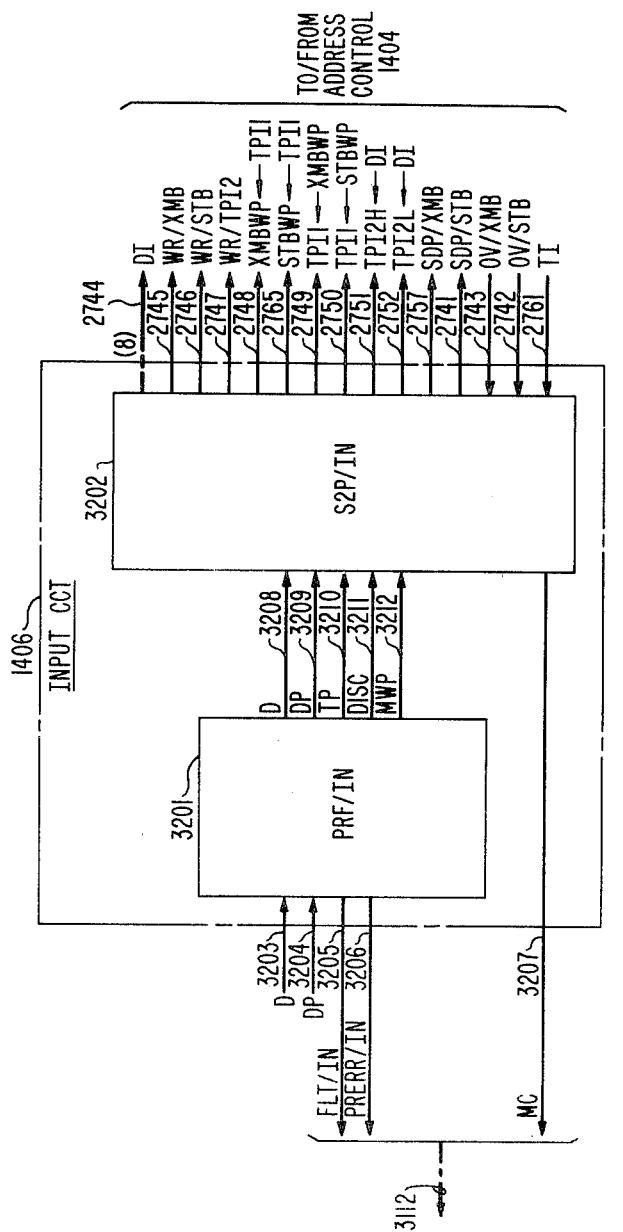

Input circuit 1406 is shown in greater detail in FIG. 32. This circuit receives switch packets from switching network 116 via switch interface 1418 and writes the packets into the appropriate portions of memory 1401. Input circuit 1406 comprises packet reformatter 3201 and serial to parallel converter 3202. Incoming packets are received from switch interface 1418 on conductor 3203, with data present indication on conductor 3204. Packet reformatter 3201 reads the control field of the incoming packet to determine the packet type. If it is a memory write packet, it is indicated by a signal on conductor 3212. If it is a test packet, it is indicated by a signal on conductor 3210. Packet reformatter 3201 also updates the length and CRC fields of memory write packets. After packet reformatting has been done, the packet is passed in serial to serial to parallel converter 3202. Serial to parallel converter 3202 converts this incoming serial stream to bytes, and controls the transfer of these bytes to memory. In the case of an ordinary data packet, the data is written into transmit buffer 1503, via a signal on conductor 2745. In the case of a test packet, the data is written into switch test buffer 1504, via a signal on conductor 2746. In the case of a memory write packet, the data is written into the memory location specified in the packet itself. Conductors 2747 through 2752, and conductor 2765 control the writing and setting of the two temporary pointers. Temporary pointer 1 is used for aborting packets found in error; temporary pointer 2 is used for writing the data portion of memory write packets into the specified memory location.

Packet reformatter 3201 is shown in greater detail in FIG. 33. Packet reformatter 3201 contains duplicated CRC circuits 3301 and 3303, duplicated packet reformat circuits 3302 and 3304, and comparator 3305. The duplicated circuitry is required because the CRC code cannot detect errors during the reformatting process. Incoming packets are received by packet reformatter 3201 on conductor 3203. CRC circuits 3301 and 3303 check the CRC field of the incoming packet. If both CRC circuits detect an error, a packet received in error signal is generated by AND gate 3306 and sent to switch interface 1418 via conductor 3206. Additionally, a packet received in error causes a signal to be placed on conductor 3211. This signal causes serial to parallel converter 3202 to discard the packet. Packets not found in error are then reformatted by packet reformat circuits 3302 and 3304. This reformatting process involves updating the control, length, and CRC fields. If there is a mismatch in the reformatting done by packet reformat circuits 3302 and 3304, the mismatch is detected by comparator 3305. This mismatch causes comparator 3305 to send a fault indication to switch interface 1418 via conductor 3205.

Packet reformat circuit 3302 is shown in greater detail in FIG. 34. Packet reformat circuit 3302 comprises format control 3401, format length circuit 3402, and format CRC circuit 3403. Packet reformat circuit 3302 updates the control, length, and CRC fields of memory write packets only; all other packets are passed through the circuit with no changes. Format control 3401 receives packets from CRC circuit 3301 via conductor 3307. A signal is placed on conductor 3308 to indicate that data is present on conductor 3307. This data present signal is passed to format length circuit 3402 via conductor 3405, and to format CRC circuit 3403 via conductor 3408. Format control 3401 examines the control field of the incoming packet. If the field is a "4" (indicating a memory write packet), format control 3401 places a signal on conductor 3212, which activates format length circuit 3402 and CRC circuit 3403. If the incoming packet is not a memory write, format control 3401 shifts the packet through. If the packet is a test packet, format control 3401 indicates this by placing a signal on conductor 3210, which results in the packet being written into switch test buffer 1504. If format control 3401 receives a memory write packet, format length circuit 3402, in response to the memory write packet signal from conductor 3212, inserts a constant length into the length field, and CRC circuit 3403 calculates a new CRC. A constant length is written into the length field because the memory write packets written into switch test buffer 1504 contain the packet header fields only, without the data, and thus are the same length. The reformatted packet is then forwarded to serial to parallel converter 3202 via conductor 3208.

Figure 35:
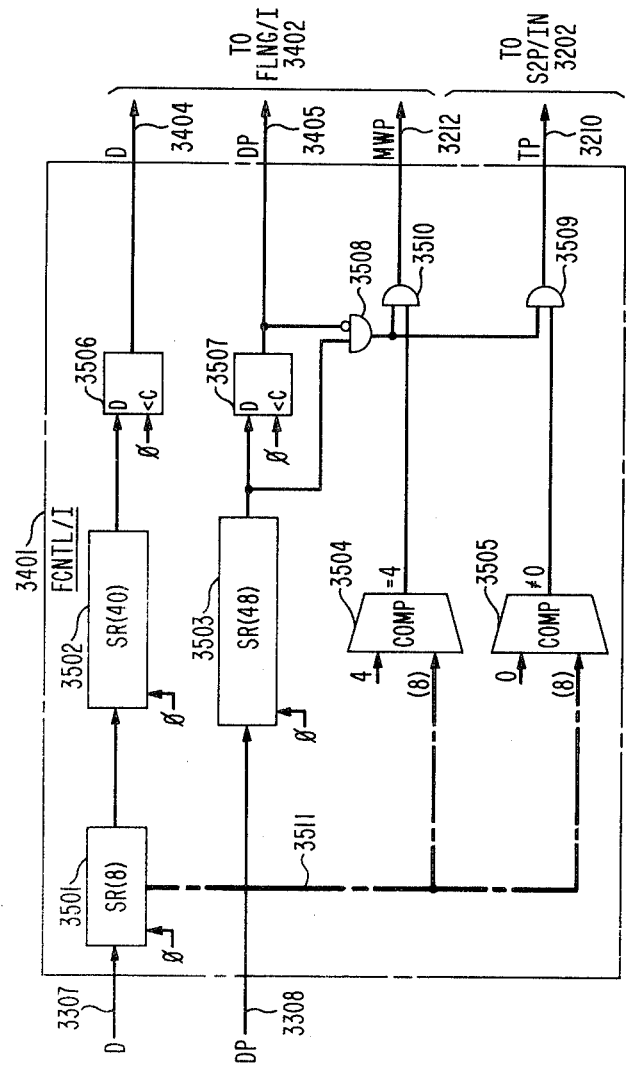

Format control 3401 is shown in greater detail in FIG. 35. Format control 3401 reads the control field of the incoming packet. If the incoming packet is a memory write packet, a signal is placed on conductor 3212; if the incoming packet is anything but a normal data packet, a signal is placed on conductor 3210. The packet enters on conductor 3307 and is shifted through register 3501 into 3502 at the phi clock rate from system clock 161. This is done to capture the control field in register 3501. At the same time, the data present signal is shifted into register 3503. When 48 bits of the packet have been shifted into registers 3501 and 3501, register 3501 contains the control field, bits 40 through 48. The value in the control field is sent to comparators 3504 and 3505, via conductor 3510. Comparatos 3504 and 3505 read the control field to determine the packet type. If the control field is a "4" (indicating a memory write packet), comparator 3504 operates and places a signal on conductor 3212 via AND gates 3508 and 3510. If the control field is not equal to "0", comparator 3505 operates and places a signal on conductor 3210 via AND gate 3509. Flip-flops 3506 and 3507 ensure that the data and data present signals are clocked at the phi rate.

Figure 36:
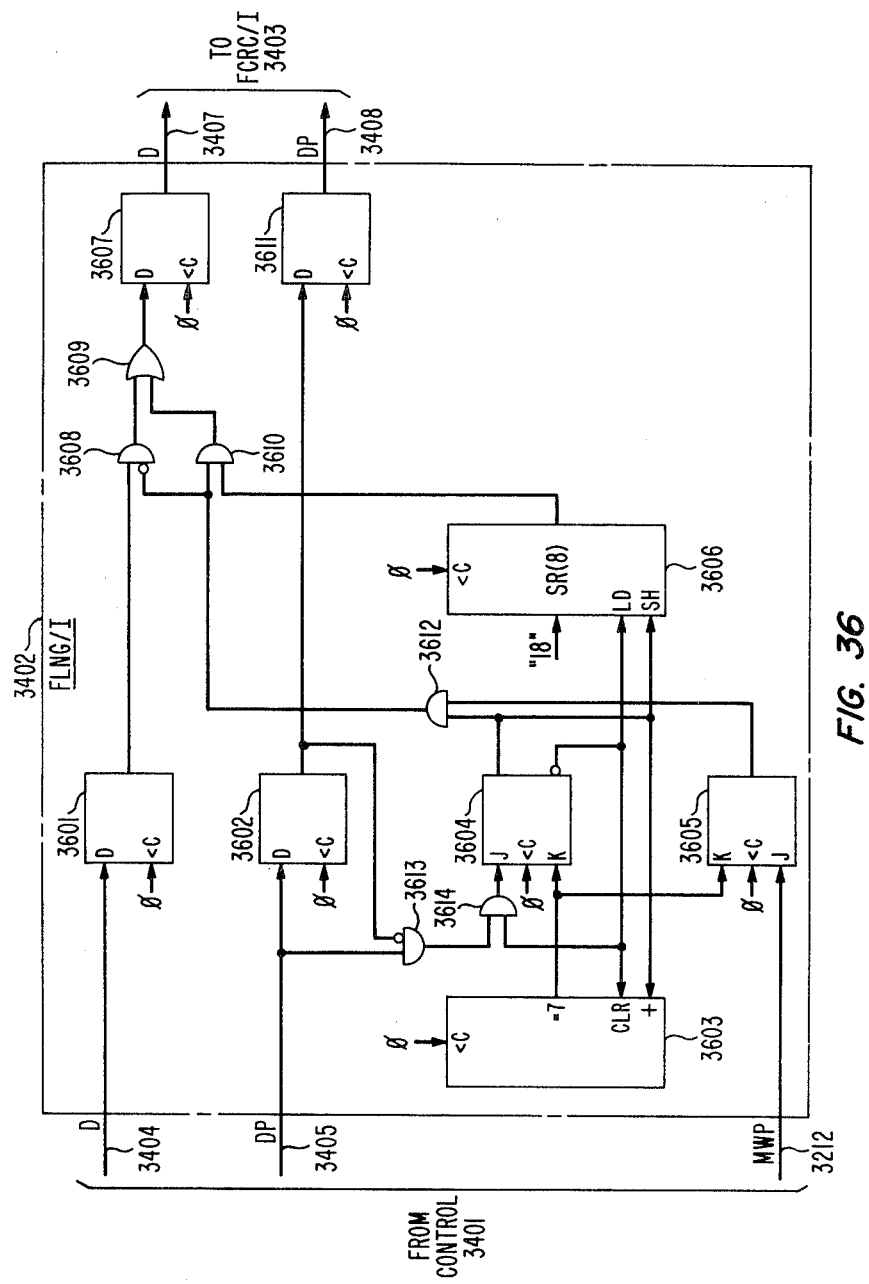

Format length circuit 3402 is shown in greater detail in FIG. 36. Format length circuit 3402 places a constant length into the length field of memory write packets. All other packets are shifted through with no action taken. Incoming data and data present signals arrive on conductors 3404 and 3405. If the incoming packet is not a memory write packet, the data is shifted through flip-flop 3601, gates 3608 and 3609, the flip flop 3607. The data present signals are shifted through via flip-flops 3602 and 3611. All flip-flops operate at the phi clock speed under control of system clock 161. If the incoming packet is a memory write packet, it is indicated by a signal on conductor 3212. This memory write signal sets flip-flop 3605. When flip-flop 3605 if set, and the first bit of the packet is about to be shifted into flip-flop 3601, flip-flop 3604 is set, causing the constant "18" to be shifted into the length field of the packet from shift register 3606 and through AND gate 3610 and OR gate 3609. At the same time, counter 3603 is enabled. When counter 3603 reaches "7", flip-flop 3604 is reset, and shift register 3606 stops shifting. The remainder of the packet is then shifted through AND gate 3608 and OR gate 3609.

Figure 37:
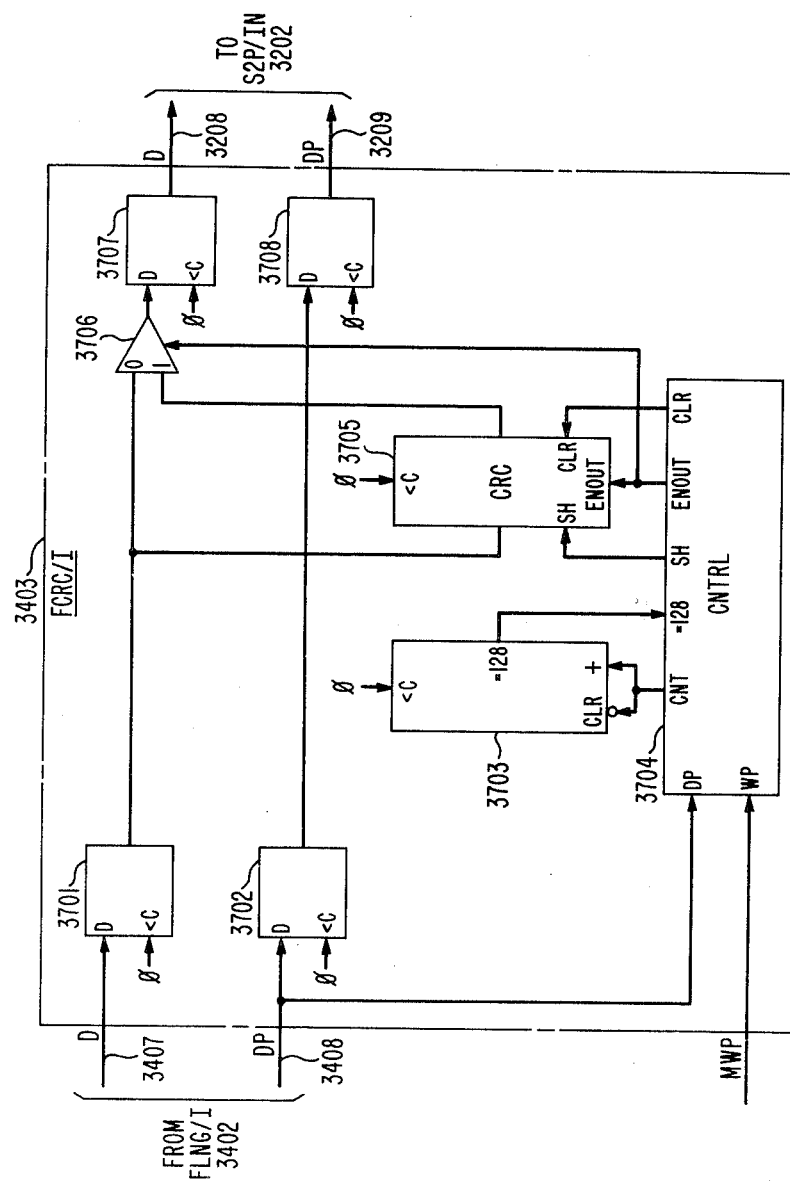

Format CRC circuit 3403 is shown in greater detail in FIG. 37. Format CRC circuit 3403 recalculates the CRC field of memory write packets. All other packets are shifted through with no action taken. The incoming data present signal on conductor 3408 causes control 3704 to activate counter 3703. Counter 3703 counts the bits of the incoming packet as they appear on conductor 3407, and are passed through flip-flop 3701, data selector 3706, and flip-flop 3707. As the data passes through the circuit, it is also sent to CRC circuit 3705, which is calculating the new CRC. When counter 3703 reaches 128, it signals control 3704, which disables CRC circuit 3705. This is done because the first 128 bits of the packet contain the packet header, which is the only part of the packet that the CRC must be calculated. After bit 128, the rest of the packet contains the data. This data gets written into memory, and does not appear in the packet when the packet is transmitted. Thus, the CRC field is not calculated over the data portion of the packet, since the data is written into logical translation table 1505. When the end of the packet leaves data selector 3706, control 3704 shifts the recalculated CRC field through data selector 3706 and, thus, onto the end of the packet.

Figure 38:
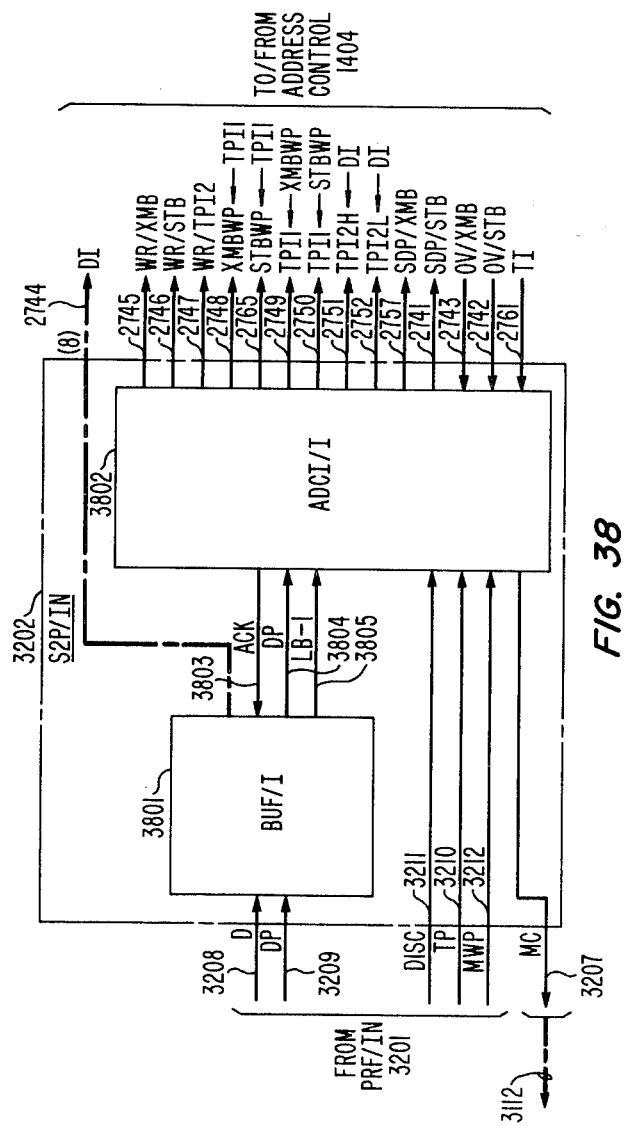

Serial to parallel converter 3202 is shown in greater detail in FIG. 38. Serial to parallel converter 3202 comprises buffer 3801 and address control interface 3802. Buffer 3801 receives incoming serial information on conductor 3208 and transforms the information into bytes, which are sent to address control 1404 via cable 2744. Address control interface 3802 signals to address control 1404 where in memory 1401 the data is to be written. This signaling is provided via conductors 2745 through 2752, and conductor 2765. The signaling is done in a manner similar to receive address control interface circuit 2402.

Figure 39:
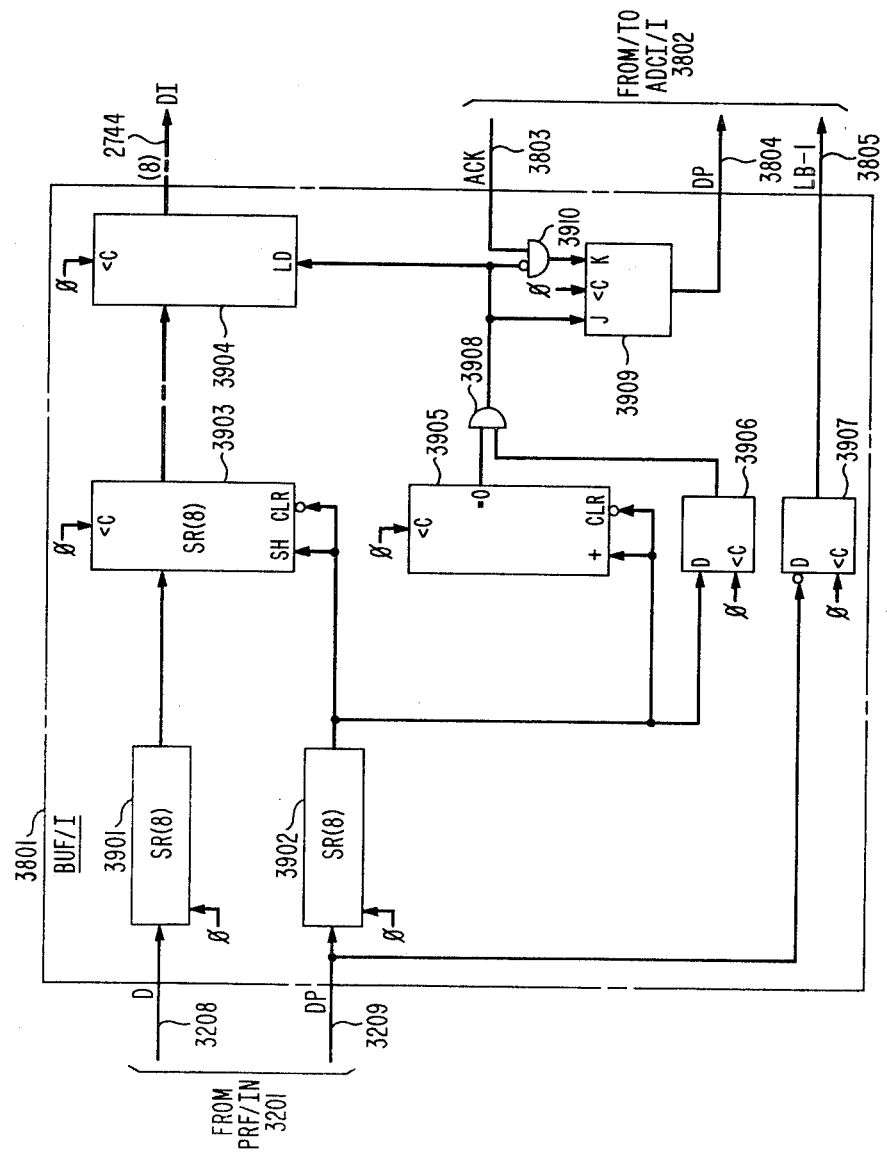

Buffer 3801 is shown in greater detail in FIG. 39. Buffer 3801 forms the incoming serial data into bytes. Additionally, it signals address control interface 3802 when the CRC field is in the buffer. This is necessary because, in a memory write packet, address control interface 3802 writes the CRC field into switch test buffer 1504 and writes the data portion of the packet into a different memory location. Incoming data and data present signals appear on conductors 3208 and 3209, and are shifted into registers 3901 and 3902. When a byte has been assembled in register 3903, it is loaded into register 3904 and sent to address control 1404 via cable 2744. A signal on conductor 3805 indicates to address control interface 3802 that the CRC field is ready to be transmitted. With the previously noted differences, the operation of buffer 3801 is similar to the operation of buffer 2401.

Figure 40:
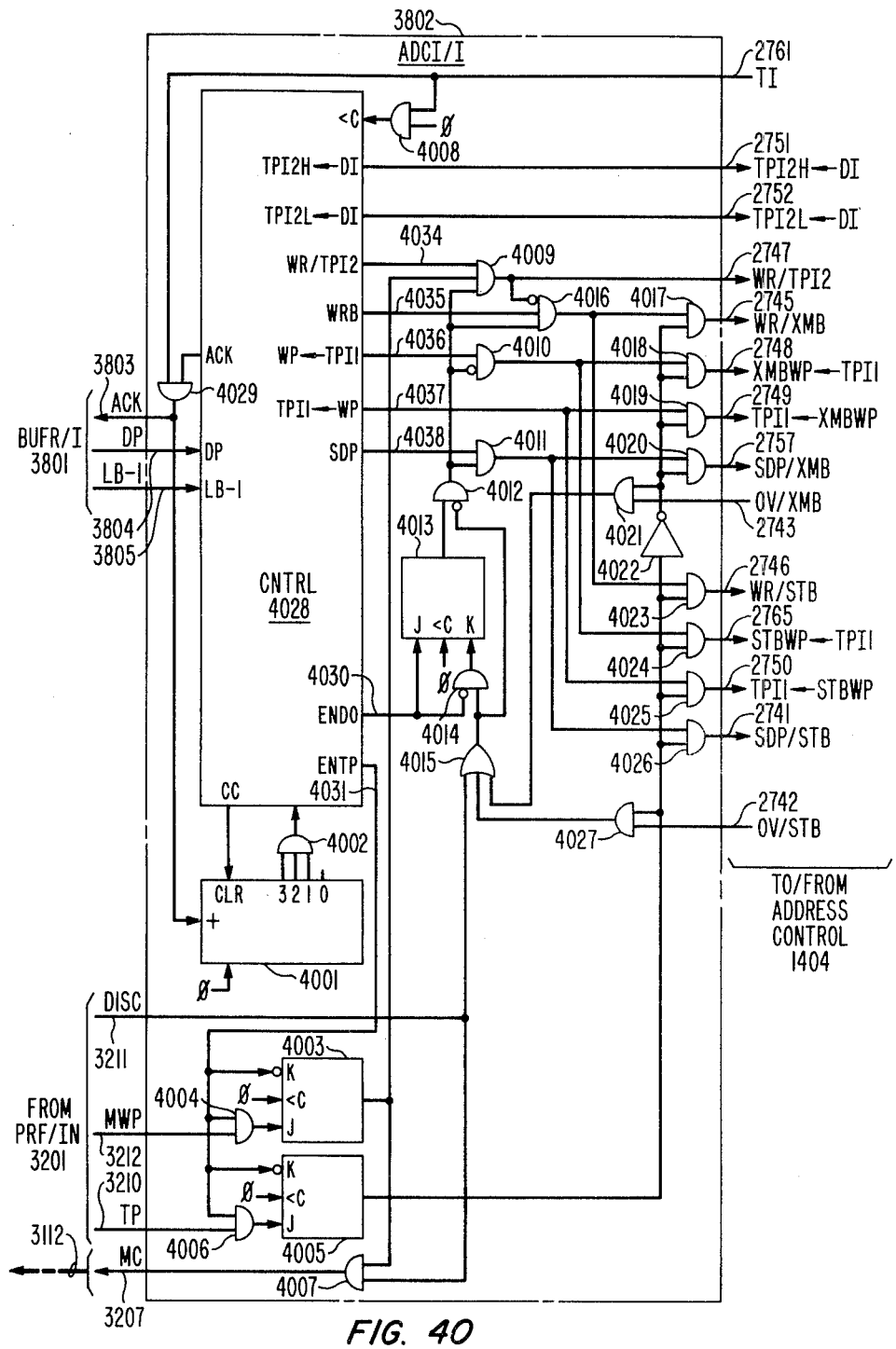

Address control interface 3802 is shown in FIG. 40. Address control interface 3802 allows packets similar to those shown in FIG. 6 to be written into memory 1401. The packet can be either a data, memory read, or switch test packet. In the case of a data packet, the packet is written into transmit buffer 1503 in memory 1401. When the first byte is ready in buffer 3801, it is indicated by a signal on conductor 3804. This signal causes control 4028 to place a signal on conductor 4030. This signal sets flip-flop 4013, which places a "1" on the output of AND gate 4012. Control 4028 then places a signal on conductor 4035. This is a write buffer command. In the case of a data packet, the data is written into transmit buffer 1503 because the signal on conductor 4035 operates AND gate 4016, which operates AND gate 4017. When AND gate 4017 operates, a signal is placed on conductor 2745. This signal is passed to address control 1404, and it causes the byte contained in buffer 3801 to be written into transmit buffer 1503 in memory 1401. This process continues until the entire packet has been read from buffer 3801 and has been written into transmit buffer 1503. After each byte has been transferred from buffer 3801 into transmit buffer 1503, control 4028 sends an acknowledge signal to buffer 3801 via conductor 3803. The operation for a test packet is similar as that for a data packet, with the exception that the packet is written into switch test buffer 1504, rather than into transmit buffer 1503. This is accomplished by the test packet signal on conductor 3210 setting flip-flop 4005. When flip-flop 4005 is set, AND gates 4017 through 4021 are disabled, and AND gates 4023 through 4027 are enabled. This allows the writing of switch test buffer 1504 while disabling the writing of transmit buffer 1503. A memory write packet requires that the packet length, destination and source trunk controller, control, arrival time, process identifier, logical address, time stamp, and CRC fields be written into switch test buffer 1504; and that the data field be written into another memory location specified in the packet. To do this, control 4028 activates the writing of switch test buffer 1504 during the writing of most of the packet. This causes the beginning fields, up to the data field, to be written into switch test buffer 1504 via conductor 2746. When the data portion of the packet is to be written, control 4028 disables the writing of switch test buffer 1504, and enables the writing of temporary pointer 2, causing the data portion of the packet to be written into the memory location to which temporary pointer 2 is pointing via conductor 2747. After the data portion is written, control 4028 causes the CRC field to be written into switch test buffer 1504, via conductor 2746.

If a packet stored in buffer 3801 contains errors, or if the buffer that the packet is being written into is overfilled, when the packet must be discarded. Packets that contain errors are indicated by a signal on conductor 3211. An overload of transmit buffer 1503 is indicated by a signal on conductor 2743, and an overload of switch test buffer 1504 is indicated by a signal on conductor 2742. The discarding of a packet is done by temporary pointer 1, which is set equal to the write pointer at the start of the write operation. If an error is found or a buffer is overfilled, the write pointer is set equal to to temporary pointer, via a signal on conductor 2748 or 2765. The effect of this is to back up the write pointer to the location that the write pointer was at when it began to write the packet. The next packet to be written will overwrite the packet in error, effectively discarding it. This temporary pointer is similar to to the temporary pointer for receive interface 2701, shown in FIG. 30. Setting the write pointer equal to temporary pointer 1 is done by control 4028 placing a signal on conductor 4036. This action is done at the end of each write operation. However, during the normal write operations when a packet is not to be discarded, the signal on conductor 4036 does nothing because the other input of AND gate 4010 is disabled. When a discard signal is received, flip-flop 4013 is reset to "0". This turns off AND gate 4012, which disables the writing of both the transmit and switch test buffers, due to the disabling of AND gate 4016. Additionally, when flip-flop 4013 is reset to "0", AND gate 4010 is enabled, which sets the write pointer equal to temporary pointer 1, and thus discards the packet.

Figure 41:
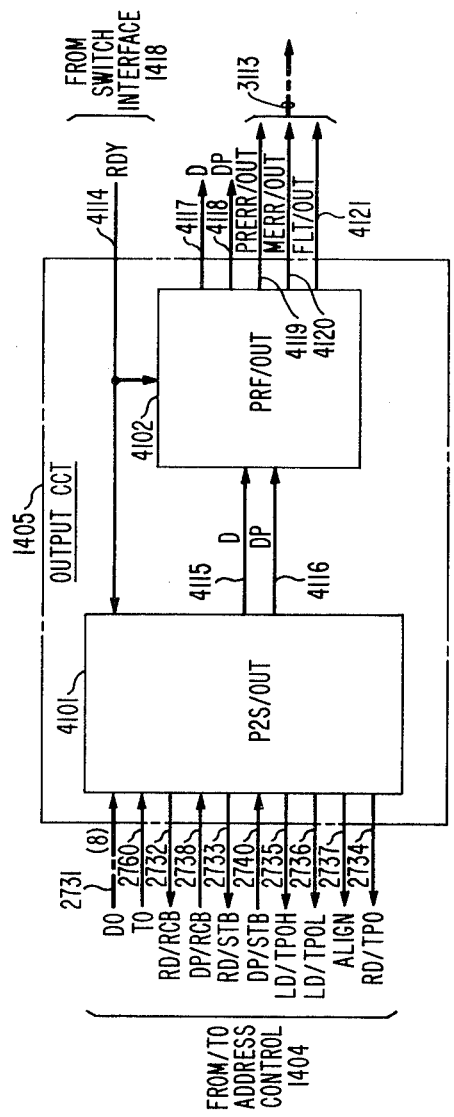
FIG. 41 is a block diagram of output circuit 1405 of trunk controller 131.

Output circuit 1405 is shown in greater detail in FIG. 41. Output circuit 1405 reads data packets, memory read and write packets, and switch test packets from memory 1401, and transmits the packets to the switch network via switch interface 1418. Output circuit 1405 comprises parallel to serial converter 4101 and packet reformatter 4102. Parallel to serial converter 4101 uses conductors 2732 through 2738 to read data from memory 1401, via address control 1404. Data is read in a parallel manner, and appears on cable 2731. Depending on the packet type, parallel to serial converter 4101 places signals on conductors 2732, 2733, 2735, or 2736 to read receive buffer 1501 or switch test buffer 1504, and to load the temporary pointer. The operation for data, memory read or write, and switch test packets are described in the following paragraphs. As parallel to serial converter 4101 is reading memory 1401, it is converting the data to serial, and transmitting the serial data to packet reformatter 4102. Packet reformatter 4102 receives the packet on conductor 4115, checks the CRC field of the packet, and calculates a new CRC field for the outgoing packet to the switch network. Depending on the packet type, output circuit 1405 also updates several packet fields, such as the source trunk controller, destination trunk controller, length, and control fields. After the packet has been reformatted, it is transmitted to the switch network, via switch interface 1418 on conductor 4117. Switch interface 1418 indicates that it is ready to receive a packet by placing a signal on conductor 4114. If an error is found in the incoming packet, or during the packet transformation, it is indicated by a signal on one of the conductors 4119 through 4121, which is transmitted to switch interface 1418.

Parallel to serial converter 4101 contains control leads that allow it to access portions of memory 1401 via address control 1404. Access to receive buffer 1501 is provided via conductor 2732. Access to switch test buffer 1504 is provided via conductor 2733. These access leads provide control only; the information contained in memory is transferred to output circuit 1405 via cable 2731. In order to gain access to memory 1401, a signal must be present on conductor 2760. This signal is provided by timer 2714 contained in address control 1404. Output circuit 1405 also contains control leads for the temporary pointer, provided via conductors 2734 through 2737. The temporary pointer is used to perform memory read operations, as specified by memory read and memory write packets.

Packet reformatter 4102 receives information from parallel to serial converter 4101 via conductor 4115. It uses the information to assemble the packet that is transmitted to the switch network. This circuit also checks the CRC field of the incoming packet and provides an error indication if an error is found.

Figure 42:
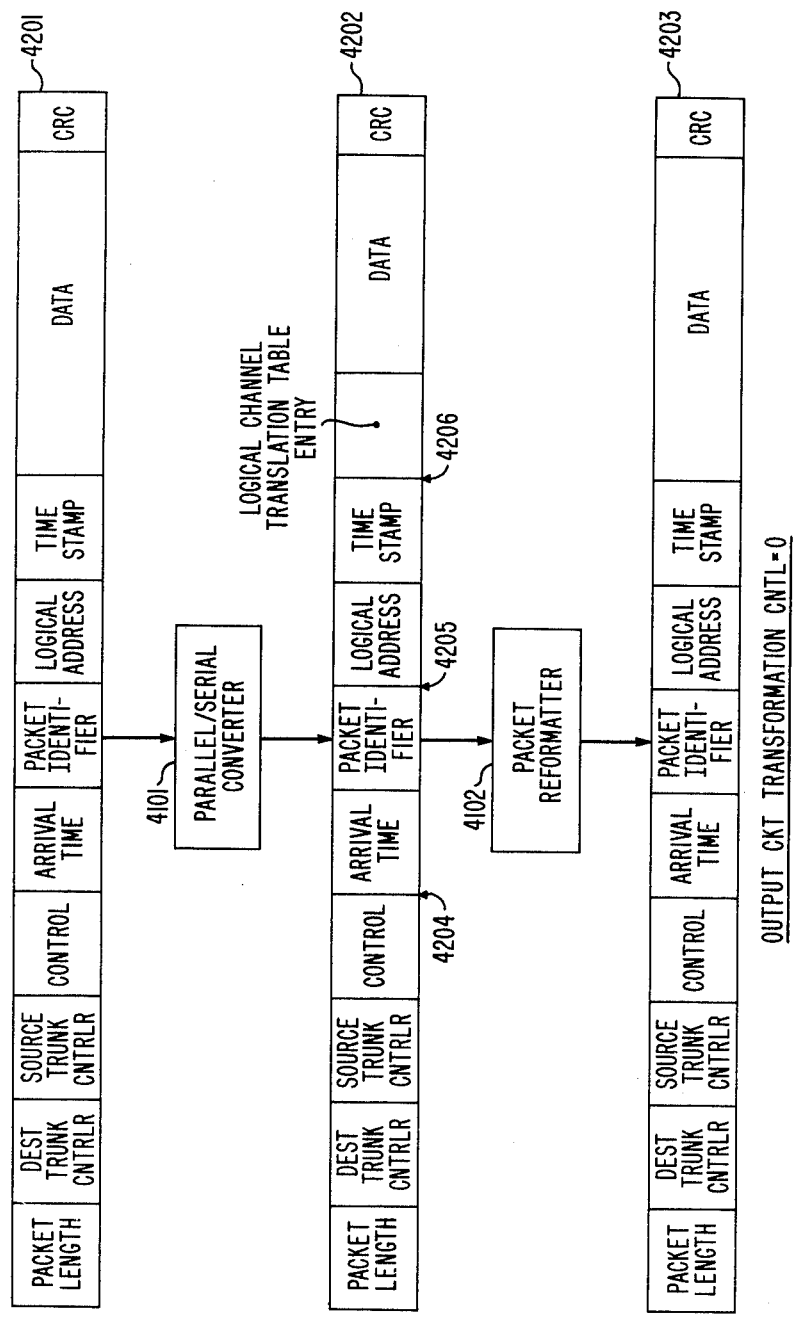
FIGS. 42 through 44 illustrate packet transformations performed by the subsystems of output circuit 1405 of trunk controller 131 on packets read from memory 1401 of trunk controller 131.
Figure 43:
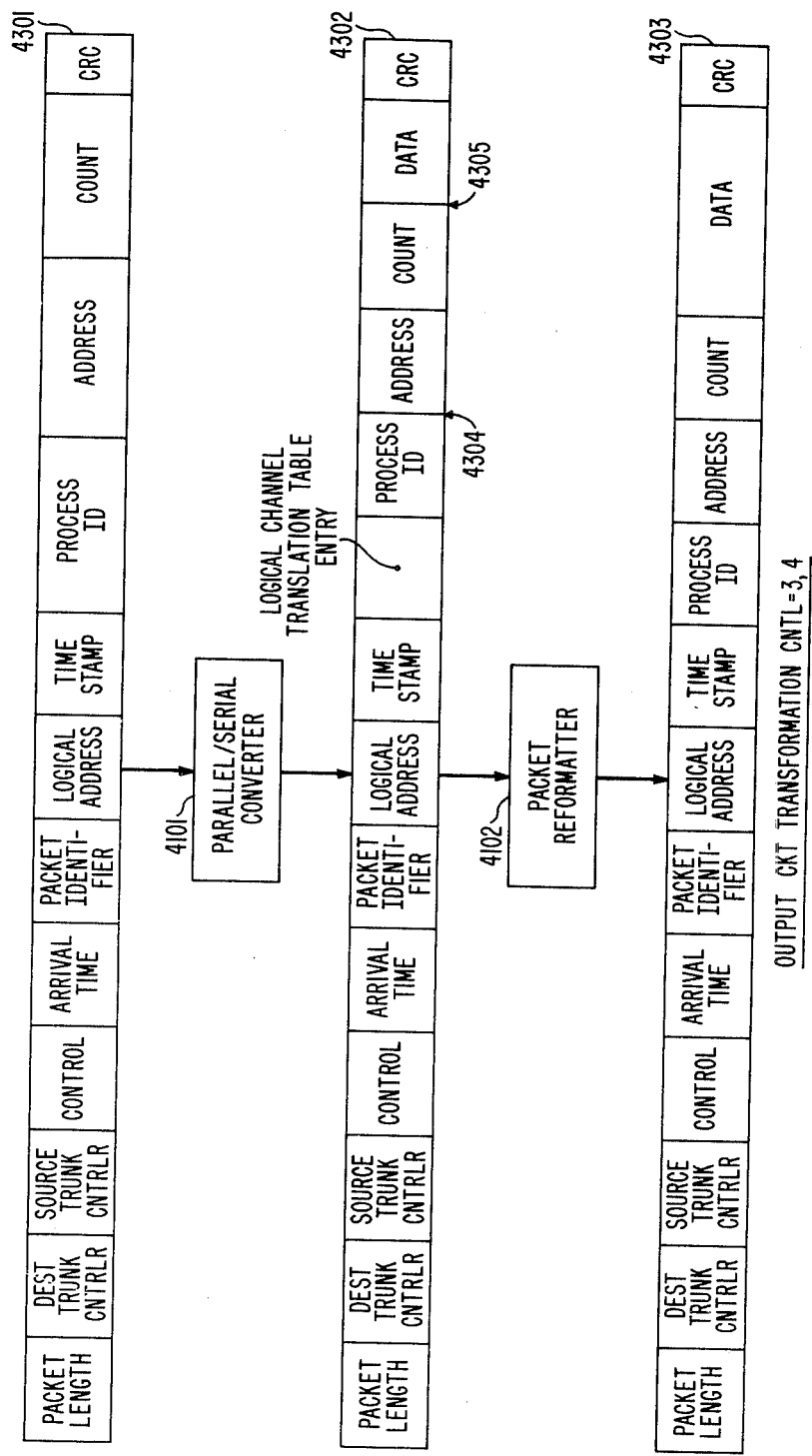
Figure 44:
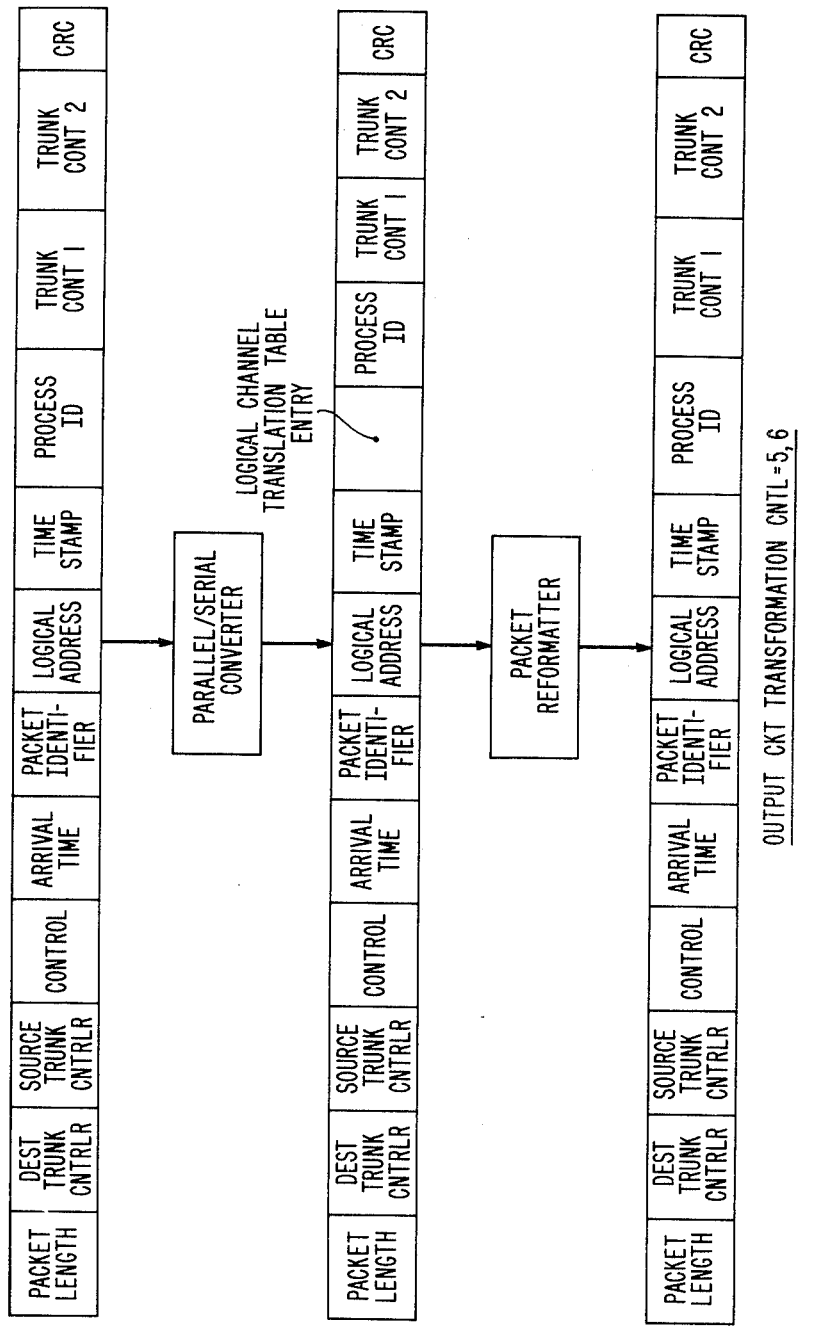

The packet transformations provided by output circuit 1405 are shown in FIG. 42, FIG. 43, and FIG. 44. The packet configuration going into parallel to serial converter 4101 is the packet as it goes into output circuit 1405. The packet configuration going into packet reformatter 4102 is not an actual packet; rather, it is used to illustrate the intermediate step in the actual packet transformation. The packet configuration coming out of packet reformatter 4102 is the actual packet as it leaves output circuit 1405.

FIG. 42 shows the packet transformation that occurs when a data packet (control field of "0") is read from receive buffer 1501. FIG. 42 is used to illustrate what takes place in the packet when output circuit 1405 reads a data packet. Packet 4201 is the packet as it exists in receive buffer 1501. After parallel to serial converter 4101 receives from address control 1404 a grant signal on converter 2760, and a data present signal on conductor 2738, it is ready to read receive buffer 1501. This is done by parallel to serial converter 4101 sending a read receive buffer signal to address control 1404 via conductor 2732. This signal causes address control 1404 to read receive buffer 1501 in memory 1401 and to send the data to parallel to serial converter 4101 on cable 2731. This data appears in parallel and is transformed into a serial bit stream. When the logical address of the packet is read, it is loaded into the temporary pointer, via signals on conductors 2735 through 2737. This address is used to access the proper entry in logical translation table 1505, which is inserted into the packet passed from parallel to serial converter 4101 to packet reformatter 4102. The format of this intermediate packet is shown as 4202 in FIG. 42.

After parallel to serial converter 4101 has read receive buffer 1501 and has read the new logical address, it forwards the information to packet reformatter 4102. Packet reformatter 4102 performs two main functions: It changes the order of certain fields of the incoming information so as to place the source and destination trunk controller numbers in their proper fields, and it places the logical channel translation table information into the logical address field. Additionally, packet reformatter 4102 checks the CRC field of the incoming information, and calculates a new length and CRC field. This action results in the actual packet 4203.

FIG. 43 shows the packet transformation that occurs during a memory read (control field of "3") or a memory write (control field of "4") operation. The operations are similar to those for reading a data packet (FIG. 42), with the following exception. In a memory read or memory write, data is read from a memory location specified in the memory read or memory write packet, and the data is placed into the outgoing memory read or memory write packet. At the same time, the remainder of the packet is read from switch test buffer 1504. Packet 4301 is the packet as it exists in switch test buffer 1504. The address field is the memory location of the data that is to be placed in the packet. The count field is the number of bytes of data that are to be read. The packet is read out of switch test buffer 1504 under control of a signal on conductor 2733. When the address field 4304 is read from the buffer, its value is also saved in the temporary pointer. This is done via signals on conductors 4209 and 4210 as previously described for FIG. 42. After count field 4305 is read, the temporary pointer is used to read information from memory 1401. This information is then placed in the data field. Packet reformatter 4102 updates the length, and destination and source trunk controller fields, and recalculates a new CRC field. This forms the actual packet 4303.

The packet transformation for a switch test packet (control field of "5" or "6") is shown in FIG. 44. For a switch test packet transformation, it is necessary to update the destination trunk control field. This is done by using the data in either the trunk control 1 or trunk control 2 fields. For a first hop switch test packet (control field of "5"), the trunk control 1 field is used. For a second hop switch test packet (control field of "6"), the trunk control 2 field is used.

Figure 45:
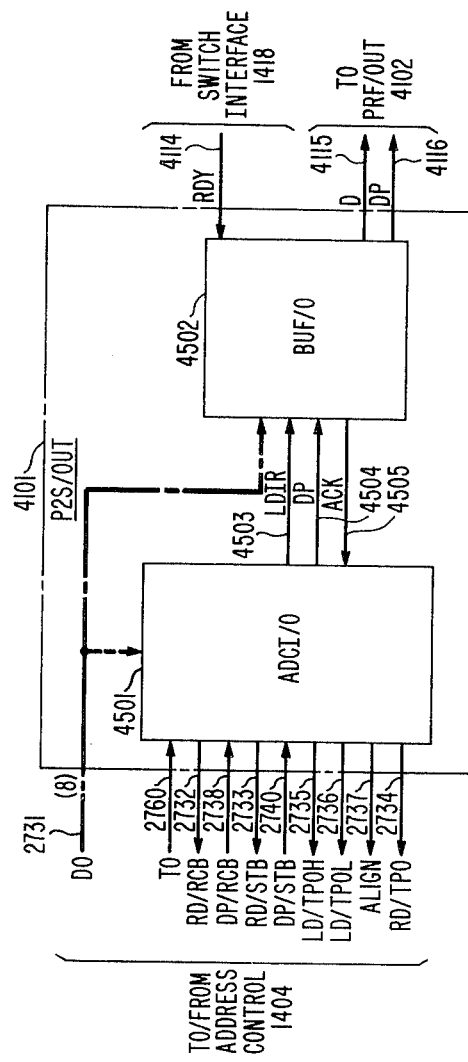
FIGS. 45 through 49 are detailed block diagrams of subsystems which comprise output circuit 1405 of trunk controller 131.

Parallel to serial converter 4101 is shown in greater detail in FIG. 45. This circuit comprises address control interface 4501, and buffer 4502. Incoming packets are sent to both address control interface 4501 and buffer 4502 via cable 2731. Address control interface 4501 is informed of the presence of data in either receive buffer 1501 or switch test buffer 1504 via data present signals on conductors 2738 and 2740. It then controls the transfer of the packets to buffer 4502, which performs the parallel to serial conversion. Address control interface 4501 also controls the reading of the logical channel translation table entries and the data fields of the memory read and memory write packets using the temporary pointer.

Figure 46:
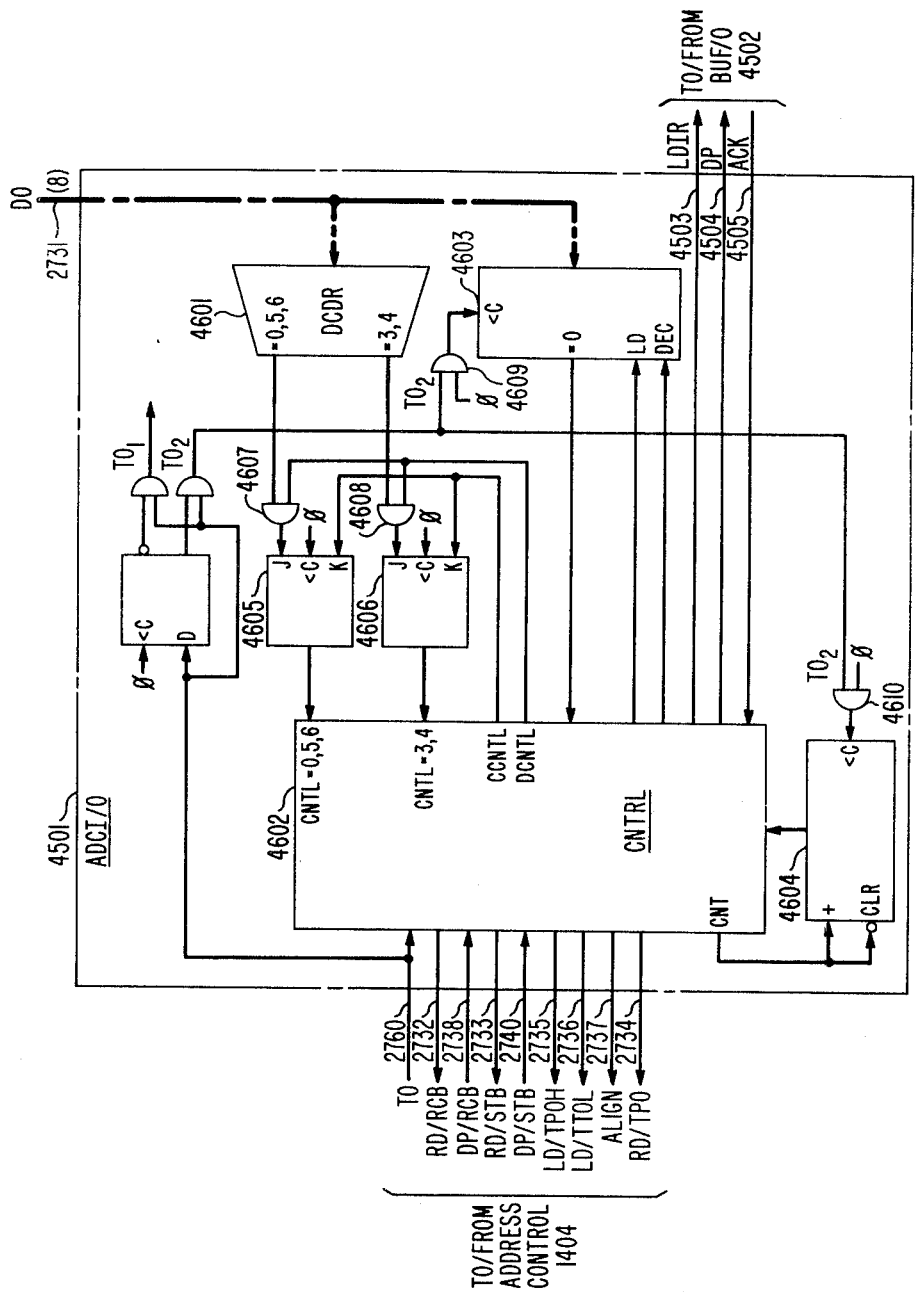

Address control interface 4501 is shown in greater detail in FIG. 46. Address control interface 4501 controls the transfer of packets from receiver buffer 1501 or switch test buffer 1504 into buffer 4502. The transfer of the packets is on cable 2731. Address control 4501 also decodes the control field of the packet being read, in order to properly load the temporary pointer; and it reads the length field of the packet being read, in order to determine when the packet has been entirely read. Address control 1404 indicates the presence of data in receive buffer 1501 by placing a signal on conductor 2738; it indicates the presence of data in switch test buffer 1504 by placing a signal on conductor 2740. Address control interface 4501 responds to this data present signal by placing a signal on either conductor 2732 or 2733, in order to read either receive buffer 1501 or switch test buffer 1504, as appropriate. Additionally, the data present signal from address control 1404 causes control 4602 to start counter 4604. Counter 4604 counts each byte as it is received from cable 2731. This counting is needed to determine when the control and length fields of the incoming packet are present in cable 2731.

The reading of a memory read or memory write packet (control field of "3" or "4") can be illustrated by also referring to packet 4301 of FIG. 43. Control 4602 receives the "data present in switch test buffer signal" on conductor 2740 and begins to read switch test buffer 1504, as previously described. When the length field appears on cable 2731, it is stored in counter 4603. Counter 4603 begins to count down; when it reaches zero, the packet has been entirely read. When the control field appears on cable 2731, it is decoded by decoder 4601. Once the control field is decoded, it is stored in flip-flops 4605 and 4606. Address control interface 4501 continues to read the packet from switch test buffer 1504. When the address field appears on cable 2731, this address is loaded into the temporary pointer by control 4602 placing a signal on conductors 2735 and 2736. When the count field appears on cable 2731, it is loaded into counter 4603. Counter 4603 then counts the number of data bytes that are being read from the memory location specified in the address field. This data is then placed at the end of the packet to form intermediate packet 4302.

Figure 47:
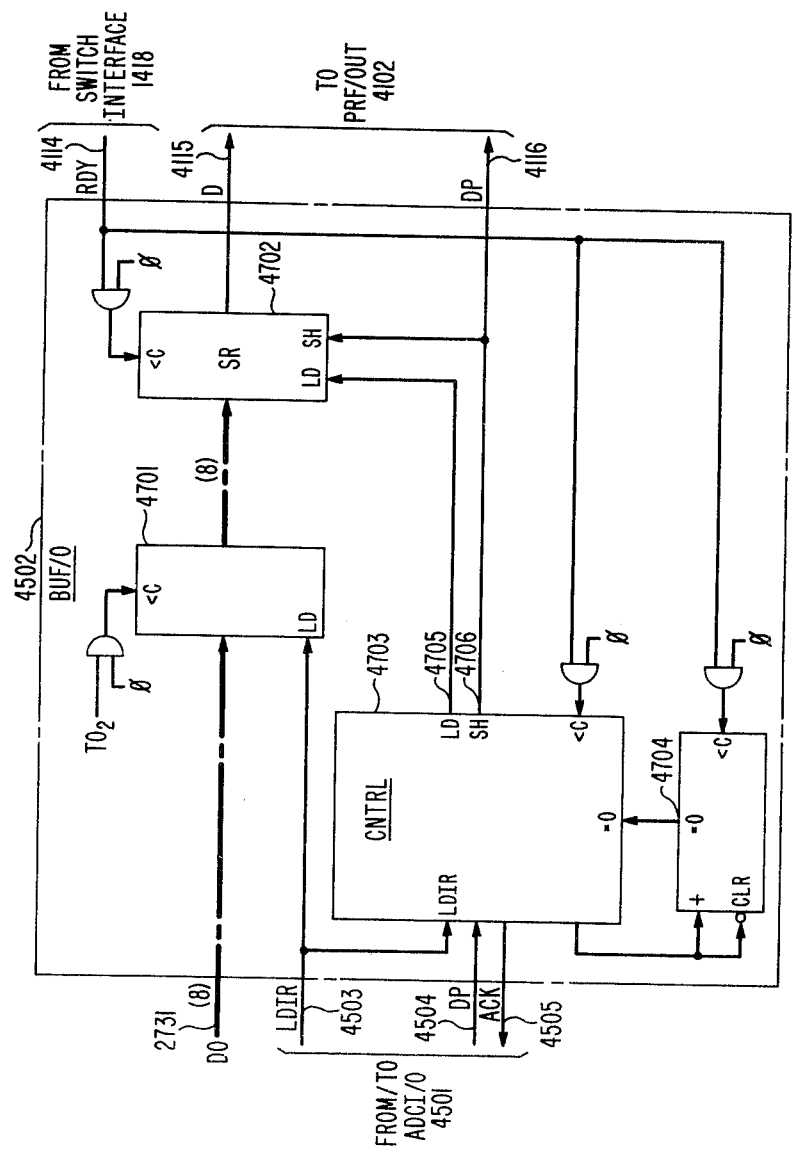

Buffer 4502 is shown in greater detail in FIG. 47. Buffer 4502 performs the actual parallel to serial conversion. The presence of a byte on cable 2731 is indicated by a signal from address control interface 4501 on conductor 4504. The load signal is provided on conductor 4503. This load signal causes the first byte on cable 2731 to be loaded into input register 4701. Control 4703 then loads the byte into shift register 4702. Shift register 4702 then shifts the byte out onto conductor 4215 in a serial manner. This shifting is activated via a signal from control 4703 on conductor 4706. Control 4703 also causes counter 4704 to begin counting. Counter 4704 counts the bit times to indicates when the byte has been completely shifted out of shift register 4702. During the time that the contents of shift register 4702 are being shifted out serially, the next byte on cable 2731 is loaded into input register 4701, which buffers this byte until the data in shift register 4702 has been completely shifted out. After the data in shift register 4702 has been completely shifted out, control 4703 causes the contents of register 4701 to be passed to shift register 4702, via a signal on conductor 4705. Control 4703 then resets counter 4704, and sends an acknowledge signal back to address control interface 4501 via conductor 4505. Buffer 4502 is receiving a continuous ready indication from switch interface 1418 on conductor 4114. If switch interface 1418 is overloaded and cannot receive packets, it removes this ready signal. When this occurs, data is not shifted out of shift register 4702 until the ready signal appears again.

Figure 48:
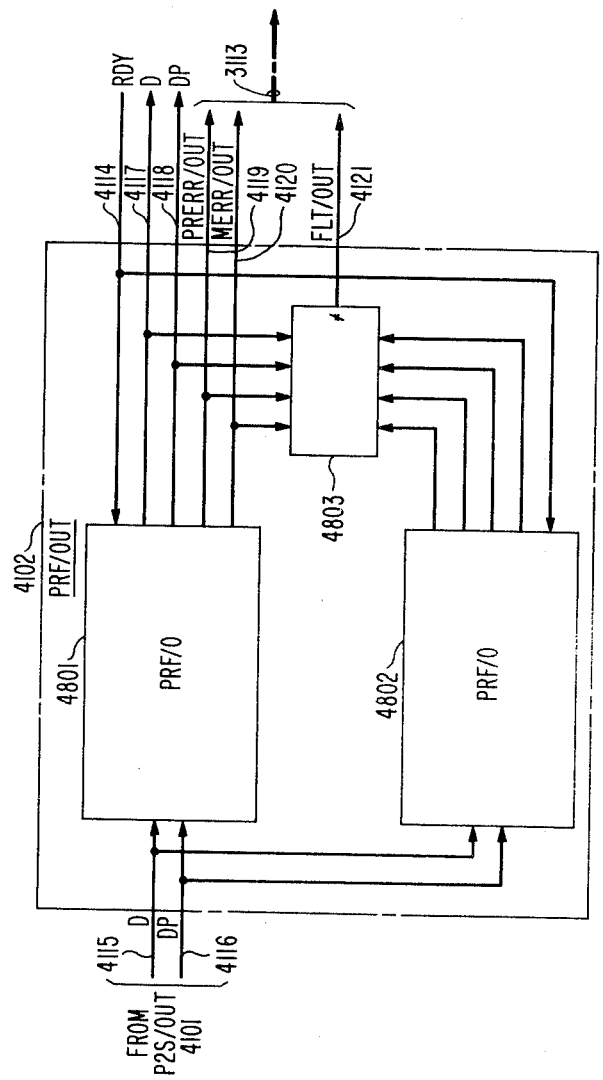

Packet reformatter 4102 is shown in greater detail in FIG. 48. Packet reformatter 4102 comprises packet reformat circuits 4801 and 4802, and comparator 4803. The duplicate packet reformatters are necessary for detecting hardware failures, as previously explained. If an error is found in the reformatting, comparator 4803 detects the error and places a signal on conductor 4121. This fault signal is sent to the central processor via switch interface 1418. If the CRC check of the incoming packet shows that the packet was received in error, a signal is placed on conductor 4119; if the check on the logical channel translation table entry reveals an error, a signal is placed on conductor 4120. Both signals are sent to switch interface 1418.

Figure 49:
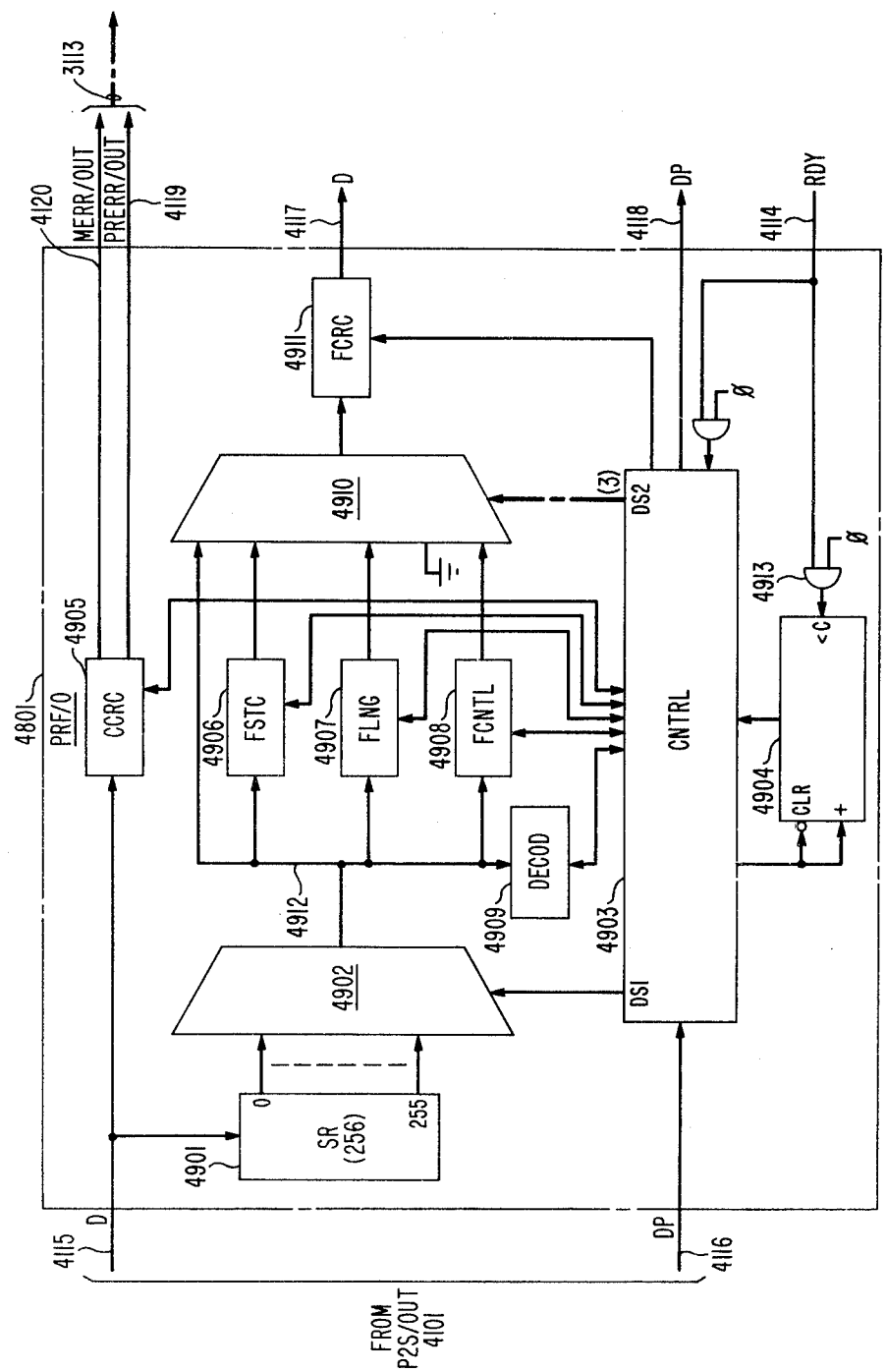

Packet reformat circuit 4801 is shown in greater detail in FIG. 49. Packet reformat circuit 4801 performs two basic functions: it checks the CRC field of the incoming packet and reports any errors, and it reformats certain fields, depending on the type of packet received. Errors are reported by check CRC circuit 4905, which checks the CRC field of the incoming packet, and the check field of the logical channel translation table entry. If the incoming packet contains errors, it is reported via a signal on either conductor 4119 or 4120 as previously described. This operation is the same regardless of the type of packet received.

Packet reformat circuit 4801 is described with respect to handling an ordinary packet (control field of "0"), similar to packet 4202. The incoming packet is received by packet reformat circuit 4801 on conductor 4115, and shifted into register 4901 in a serial manner. The bits are moved through packet reformat circuit 4801 in a continuous stream under control of system clock 161. Timing generator 4904 keeps track of where each bit is in register 4901. This allows control 4903 to access various areas in shift register 4901, via data selector 4902, in order to shift various fields into the appropriate reformatting circuits 4906 through 4908, or decoder 4909. When the control and PID fields are at the correct locations in shift register 4901, control 4903 causes these fields to be shifted into decoder 4909. Decoder 4909 decodes these fields and sends the decoded values to control 4903. After 256 bits have been shifted into register 4901, the length field, which is now stored in register 4901, is selected by data selector 4902 and sent to data selector 4910 via conductor 4912. In this particular case, the length field does not change and thus is passed directly to the output. The DTC field, which is located in the logical channel translation table entry field, is then shifted out of register 4901 via data selector 4902, and sent to data selector 4910. The next field to consider is the STC field. The value of this field is hard-wired into format STC circuit 4906. Control 4903 causes format STC circuit 4906 to shift this value into data selector 4910. The control, arrival time, and packet identifier fields are next selected by data selector 4902 and shifted to data selector 4910, under control of control 4903. The new logical address must be removed from the logical channel translation table entry field, contained in register 4901. To do this, control 4903 causes data selector 4902 to select this field, and send the new logical address to data selector 4910. As each field is sent to data selector 4910, control 4093 causes data selector 4910 to send these fields (which now constitute the entire packet) to format CRC circuit 4911. Format CRC circuit 4911 is recalculating a new CRC field as the packet is being shifted through. Once the entire packet has been shifted through format CRC circuit 4911, format CRC circuit 4911 calculates a new CRC field, based on the updated fields, and adds the new CRC field to the end of the packet. The reformatted packet is then sent to switch interface 1418 via conductor 4117. Control 4903 generates the required data present signals on conductor 4118.

Figure 50:
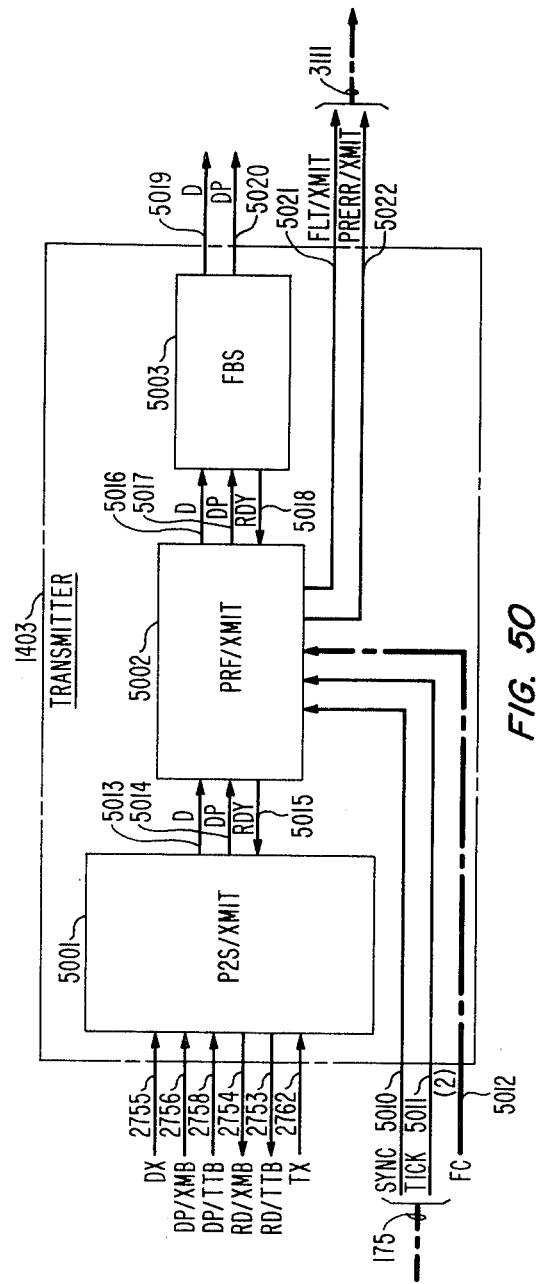
FIGS. 50 through 53 are detailed block diagrams of subsystems which comprise transmitter 1403 of trunk controller 131.

Transmitter 1403 is shown in greater detail in FIG. 50. Transmitter 1403 reads data from memory 1401, via address control 1404, and converts the data into trunk packets, which are sent to the next trunk controller or to the concentrator in the end office. Transmitter 1403 comprises parallel to serial converter 5001, packet reformatter 5002, and flag and bit stuff circuit 5003. Transmitter 1403 receives data present in transmit buffer, and data present in trunk test buffer signals from address control 1404 via conductors 2756 and 2758. When transmitter 1403 receives a signal on conductor 2766, it reads transmit buffer 1503 in memory 1401 by placing a signal on conductor 2754. This signal causes address control 1404 to read the data from transmit buffer 1503, and forward the data to Transmitter 1403 via cable 2755. Similarly, transmitter 1403 reads data from trunk test buffer 1502 in memory 1401 by placing a signal on conductor 2753. After the data has been read from either transmit buffer 1503 on trunk test buffer 1502, the data is converted from parallel to serial, and passed to packet reformatter 5002 via conductor 5013. Packet reformatter 5002 indicates it is ready to receive data by placing a signal on conductor 5015. Packet reformatter 5002 fills in the time stamp field, and updates the PID field, as required, to reflect any flow control change. The flow control information is received from switch interface 1418 via cable 5012. Additionally, packet reformatter 5002 checks the CRC field of the incoming packet for errors, and recalculates a new CRC field, based on the added field information. Packet reformatter 5002 passes the packet to flag and bit stuff circuit 5003 via conductor 5016. Flag and bit stuff circuit 5003 adds the flag pattern to the beginning and end of the outgoing packet, and stuffs a zero after any sequence of five ones. Flag and bit stuff circuit 5003 then transmits the trunk packet to the trunk via conductor 5019 at a 1.544 Mb/s rate.

Figure 51:
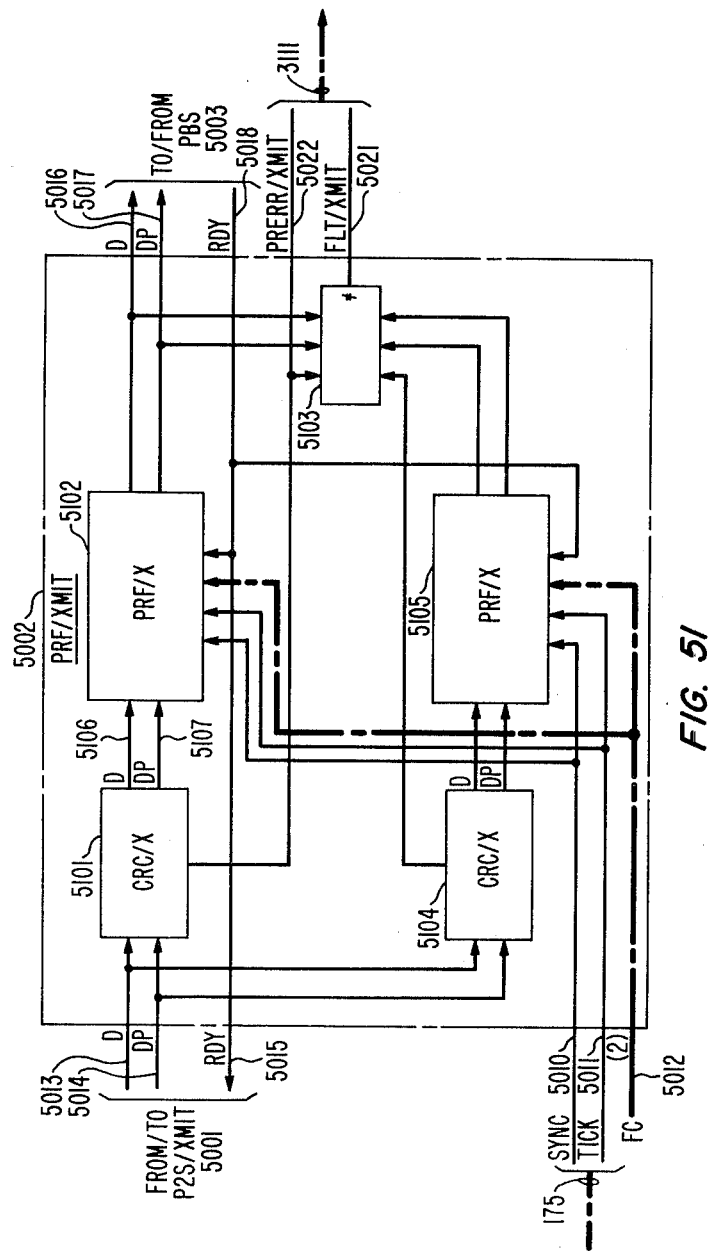

Packet reformatter 5002 is shown in greater detail in FIG. 51. Packet reformatter 5002 comprises CRC circuits 5101 and 5104, packet reformat circuits 5102 and 5105, and comparator 5103. This circuit contains duplicate CRC and packet reformatters, which are required to detect hardware failures, as has been previously explained. If an error is detected, it is indicated by a signal on conductor 5021.

Figure 52:
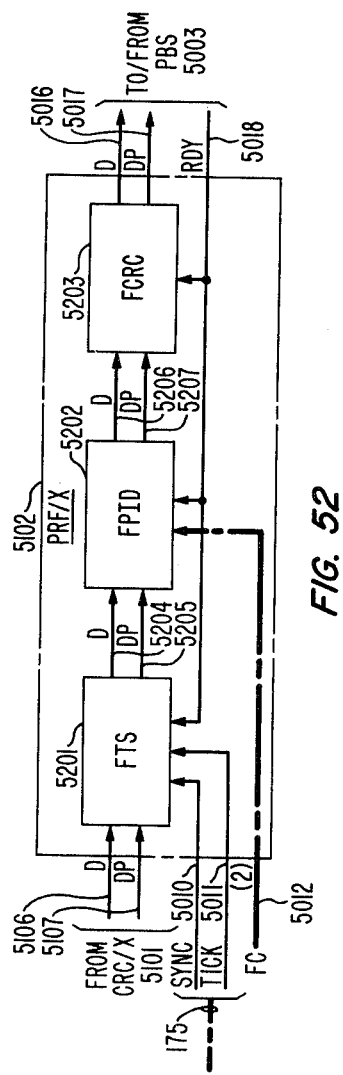

Packet reformat circuit 5102 is shown in greater detail in FIG. 52. This circuit updates the time stamp field, PID field, and CRC field. Format time stamp circuit 5201 updates the time stamp field of the packet by calculating the difference between arrival time, already contained in the arrival time field, and the present time, which is maintained by format time stamp circuit 5201. This calculation was described in the detailed description for receiver 1402. Format time stamp circuit 5201 also removes the header information from the packet so as to convert it from a switch packet to a trunk packet. PID circuit 5202 updates the PID field, based on the current flow control which is maintained in switch interface 1418. Flow control information is passed to PID circuit 5202 via cable 5012. CRC circuit 5203 recalculates a new CRC field using the updated time stamp and PID fields, in addition to the other packet fields. Once packet reformatter 5202 has updated all necessary fields, it passes the packet to flag and bit stuff circuit 5003.

Figure 53:
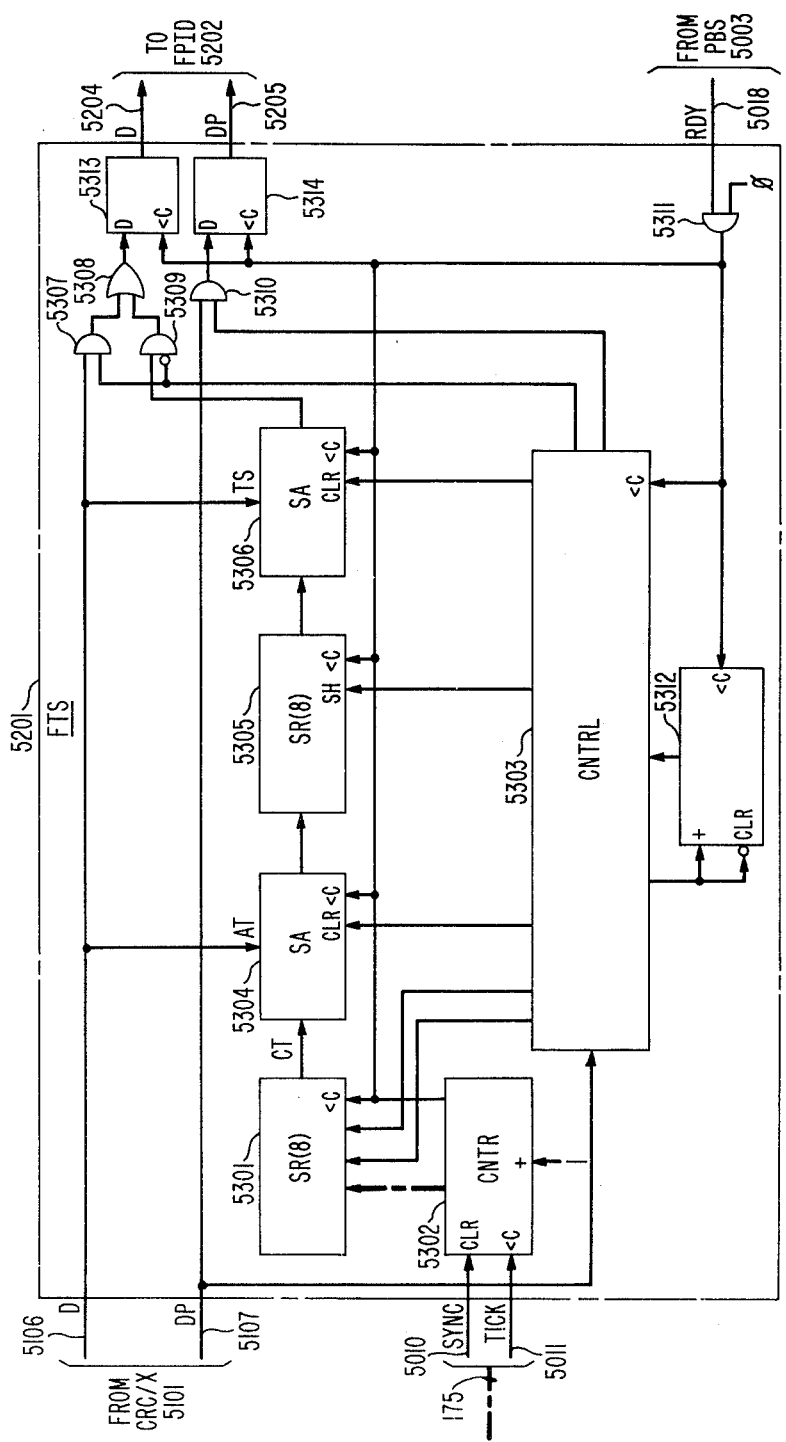

Format time stamp circuit 5201 is shown in greater detail in FIG. 53. Format time stamp circuit 5201 reads the arrival time of the incoming packet from the arrival time field, computes the difference between the arrival time and the current time, and adds this difference to the time stamp field. Format time stamp circuit 5201 also removes fields from the incoming packet, in order to transform it from a switch packet into a trunk packet. The present time is maintained by counter 5302, which is controlled via external timing signals on conductors 5010 and 5011. When the first data present is received on conductor 5107 it is sent to control 5303, which causes the contents of counter 5302 to be written into shift register 5301. The signal on conductor 5107 also causes control 5303 to start counter 5312. Counter 5312 counts the data present signals as they arrive on conductor 5107, in order to determine when the various fields are present on conductor 5106. When the arrival time field of the packet is present on conductor 5106, control 5303 causes the arrival time to be shifted to serial adder 5304 and, at the same time, control 5303 causes the current time, previously stored in shift register 5301, to be shifted to serial adder 5304. Serial adder 5304 adds the current time to the arrival time field and places the sum in shift register 5305. Since the arrival time field is encoded as a negative number, this calculation yields the difference between the current time and the arrival time. When counter 5312 indicates that the time stamp field of the incoming packet is present on conductor 5106, control 5303 causes the time stamp field to be shifted to serial adder 5306, and, at the same time, control 5303 causes the contents of shift register 5305 to be sent to serial adder 5306. Serial adder 5306 then adds these numbers, and places the sum into the time stamp field of the incoming packet, thus updating the time stamp field. The fields that must be stripped off of the packet to transform the packet from a switch packet to a trunk packet are stripped off as follows. Control 5303 removes the signal on AND gate 5310 when the fields that are to be stripped off are present on conductor 5106. This removes the data present signal from conductor 5205 during the bit times that the fields that are to be removed are present on conductor 5106. The removal of this data present signal causes the following circuits to ignore the data that is present on conductor 5204 during the bit times that the data present signal is removed.

FIG. 54 shows the clock rates from system clock 161. The psi clock rate is the rate that incoming date enters receiver 1402. The phi rate is the rate that the data leaves receiver 1402, passes through the various circuits in trunk controller 131, and is sent to the switching network. The theta rate is the rate that data is transferred in and out of memory 1401 by address control 1404.

It is to be understood that the above-described embodiment is merely illustrative of the principles of the invention and that other arrangements may be devised by those skilled in the art without departing from the spirit and scope of the invention.

What is claimed is:

1. A packet switching system for communicating a plurality of messages each comprising a plurality of packets, and each packet comprising a logical address, said system comprises:

transmission means for communicating a one of said messages;

a central processor responsive to destination information of a first packet of said one of said messages to generate logical and physical address information;

memory means associated with said transmission means responsive to the generated logical and physical address information to store said generated information;

controller means associated with said transmission means comprising means responsive to a subsequent one of said packets of said one of said messages to read the stored logical and physical address information, means for concatenating said logical and physical address information with said subsequent one of said packets, and means for transmitting said concatenated logical and physical address information and said subsequent one of said packets;

a switching network responsive to said transmitted concatenated logical and physical address information and said subsequent one of said packets to route said logical and physical address information and said subsequent one of said packets through said network.

2. A packet switching system for the transmission of a first type packets having logical address information and second type packets having switch address information and other logical address information and comprises an interface means interconnecting a switching network and transmission means, said interface means comprises:

memory means for storing said first type packets and other logical address information associated with switch address information;

addressing means responsive to a receipt of one of said first type packets to effect the storage of the received packet in said memory means;

said addressing means further comprising means for reading the stored one of said first packets and means responsive to said logical address information in said one of said first type packet for reading associated other logical and switch address information from said memory means; and transmitter means responsive to the read other logical and switch address information and the read one of said first type packets for forming one of said second type packets.

3. The invention of claim 2 wherein said interface means further comprises receiver means responsive to a second one of said second type packets from said switching network to effect a formation of a second one of said first type packets from said second one of said second type packets;

said addressing means further comprising means responsive to the formed second one of said first type packets for storing said second one of said first type packets in said memory means;

said interface means further comprising transmit means responsive to said storage of the second one of said first type packets for transmitting said second one of said first type packets on said transmission means.

4. The invention of claim 3 wherein said memory means comprises a buffer having a plurality of memory locations;

said addressing means further comprises means for monitoring said buffer for determining the availability of ones of said memory locations for storing packets in said buffer and means for detecting said one of said first type of packets in said buffer;

interface means further comprises receive means for receiving said one of said first type packets via said transmission means and said receive means comprising means controlled by said monitoring means for operating said addressing means to effect a storage of said one of said first type packets into said locations of said buffer;

said transmitter means further comprises output means controlled by said detecting means to effect the communication of said one of said first type packets from said buffer to said switching network.

5. The invention of claim 4 wherein each of said second type packets comprises an address field for storing the switch address information and a length field for storing the length information of said second type packets; and said receive means further comprises means responsive to said one of said first type packets to allocate the memory locations in said buffer to store said address information and said length information of said first one of said second type packets.

6. The invention of claim 5 wherein said receive means further comprises:

means responsive to said first one of said first type packets for counting the number of bits contained in said first one of said first type packets and means for storing said count plus a prescribed number of bits for said address field and said length field of said first one of said second type packets.

7. The invention of claim 6 wherein said monitoring means further comprises a first counter to generate addresses for writing into said buffer, a second counter to generate addresses for reading information from said buffer and comparing means for comparing said first and said second counters, and means responsive to the availability of memory locations in said buffer to transmit a first signal to said receive means;

said receive means further comprising means responsive to said first one of said first type packets to transmit a third signal to said monitoring means;

said detecting means further comprises a storage means responsive to said third signal to be activated to a first state and means for transmitting a second signal to said output means to effect the reading of said one packet of said first type packets from said buffer by said second counter upon said first and second counters not being equal.

8. The invention of claim 7 wherein said monitoring means further comprises a third counter indicating the address of the most significant memory location in said buffer and a comparator for comparing said first and third counter;

said monitoring means controlled by said comparator detecting said counter not equal to said third counter to withdraw said first signal signaling that storage of another packet in said buffer is precluded.

9. The invention of claim 7 wherein said detecting means further comprises means responsive to said first counter equaling said second counter to cause said storage means to be activated to a second state for effecting the withdraw of said transmission of said second signal to said output means signaling the unavailability of another one of said first type packets.

10. The invention of claim 9 wherein said addressing means further comprises a fourth counter;

said addressing means further comprising means responsive to said receipt of said first one of said first type packets in said receive means to set said fourth counter equal to said first counter;

said first counter responsive to said first one of said first type packets to control the storage of said first one of said first type packets by generating addresses to address said memory means;

said receive means further comprises means responsive to an error in said first one of said first type packets to set said first counter equal to said fourth counter.

11. The invention of claim 4 wherein said interface means further comprises receiver means for receiving said second type packets from said network;

said memory means further comprises a switch buffer;

said addressing means responsive to the receipt of a second one of said second type packets in said receiver means for storing said second one of said second type packets into said switch buffer;

said transmit means responsive to said second one of said second type packets stored in said switch buffer to communicating said stored packet on said transmission means.

12. The invention of claim 2 wherein a second one of said first type packets further comprises a function field;

said interface means further comprises transmit means;

said memory means comprises a buffer having a plurality of memory locations;

said receive means is further responsive to signals representing a first state in said function field to store said second one of said first type packets in said buffer; and said transmit means further comprising means responsive to said first state in said function field for communicating said second one of said first type packets on said transmission means.

13. The invention of claim 12 wherein said receive means further comprises means responsive to said signals representing said first state in said second one of said first type packets and to transmit a first signal to said transmit means; and said transmit means further comprises means responsive to said first signal for reading from said buffer and means for transmitting said second one of said first type packets on said transmission means.

14. The invention of claim 2 wherein a second one of said second type packets comprises a control field; and said interface means responsive to signals representing a first state in said control field to transmit said second one of said second type packets back to said network.

15. The invention of claim 14 wherein said memory means comprises a buffer having a plurality of memory locations and said interface means further comprises:

said receiver means responsive to said second one of said second type packets from said network and said signals representing said first state to effect the storage of said second one of said second type packets in said buffer and comprises means to transmit a first signal to said transmitter means for effecting the transmission of said stored second one of said second type packets to said network.

16. The invention of claim 4 wherein said first one of said second type packet further comprises an address field for storing the switch address to route said first one of said second type packets through said network and a logical address field for storing the logical address information; and said transmitter means further comprises means responsive to said second signal and said logical address in said first one of said second type packets to effect the reading of said switch address information associated with said logical address from said memory means and means for storing said switch address information in said first one of said second type packet.

17. The invention of claim 16 wherein said first one of said second type packets is assembled from said memory means serially with said switch address field first followed by said logical address field, said transmitter means further comprises:

a shift register means for storing said switch address field and said logical address field;

second means for reading said logical address information from said logical address field;

third means for effecting a reading of the associated switch address information from said memory means in response to said logical address information;

fourth means for inserting the switch address information into the switch address field stored in said shift register means; and fifth means for transmitting said first one of said second type packets from said shift register means by inserting new portions of said first one of said second type packets into said shift register means from said memory means.

18. The invention of claim 17 wherein said addressing means further comprises a first counter to address said switch address information associated with the logical address field of said first one of said first type packets;

said third means of said transmitter means further responsive to said logical address field being stored in said shift register means for storing the contents of said logical address field in said first counter; and said first counter being responsive to said logical address field to address said memory means with said contents of said logical address field.

19. The invention of claim 2 wherein said packet switching system further comprises a central processor associated with said network;

said memory means further comprises a buffer;

said interface means further comprises a receiver means;

said processor comprising means for generating a second one of said second type packets having a data field containing logical address information and associated switch address information and a physical address designating the locations in said memory means where said logical address information and said associated switch address information are to be stored, and means for transmitting said seond one of said second type packets to said receiver means; and said receiver means responsive to said second one of said second type packets to store said associated switch information and said other logical address information at the location in said memory means designated by said physical address information and the remainder of said second one of said second type packets in said buffer.

20. The invention of claim 19 wherein said transmitter means further comprises means responsive to said second one of said second type packets for reading said stored remainder of said second one of said second type packets and said stored switch address information and other logical address information, and means for transmitting a third one of said second type packets comprising the read information to said processor via said network.

21. The invention of claim 19 wherein said addressing means comprises a first counter for storing said physical address and a second counter for addressing said buffer; and said addressing means further comprising means responsive to said second one of said second type packets for storing said switch address and logical address information in memory locations of said memory means designated by said first counter and the remainder of said second one of said second type packets in said buffer designated by said second counter.

22. The invention of claim 21 wherein said receiver means further comprises means for transmitting a signal to said transmitter means after storing said second one of said second type packets in said memory means; and said transmitter means further comprises means responsive to said signal to read said second one of said second type packets from said second buffer and said memory locations designated by said physical address and means for forming said third one of said second type packets.

23. A packet switching system for communicating messages each comprising a plurality of packets, and each of said packets comprising logical address information and said system comprises:

a central processor;

a first interface facility responsive to the receipt of a first one of said plurality of packets of one of said messages to transmit said received packet to said central processor via said switching network;

said received packet comprises identification information;

a second interface facility;

said central processor responsive to said identification information of said received packet to generate logical and switch address information for transmission to said first interface facility;

said first interface facility further comprising means responsive to said logical and switch address information to store said logical and switch address information;

said first interface facility further comprising means responsive to a subsequent one of said packets of said one of said messages to access said stored logical and switch address information and means for concatenating said logical and switch address information with said subsequent one of said packets for transmission of said concatenated information to said switching network; and said switching network responsive to said switch address information in said concatenated information to route said concatenated information to said second interface facility.

24. A switching system for communicating packets each having a field for storing address information, said system comprises:

transmission means;

a switching network;

interface means for interconnecting said transmission means and said network;

said interface means comprising memory means for storing logical address information associated with switch address information and operable for storing said packets received from said transmission means;

said interface means further comprising means responsive to the receipt of one of said packets from transmission means for controlling the storage of said one of said packets in said memory means; and said interface means further comprising means for reading the stored one of said packets from memory, means for reading said logical address information associated with said switch information from said memory means, and means responsive to the read one of said packets to concatenate said read packet and said logical address information and said switch address information for transmission of said concatenated information to said switching network.

25. A packet switching system comprises a plurality of networks interconnected by a plurality of transmission means with each of said transmission means being connected to a one of said networks by one of a plurality of interface facilities, first type packets are transmitted on said plurality of transmission means and second type packets are transmitted within said networks, each of said type of packets comprising a function field, each of said interface facilities further comprises:

receiving means responsive to said function field of one of said first type packets containing signals representing a first state to effect a transmission of said one of said first type packets on said connected transmission means;

said receive means comprises means responsive to said function field of said one of said first type packets containing signals representing a second state to effect the transformation of said one of said first type packets into one of said second type packets and means for communicating said one of said second type packets to said connected network;

receiver means responsive to the function field of a second one of said second type packets from said network containing signals representing a first state to effect the transmission to said network of second one of said second type packet with said function field equal to said first state; and said receiver means comprises means responsive to the function field of a third one of said second type packets containing signals representing a second state to effect the transformation of said third one of said second type packets to a second one of said first type packets and means for transmitting said second one of said first type packets to said transmission means.

26. A packet switching system for communicating a plurality of messages each comprising a plurality of packets, each of said packets comprising logical address and data, said system comprising:

processor means responsive to a receipt of identification data of one of said packets of one of said messages for generating logical address information and physical address translation information;

switching network means for switching other packets of said one of said messages to a destination;

distributed controller means for communicating said other packets of said one of said messages to said network means and comprising means for storing the logical address information and the physical address translation information generated by said processor means; and means responsive to a receipt of one of said other packets for concatenating the stored logical address information and the physical address information in said storing means with said one of said other packets.

27. The invention of claim 26 wherein said one of said packets comprises a call set-up packet, and said controller means comprises means responsive to a receipt of said call set-up packet for controlling the switching of said set-up packet through said network means to said processor means.

28. The invention of claim 26 wherein said processor means is further responsive to said logical address signals of said one of said packets for producing logical address data and physical address translation data, and further comprising another distributed controller means for communicating said other packets to said destination and received message packets from said destination to said first-mentioned controller means, and comprising means for storing the logical address and physical address data produced by said processor means.

29. The invention of claim 28 wherein said other distributed controller means comprises means responsive to a receipt of said message packets for communication to said first-mentioned distributed controller means for concatenating said message packets with the stored logical address and physical address data in said storing means of said other distributed controller means.

30. A method of communicating packets through a packet switching system comprising switching networks interconnected by a plurality of transmission means with each transmission means being connected to a given network by one of a plurality of interface facilities, first type packets comprising logical addresses are transmitted via said transmission means and second type packets comprising network addresses are transmitted within said networks, each of said switching network comprising switching elements responsive to the network addresses of said second type packets to route said second type packets to destination ones of said interface facilities, said method comprising the steps:

translating the logical address contained in one of said first type packets to the corresponding network address and another logical address upon a receipt of said one of said first type packets by one of said interface facilities from associated transmission means;

assembling one of said second type packets by concatenating said network address and said one of said first type packets;

replacing said logical address with said other logical address in said one of said first type of packets; and transmitting said one of said second type packets to said destination interface facility via said network.

31. The invention of claim 30 wherein each of said interface facilities further comprises external means for receiving and transmitting said first type packets, switch means for receiving and transmitting said second type packets, and a memory means for storing said first type packets and for storing other logical address information associated with network address information, and further comprising the steps:

transforming said one of said second type packets to a second one of said first type packets upon a receipt of said one of said second type packets by said switch means of said destination interface facility;

storing said second one of said first type packets in said memory means in response to said second one of said first type packets; and transmitting said second one of said first type packets by said external means of said destination interface facility on the associated transmission means.

32. The invention of claim 31 wherein said memory means comprises a buffer comprising a plurality of memory locations and said step of storing said first one of said first type packets in said memory means further comprises the steps of detecting that said buffer can store another packet;

transmitting to said switch means of said destination interface facilities a first signal indicating that said buffer can store another packet;

storing said first one of said first type packets in said buffer by said switch means of said destination interface facility in response to said first signal;

detecting that said buffer contains said first one of said first type packets;

transmitting a second signal to said external means of said destination interface facility; and assembling said second one of said first type packets from said first one of said first type packet in said buffer by said external means of said destination interface facility in response to said second signal.

33. The invention of claim 30 wherein said one of said interface facilities further comprises an external means for receiving and transmitting said first type packets via said associated transmission means, switch interface means for receiving and transmitting said second type packets via said network, and a memory means for storing said first type packets and for storing other logical address information associated with switch address information, said first one of said second type packets comprises a length field for storing the length of said first one of said second packets and an address field for storing the switch address, said memory means further comprises a buffer for storing said first one of said first type packets, and further comprising the step of providing memory locations in said buffer for said first one of said first type packets and said length and address field of said first one of said second type packets.

34. The invention of claim 33 wherein said step of providing said length field further comprises the steps of calculating the number of bits contained in said first one of said second type packets; and storing the number representing the calculated number of bits in said first one of said first type packets plus the number of bits in said address field and said length field contained in said first one of said second type packets stored in said buffer.

35. The invention of claim 31 wherein said method further comprises the step of generating the address of the last packet read from said buffer;

calculating the address into which said first one of said first type packets was written into said buffer;

comparing said reading address with said writing address; and generating said second signal upon said addresses not being equal.

36. The invention of claim 32 wherein said step of generating said first signal further comprising the step of generating the most significant memory location in said buffer;

comparing said most significant address with said storage address; and generating and transmitting said first signal upon said most significant address and said storage address not being equal.

37. The invention of claim 36 wherein said step of storing said first one of said first type packets into said buffer further comprises the step of storing said generated storage address as a temporary address;

detecting an error in said first one of said first type packets; and setting said storage address equal to said temporary address in response to said error.

* * * * *